(12) United States Patent
Emura et al.

(10) Patent No.: US 8,266,653 B2
(45) Date of Patent: Sep. 11, 2012

(54) DATA ADAPTING DEVICE, DATA ADAPTING METHOD, STORAGE MEDIUM, AND PROGRAM

(75) Inventors: Koichi Emura, Yokohama (JP); Toshihiko Munetsugu, Katano (JP)

(73) Assignee: Panasonic Corporation, Osaka (JP)

( * ) Notice: Subject to any disclaimer, the term of this patent is extended or adjusted under 35 U.S.C. 154(b) by 1705 days.

(21) Appl. No.: 10/130,299

(22) PCT Filed: Nov. 29, 2000

(86) PCT No.: PCT/JP00/08408
§ 371 (c)(1), (2), (4) Date: May 31, 2002

(87) PCT Pub. No.: WO01/40953
PCT Pub. Date: Jun. 7, 2001

(65) Prior Publication Data
US 2002/0184622 A1    Dec. 5, 2002

(30) Foreign Application Priority Data

Dec. 3, 1999 (JP) .................................. H11-344476
Mar. 10, 2000 (JP) .................................. 2000-066531

(51) Int. Cl.
*G06F 13/00* (2006.01)
(52) U.S. Cl. ....................................................... 725/46
(58) Field of Classification Search .................. 725/34, 725/35, 46, 135
See application file for complete search history.

(56) References Cited

U.S. PATENT DOCUMENTS

| | | | |
|---|---|---|---|
| 5,664,046 A * | 9/1997 | Abecassis | 386/125 |
| 6,356,902 B1 | 3/2002 | Tan et al. | |
| 6,429,364 B1 | 8/2002 | Muraki et al. | |
| 6,470,378 B1 * | 10/2002 | Tracton et al. | 709/203 |
| 6,487,566 B1 * | 11/2002 | Sundaresan | 715/513 |
| 7,055,166 B1 * | 5/2006 | Logan et al. | 725/32 |
| 7,296,285 B1 * | 11/2007 | Jun et al. | 725/46 |
| 7,334,249 B1 * | 2/2008 | Byers | 725/35 |
| 2002/0191954 A1 * | 12/2002 | Beach et al. | 386/46 |
| 2003/0067554 A1 * | 4/2003 | Klarfeld et al. | 348/461 |
| 2004/0172661 A1 * | 9/2004 | Yagawa et al. | 725/131 |
| 2004/0268390 A1 * | 12/2004 | Ibrahim Sezan et al. | 725/35 |

FOREIGN PATENT DOCUMENTS

| | | |
|---|---|---|
| EP | 1134740 | 9/2001 |
| JP | 7-152668 | 6/1995 |
| JP | 9-46689 | 2/1997 |

(Continued)

OTHER PUBLICATIONS

F. Rousseau et al., "User Adaptable Multimedia Presentations for the World Wide Web," Computer Networks, vol. 31, May 17, 1999, pp. 1273-1290.

(Continued)

*Primary Examiner* — Vivek Srivastava
*Assistant Examiner* — Aklil Tesfaye
(74) *Attorney, Agent, or Firm* — Greenblum & Bernstein, P.L.C.

(57) ABSTRACT

The present invention makes it possible to achieve data adaptation in accordance with a user's preferences, by holding a user's preference information for each content as user preferences, selecting a data segment according to user preferences, and performing resolution conversion on the basis of segment priority level and terminal capability, thereby enabling data adaptation to be performed for each content in a form the user wishes to see.

10 Claims, 67 Drawing Sheets

FOREIGN PATENT DOCUMENTS

| | | |
|---|---|---|
| JP | 9-128405 | 5/1997 |
| JP | 11-96237 | 4/1999 |
| JP | 11-126205 | 5/1999 |
| JP | 11-134364 | 5/1999 |
| JP | 11126205 | 5/1999 |
| JP | 11205706 | 7/1999 |
| JP | 11205706 A * | 7/1999 |
| JP | 11242687 | 9/1999 |
| JP | 11-288424 | 10/1999 |
| JP | 11288403 | 10/1999 |
| JP | 11288424 | 10/1999 |
| WO | 98/15091 | 4/1998 |

OTHER PUBLICATIONS

J.R. Smith et al., "Transcoding Internet Content for Heterogeneous Client Devices," Circuits and Systems, 1998, Proceedings of the 1998 IEEE International Symposium on Monterey, CA, USA, May 31, 1998, pp. 599-560.

R. Mohan et al., "Content Adaptation Framework: Bringing the Internet to Information Appliances," 1999 IEEE Global Telecommunications Conference, vol. 4, Dec. 5, 1999, pp. 2015-2021.

ISO/IEC JTC1/SC29/WG11 N2996: "MPEG-7 Requirements Document V.10," Oct. 1999, pp. 1-22.

F. Nack et al., "Everything You Wanted to Know about MPEG-7: Part 2," IEEE Multimedia, IEEE Computer Society, US, vol. 6, No. 4, Oct. 1999, pp. 64-73.

F. Nack et al., "Everything You Wanted to Know about MPEG-7: Part 1," IEEE Multimedia, IEEE Computer Society, US, vol. 6, No. 3, Jul. 1999, pp. 65-77.

ISO/IEC JTC1/SC29/WG11 N3246: "MPEG-7 Multimedia Description Schemes XM (Versiona 2.0)," Mar. 2000, pp. 1-138.

English Langusge Abstract of JP 7-152668.

English Langusge Abstract of JP 9-46689.

English Langusge Abstract of JP 11-96237.

English Langusge Abstract of JP 11-126205.

English Langusge Abstract of JP 11-205706.

English Langusge Abstract of JP 11-242687.

English Langusge Abstract of JP 11-288403.

English Langusge Abstract of JP 11-288424.

Mohan et al., "/adapting Multimedia Internet Content for Universal Access", IEEE Transactions on Multimedia, Mar. 1999, pp. 104-114.

Hashimoto et al., "Digested TV Program Viewing Application Using Program Index (Bangumi Index wo Riyo shita Shicho-Hoho no Kento)", ITE Technical Report vol. 23, No. 28, pp. 7-12, Mar. 1999, (together with its English translation of referenced portion).

Hashimoto et al., "Prototype of Digest Making and Viewing System for Television (TV-Jushinki niokeru Digest Sakusei oyobi Shicho System no Shisaku)", IPSJ SIG Notes 99(61), Information Processing Society of Japan, pp. 133-138, Jul. 21, 1999, (together with its English translation of referenced portion).

* cited by examiner

```
<!--UPML (User Preference Markup Language)DTD-->
41 {<!ELEMENT UPML      (Content*)
42 {<!ELEMENT Content   (Keyword*)
43 {<!ATTLIST Content                      } 36
    34 {ContentID       CDATA #REQUIRED
    35 {Duration        CDATA #IMPLIED
    46 {ScreenSize      CDATA #IMPLIED>
47 {<!ELEMENT Keyword   (#PCDATA)>
48 {<!ATTLIST Keyword
    37 {Priority        NMTOKEN # IMPLIED>
```

FIG. 3

```
<?xml version="1.0" ?>
<UPML>
  <Content ContentID="cid : 123456789" Duration="smpte=00:05:00:00">
    <Keyword Priority="5">Nakata</Keyword>
    <Keyword Priority="4">Soccer</Keyword>
    <Keyword Priority="2">Japan</Keyword>
  <Content>
  <Content ContentID="cid : 123456788" ScreenSize="pixel=320×240">
    <Keyword Priority="5">Headline</Keyword>
    <Keyword Priority="5">Stock</Keyword>
    <Keyword Priority="3">Sports</Keyword>
  </Content>
</UPML>
```

FIG. 4

```
<!--UPML (User Preference Markup Language) DTD-->
141 {<!ELEMENT UPML            (Content*)>
142 {<!ELEMENT Content         (Keyword*)>
143 {<!ATTLIST Content              136
     134 {ContentID          CDATA     # REQUIRED
     135 {Duration           CDATA     # IMPLIED
     144 {Screensize         CDATA     # IMPLIED>
148 {<!ELEMENT Keyword        (# PCDATA)>
```

```
<?xml version="1.0">
<UPML>
      ┌ <Content ContentID ="cid : 123456789" Duration=" smpte=00:05:00:00" >  ─ 153a  ─ 154
      │     <Keyword>Nakata</Keyword>   ~ 155a
151 ─┤     <Keyword>Soccer</Keyword>   ~ 155b
      │     <Keyword>Japan</Keyword>    ~ 155c
      └ <Content>  ─ 153b
      ┌ <Content ContentID =" cid : 123456788" ScreenSize=" pixel=320×240" >  ─ 156
      │     <Keyword>Headline</Keyword>  ~ 155d
152 ─┤     <Keyword>Stock</Keyword>     ~ 155e
      │     <Keyword>Sports</Keyword>    ~ 155f
      └ </Content>
</UPML>
```

FIG. 12

```
<KeywordList>
<Keyword id="1">A</Keyword>    ⎫
  1901a  1902a               ⎪
<Keyword id="2">B</Keyword>    ⎬ 1801
  1901b  1902b               ⎪
<Keyword id="3">C</Keyword>    ⎭
  1901c  1902c
</KeywordList>
  1903a <Segment>                      ⎫
<Keyword idref="1" p="2"/>     ⎬ 1803
  1903a      1904a            ⎪
...                            ⎭
</Segment>
<Segment>                      ⎫
<Keyword idref="2" p="3"/>     ⎬ 1804
  1903b      1904b            ⎪
...                            ⎭
</Segment>
<Segment>                      ⎫
<Keyword idref="3" p="4"/>     ⎬ 1805
  1903c      1904b            ⎪
...                            ⎭
</Segment>
```

FIG. 19

```
<KeywordList>
    <Keyword id="1">A</Keyword>     }2102a
                 2301
    <Keyword id="2">B</Keyword>     }2102b         } 2101
                 2302
    <Keyword id="3">C</Keyword>     }2102c
                 2303
</KeywordList>

<Segment>
    <Keyword p="2">A</Keyword>
    ...    2107  2106                              } 2103
</Segment>
<Segment>
    <Keyword p="3">B</Keyword>
    ...    2109  2108                              } 2104
</Segment>
<Segment>
    <Keyword p="4">C</Keyword>
    ...    2111  2110                              } 2105
</Segment>
```

FIG. 23

```
<KeywordList Keyword="Team A">
    <Priority idref="1">3</Priority>
              2203a  2204a
    <Priority idref="n">2</Priority>
              2203b  2204b
    <Priority idref="2">5</Priority>
              2203c  2204c
</KeywordList>
```
} 2202a

```
<KeywordList Keyword="Team B">
    <Priority idref="2">4</Priority>
              2203d  2204d
    <Priority idref="3">5</Priority>
              2203e  2204e
    <Priority idref="1">2</Priority>
              2203f  2204f
</KeywordList>
```
} 2202b

```
<Segment id="1">
        2301a
...
<Segment>
```
} 2201a

```
<Segment id="2">
        2301b
...
</Segment>
```
} 2201b

```
<Segment id="n">
        2301n
...
</Segment>
```
} 2201n

FIG. 25

```
<KeywordList Keyword="TeamA"                              ⎫
    <Priority id="p101"  idref="1">3</Priority>           ⎪
              ‾‾‾‾‾‾‾   ‾‾‾‾‾‾‾‾ ‾                        ⎪
              2503a     2403a  2404a                      ⎪
    <Priority id="p102"  idref="n">2</Priority>           ⎬ 2402a
              ‾‾‾‾‾‾‾   ‾‾‾‾‾‾‾‾ ‾                        ⎪
              2503b     2403b  2404b                      ⎪
    <Priority id="p103"  idref="2">5</Priority>           ⎪
              ‾‾‾‾‾‾‾   ‾‾‾‾‾‾‾‾ ‾                        ⎪
              2503c     2403c  2404c                      ⎪
</KeywordList>                                            ⎭

<KeywordList Keyword="TeamB">                             ⎫
    <Priority id="p201"  idref="2">4</Priority>           ⎪
              ‾‾‾‾‾‾‾   ‾‾‾‾‾‾‾‾ ‾                        ⎪
              2503d     2403d  2404d                      ⎪
    <Priority id="p202"  idref="3">5</Priority>           ⎬ 2402b
              ‾‾‾‾‾‾‾   ‾‾‾‾‾‾‾‾ ‾                        ⎪
              2503e     2403e  2404e                      ⎪
    <Priority id="p203"  idref="1">2</Priority>           ⎪
              ‾‾‾‾‾‾‾   ‾‾‾‾‾‾‾‾ ‾                        ⎪
              2503f     2403f  2404f                      ⎪
</KeywordList >                                           ⎭

<Segment id="1">                                          ⎫
         ‾‾‾‾                                             ⎪
         2501a                                            ⎪
    <Keyword  idrefs="p101 p203"/ >                       ⎬ 2401a
              ‾‾‾‾ ‾‾‾‾                                   ⎪
    ...       2502a  2502b                                ⎪
</Segment>                                                ⎭
<Segment id="2">                                          ⎫
         ‾‾‾‾                                             ⎪
         2501b                                            ⎪
    <Keyword  idrefs="p102 p201"/>                        ⎬ 2401b
              ‾‾‾‾ ‾‾‾‾                                   ⎪
    ...       2502c  2502d                                ⎪
</Segment>                                                ⎭
<Segment id="n">                                          ⎫
         ‾‾‾‾                                             ⎪
         2501n                                            ⎪
    <Keyword  idrefs="p102 "/>                            ⎬ 2401n
              ‾‾‾‾‾                                       ⎪
    ...       2502e                                       ⎪
                                                          ⎪
</Segment>                                                ⎭
```

FIG. 27

```
<KeywordList Keyword="TeamA">
    <Priority idref="1"/>         }2603a
              ⏟
              2702a
    <Priority idref="n"/>         }2603b   } 2602a
              ⏟
              2702b
    <Priority idref="2"/>         }2603c
              ⏟
              2702c
</KeywordList>

<KeywordList Keyword="TeamB">
    <Priority idref="2"/>         }2603d
              ⏟
              2702d
    <Priority idref="3"/>         }2603e   } 2602b
              ⏟
              2702e
    <Priority idref="1"/>         }2603f
              ⏟
              2702f
</KeywordList>

<Segment id="1">
         ⏟
    ...  2701a                             } 2601a
</Segment>

<Segment id="2">
         ⏟
    ...  2701b                             } 2601b
</Segment>

<Segment id="n">
         ⏟
    ...  2701n                             } 2601n
</Segment>
```

FIG. 29

```
<KeywordList Keyword="TeamA">
    <Priority idref="2 n"/>
                 2803a 2803c
    <Priority idref ="1"/>
                 2803b
</KeywordList>
```
} 2802

```
<Segment id="1">
            2901a
   ...
</Segment>
```
} 2601a

```
<Segment id="2">
            2901b
   ...
</Segment>
```
} 2601b

```
<Segment id="n">
            2901n
   ...
</Segment>
```
} 2601c

FIG. 31

```
<!-############################################### -->
<!  Definition of the UserPreference DS            -->
<!-############################################### -->
<! ELEMENT UserPreference(UserIdentifier,UsagePreferenceses?) >
                         ‾‾‾‾‾‾‾‾‾‾‾‾‾‾ ‾‾‾‾‾‾‾‾‾‾‾‾‾‾‾‾‾‾
                              3201            3202                3203

<!-################################################### -->
<!-- Definition of the UserIdentifier DS                -->
<!-################################################### -->
<!ELEMENT UserIdentifier EMPTY>  } 3204
<!ATTLIST UserIdentifier
    protected(true|false|user)"true"
    ‾‾‾‾‾‾‾‾‾
     3204
    userName CDATA "anonymous"
    ‾‾‾‾‾‾‾‾
     3205
>

<!-################################################### -->
<!-- Definition of the UsagePreference DS               -->
<!-################################################### -->
<!ELEMENT UsagePreferences(BrowsingPreferences*)>  } 3206
                          ‾‾‾‾‾‾‾‾‾‾‾‾‾‾‾‾‾‾
<!ATTLIST UsagePreferences            3207
    allowAutomaticUpdate(true|false|user)"true"
    ‾‾‾‾‾‾‾‾‾‾‾‾‾‾‾‾‾‾‾‾
            3208
>

<!-################################################### -->
<!-- Definition of the BrowsingPreference DS            -->
<!-################################################### -->
<!ELEMENT BrowsingPreferences(SummaryPreferences*)   } 3209
                             ‾‾‾‾‾‾‾‾‾‾‾‾‾‾‾‾‾‾
<!ATTLIST BrowsingPreferences           3210
    protected(true|false|user)"true"
    ‾‾‾‾‾‾‾‾‾
     3211
    preferenceValue CDATA"100">
    ‾‾‾‾‾‾‾‾‾‾‾‾‾‾‾
       3212
```

FIG. 32

```
<!-########################################-->
<!-- Definition of the SummaryPreferences DS -->
<!-########################################-->
<!ELEMENT SummaryPreferences (PreferredSummaryTheme*,    }3301
                              3302
SummaryDuration ?)>
     3303
<!ATTLIST SummaryPreferences
    preferenceValue CDATA "100"
>        3304
<!ELEMENT PreferredSummaryTheme(# PCDATA)>    }3305
<!ATTLIST PreferredSummaryTheme
    xml:lang CDATA # IMPLIED
    3306
    preferenceValue CDATA "100"
>        3307
<!ELEMENT SummaryDuration(# PCDATA)>    }3308
```

FIG. 33

```
<UserPreference>  }3400
<UserIdentifier protected="true"userName="Bob"/>  }3401
<UsagePrerferences allowAutomaticUpdate="false">  }3402
<BrowsingPreferences protected="true">  }3403
  <SummaryPreferences>  }3404a
    <PreferredSummaryTheme
    preferenceValue="500">Nakata</PreferredSummaryTheme>  }3405a
    <PreferredSummaryTheme
    preferenceValue="400">Soccer</ PreferredSummaryTheme>  }3406a
    <PreferredSummaryTheme
    preferenceValue="200">Japan</PreferredSummaryTheme>  }3407a
    <SunmaryDuration>PT5M</SummaryDuration>  }3408a
  </SummaryPreferences>
<SummaryPreferences>  }3404b
<PreferredSummaryTheme
  preferenceValue="500">Headline</PreferredSummaryTheme>  }3405b
  <PreferredSummaryTheme
  preferenceValue="500">Stock</PreferredSummaryTheme>  }3406b
    <PreferredSummaryTheme
    preferenceValue="300">Sports</PreferredSummaryTheme>  }3407b
    <SunmaryDuration>PT3M</SummaryDuration>  }3408b
  </SummaryPreferences>
</BrowsingPreferences>
</UsagePreferences>
</UserPreferences>
```

FIG. 34

```
<!--################################################-->
<!-- Definition of the AudioVisualSegment DS        -->
<!--################################################-->
<!ELEMENT AudioVisualSegment (PointOfView*,MediaTime)>   }3501
                 3502           3503      3504
<!ATTLIST AudioVisualSegment
  id    ID    # REQUIRED      }3505
  href  CDATA # IMPLIED        }3506
  idref CDATA # IMPLIED        }3507
>

<!--################################################-->
<!-- Definition of the PointOfView DS               -->
<!--################################################-->
<!--main definition of the PointOfView DS-->
<! ELEMENT PointOfView (SupplementalInfo?,Value+)>  }3508
<! ATTLIST PointOfView       3509         3510
  id ID # IMPLIED}  3511
  viewPoint CDATA # REQUIRED } 3512
>
<!--definition of Value D-->
<! ELEMENT Value(# PCDATA) } 3513
<! ATTLIST Value
  id ID # IMPLIED           } 3514
>
```

FIG. 35

```
<!--################################################-->
<!-- Definition of the SupplementalInfo DS        -->
<!--################################################-->
<!ELEMENT SupplementalInfo((FreeTextAnnotation |     } 3601
                                        3602
StructuredAnnotation)+)>
            3602
<!--Definition of the FreeTextAnnotation DS-->
<!ELEMENT FreeTextAnnotation (#PCDATA)>    } 3604
<!ATTLIST FreeTextAnnotation
    xml:lang CDATA #IMPLIED                } 3605

>
<!--Definition of the StructuredAnnotation DS-->
<!ELEMENT StructuredAnnotation(Who? | WhatObject? |   } 3606
                                3607      3608
WhatAction? | Where? | When? | Why?)*>
    3609       3610    3611    3612
<!ELEMENT Who(#PCDATA)>          } 3613
<!ELEMENT WhatObject(#PCDATA)>   } 3614
<!ELEMENT WhatAction(#PCDATA)>   } 3615
<!ELEMENT Where(#PCDATA)>        } 3616
<!ELEMENT When(#PCDATA)>         } 3617
<!ELEMENT Why(#PCDATA)>          } 3618
<!ATTLIST StructuredAnnotation
    id ID #IMPLIED               } 3619
    xml:lang CDATA #IMPLIED      } 3620
>
```

FIG. 36

```
<!-############################################################-->
<!--Definition of the MediaTime DS                           -->
<!-############################################################-->
<!ELEMENT MediaTime (MediaTimePoint,MediaDuration)>   } 3701
                    ‾‾‾‾‾‾‾‾‾‾‾‾‾‾  ‾‾‾‾‾‾‾‾‾‾‾‾‾
                         3702            3703

<!-############################################################-->
<!--Definition of the MediaTimePoint D                       -->
<!-############################################################-->
<!ELEMENT MediaTimePoint (# PCDATA) >   } 3704

<!-############################################################-->
<!--Definition of the MediaDuration D                        -->
<!-############################################################-->
<!ELEMENT MediaDuration (# PCDATA)>   } 3705
```

FIG. 37

```
<AudioVisualSegment>

<PointOfView id="1" viewPoint="TeamA">
                 ‾‾‾
                 1701
    <Value> 5 </Value>
           ‾‾‾
           1702
    </PointOfView>

•••

</AudioVisualSegment>
```
} 1602

```
<AudioVisualSegment>

<PointOfView>

<Value idref="1" >2</Value>
       ‾‾‾‾‾‾   ‾
        1703   1704
</PointOfView>

•••

</AudioVisualSegment>
```
} 1603

FIG. 38

```
<PointOfView>
    <viewPoint id="1">A</viewPoint>   }1802a
    <viewPoint id="2">B</viewPoint>   }1802b   }1801
    <viewPoint id="3">C</viewPoint>   }1802c
</PointOfView>

<AudioVisualSegment>
    <PointOfView idref="1">
        <Value>2</Value>
    </PointOfView>                              }1803
    ...
</AudioVisualSegment>

<AudioVisualSegment>
    <PointOfView idref="2">
        <Value>3</Value>
    </PointOfView>                              }1804
    ...
</AudioVisualSegment>

<Audio VisualSegment>
    <PointOfView idref="3">
        <Value>4</Value>
    <PointOfView>                               }1805
</AudioVisualSegment>
```

FIG. 39

```
<PointOfView>
    <viewPoint id="1">A</viewPoint>  } 2102a
                2301
    <viewPoint id="2">B</viewPoint>  } 2102b         } 2101
                2302
    <viewPoint id="3">C</viewPoint>  } 2102c
                2303
</PointOfView>

<AudioVisualSegment>

<PointOfView viewPoint="A">
                        2106
        <Value>5</Value>
              2107
    </PointOfView>                                   } 2103

...
</AudioVisualSegment>

<AudioVisualSegment>

<PointOfView viewPoint="B">
                        2108
        <Value>3</Value>
              2109
    </PointOfView>                                   } 2104

...
</AudioVisualSegment>

<AudioVisualSegment>

<PointOfView viewPoint="C">
                        2110
        <Value>4</Value>
              2111
    </PointOfView>                                   } 2105

</AudioVisualSegment>
```

FIG. 41

```
<PointOfView  viewPoint="TeamA">                    ⎫
    <Value idref="1">3</Value>                      ⎪
          ‾2203a‾  ‾2204a‾                          ⎪
    <Value idref="2">2</Value>                      ⎬ 2202a
          ‾2203b‾  ‾2204b‾                          ⎪
    <Value idref="n">5</Value>                      ⎪
          ‾2203c‾  ‾2204c‾                          ⎪
</PointOfView>                                      ⎭

<PointOfView  viewPoint="TeamB">                    ⎫
    <Value idref="2">4<Value>                       ⎪
          ‾2203d‾  ‾2204d‾                          ⎪
    <Value idref="3">5</Value>                      ⎬ 2202b
          ‾2203e‾  ‾2204e‾                          ⎪
    <Value idref="1">2</Value>                      ⎪
          ‾2203f‾  ‾2204f‾                          ⎪
</PointOfView>                                      ⎭

<AudioVisualSegment  id="1">                        ⎫
...                                                 ⎬ 2201a
</AudioVisualSegment>                               ⎭

<AudioVisualSegment  id="2">                        ⎫
...                                                 ⎬ 2201b
</AudioVisualSegment>                               ⎭

<AudioVisualSegment  id="3">                        ⎫
...                                                 ⎬ 2201c
</AudioVisualSegment>                               ⎭
```

FIG. 42

```
<PointOfView  viewPoint="TeamA">
    <Value  id ="p101"  idref="1">3</Value>
          ⎵         ⎵       ⎵
         2503a     2403a   2404a
    <Value  id="p102"  idref="2">2</Value>
          ⎵         ⎵       ⎵
         2503b     2403b   2404b
    <Value  id ="p103"  idref="n">5</Value>
          ⎵          ⎵       ⎵
         2503c      2403c   2404c
</PointOfView>
```
⎫
⎬ 2402a
⎭

```
<PointOfView  viewPoint="TeamB">
    <Value  id ="p201"  idref="2">4</Value>
          ⎵          ⎵       ⎵
         2503d      2403d   2404d
    <Value  id="p202"  idref ="3">5</Value>
          ⎵          ⎵       ⎵
         2503e      2403e   2404e
    <Value  id="p203"  idref="1">2<Value>
          ⎵         ⎵       ⎵
         2503f     2403f   2404f
</PointOfView>
```
⎫
⎬ 2402b
⎭

```
<AudioVisualSegment  id="1">
                       ⎵
                      2501a
    </PointOfView>

<Value  idrefs="p101  p203">
                   ⎵      ⎵
                  2502a  2502b
    </PointOfView>
    ...
</AudioVisualSegment>
```
⎫
⎬ 2401a
⎭

```
<AudioVisualSegment  id="2">
                       ⎵
<PointOfView>         2501b <Value  idrefs="p102  p201">
                   ⎵      ⎵
                  2502c  2502d
    </PointOfView>
    ...
</AudioVisualSegment>
```
⎫
⎬ 2401b
⎭

FIG. 43

```
<AudioVisualSegment id="3">     2501c
    <PointOfView>
    <Value idrefs="p202">              } 2402c
              2502e
    </PointOfView>
    ...
</AudioVisualSegment>
```

FIG. 44

```
<PointOfView viewPoint="TeamA">
    <Value idref="1"/>           } 2603a
           2702a
    <Value idref="n"/>           } 2603b
           2702b
    <Value idref="2"/>           } 2603c
           2702c
</PointOfView>
```
} 2602a

```
<PointOfView viewPoint="TeamB">
    <Value idref="2"/>           } 2603d
           2702d
    <Value idref="3"/>           } 2603e
           2702e
    <Value idref="1"/>           } 2603f
           2702f
</PointOfView>
```
} 2602b

```
<AudioVisualSegment id="1">
                    2701a
...
</AudioVisualSegment>
```
} 2601a

```
<AudioVisualSegment id="2">
                    2701b
...
</AudioVisualSegment>
```
} 2601b

```
<AudioVisualSegment id="3">
                    2701c
...
</AudioVisualSegment>
```
} 2601c

FIG. 45

```
<PointOfView viewPoint="TeamA">
   <Value idref="3 1"/>
         2803a 2803c
   <Value idref="2"/>
         2803b
</PointOfView>
```
} 2802

```
<AudioVisualSegment id="1">
       2901a
...
</AudioVisualSegment>
```
} 2601a

```
<AudioVisualSegment id="2">
       2901b
...
</AudioVisualSegment>
```
} 2601b

```
<AudioVisualSegment id="3">
       2901c
...
</AudioVisualSegment>
```
} 2601c

FIG. 46

```
<!-##############################################################-->
<!-- Definition of UserPreferences DS                          -->
<!-##############################################################-->

<element name="UserPreference"
                 3201
 type="mpeg7:UserPreferenceType"/>

<complexType name="UserPreferenceType">

<element name="UserIdentifier" type="mpeg7:UserIdentifierType"
   minOccurs="1" maxOccurs="1"/>                                    } 3202

<element name="UsagePreferences"
   type="mpeg7 : UsagePreferencesType"                              } 3203
   minOccurs="0" maxOccurs="1"/>

</complexType>
```

FIG. 47

```
<!--##############################################################-->
<!--    Definition of UsagePreferences DS             -->
<!--##############################################################-->

<element name="UsagePreference"
                    3203
  type ="mpeg7:UserPreferenceType"/>

<complexType name="UserPreferenceType">

<element name="FilteringAndSearchPreferences"
                          4802                        ⎫
    type="mpeg7:FilteringAndSearchPreferencesType"    ⎬ 4801
    minOccurs ="0" maxOccurs="unbounded"/>            ⎭

<element name="BrowsingPreference"
                      3207                    ⎫
    type="mpeg7:BrowsingPreferenceType"        ⎬ 4803
    minOccurs="0" maxOccurs="unbounded"/>      ⎭

<attribute name = "allowAutomaticUpdate"
                      3208
    type="mpeg7:allowAutomaticUpdateType"
    use="default" value="false"/>
</complexType>
```

FIG. 48

```
<!-- ################################################################ -->
<!--     Definition of BrowsingPreferences DS                         -->
<!-- ################################################################ -->

<element name="BrowsingPreferences"
    type="mpeg7:BrowsingPreferencesType"/>
<complexType name="BrowsingPreferencesType">
    <element name="SummaryPreferences"
                      3210
        type="mpeg7:SummaryPreferencesType"
        minOccurs="0"  maxOccurs="unbounded"/>                } 4900
    <element name="PreferenceCondition"
        type="mpeg7:PreferenceConditionType"
                       4902                                   } 4901
        minOccurs="0" maxOccurs="unbounded"/>
    <attribute name="protected" type="mpeg7:protectionType"
                       3211
        use="default"
        value = true"/>
    </attribute name="preferenceValue" type="integer" use="default"
                       3212
        value ="100"/>
</complexType>
```

FIG. 49

```
<!--###########################################-->
<!--      Definition of SummaryPreferences DS     -->
<!--###########################################-->

<simpleType name="summaryComponentType" base="string">
    <enumeration value="visual"/>
    <enumeration value="visual/keyFrames"/>
    <enumeration value="visual/keyVideoClips"/>
    <enumeration value="visual/keyThemes"/>
    <enumeration value="audio"/>
    <enumeration value="audio/keySounds"/>
    <enumeration value="audio/keyAudioClips"/>
    <enumeration value="audio/keyThemes"/>
    <enumeration value="textual"/>
    <enumeration value="textual/keyThemes"/>
</simpleType>
```
⎫
⎬ 5003
⎭

```
<element name="SummaryPreferences"
                    3210
type="mpeg7:SummaryPreferencesType"/>
<complexType name="SummaryPreferencesType">
    <element name="SummaryTypePreferences" minOccurs="0"
maxOccurs="unbounded">  5001
        <complexType base="mepeg7:summaryComponentType"
derivedBy = "extension">
```
⎫
⎬ 5002
⎭

```
        <attribute name="preferenceValue" type="integer" use="default"
value="100"/>       3304
        </complexType>
    </element>
    <element name="PreferredSummaryTheme" minOccurs="0"
                            3302
```

FIG. 50

```
<complexType base="mpeg7 : TextualType"derivedBy="extension">
  <attribute name="preferenceValue" type = integer" use = default"
value="100"/>           3307
  </complexType>
</element>
<element name="summaryDuration"
type="mpeg7:mediaDurationType"              } 3303
  minOccurs="0"maxOccurs="1"/>
<element name="MinSummaryDuration"
type="mpeg7:mediaDurationType"              } 5101
  minOccurs="0"maxOccurs="1"/>
<element name="MaxSummaryDuration"
type="mpeg7:mediaDurationType"              } 5102
  minOccurs="0"maxOccurs="1"/>
<element name="NumOfKeyframes"type="positiveInteger"
  minOccurs="0"maxOccurs="1"/>              } 5103
<element name="MinNumOfKeyframes"type="positiveInteger"
  minOccurs="0"maxOccurs="1"/>              } 5104
<element name "MaxNumOfKeyframes"type ="positiveInteger"
  minOccurs="0"maxOccurs="1"/>              } 5105
<element name="NumOfChars"type="positiveInteger"
  minOccurs="0"maxOccurs="1"/w>             } 5106
<element name="MinNumOfChars"type="positiveInteger"
  minOccurs="0"maxOccurs="1"/>              } 5107
<element name="MaxNumOfChars"type="positiveInteger"
  minOccurs="0"maxOccurs="/1">              } 5109
<attribute name="preferenceValue"type = integer" use = default"
value="100"/>                               } 5110
</complexType>
```

FIG. 51

```
<UserPreference>              } 5200
    <UserIdentifier protected="true">           } 5201
        <UserName xml:lang="en">Mike</UserName>
    <UserIdentifier>
    <UsagePreferences allowAutomaticUpdate="false">   } 5202
        <BrowsingPreferences protected="true"         } 5203
            <SummaryPreferences>                      } 5204
                <PreferredSummaryTheme >Free –        } 5205
kicks</PreferredSummaryTheme>
                <PreferredSummaryTheme>Goals</PreferredSumm  } 5206
aryTheme>
                <SummaryDuration>PT5M</SummaryDuration>  } 5208
            </SummaryPreferences>
        </BrowsingPreferences>
<UserPreference>
```

FIG. 52

```
<!--############################################################-->
<!--Definition of "Segment DS"                                  -->
<!--############################################################-->
<element name="Segment"type="mpeg7:SegmentType"/         ⎫
<!--Definition of the Segment itself-->                   ⎬ 5300
<complexType name="SegmentType"abstract="true">           ⎪
<choice minOccurs="0"maxOccurs="1">                       ⎭
<element name="MediaInformation"                          ⎫
type="mpeg7:MediaInformationType"                         ⎬ 5301
  minOccurs="0"maxOccurs="1"/>                            ⎭
<element name="MediaLocator"type="mpeg7:MediaLocatorType"/> ⎫ 5302
</choice>                                                  ⎭
<element name="CreationInformation"                       ⎫
   type="mpeg7:CreationInformationType"minOccurs="0"      ⎬ 5303
maxOccurs="1"/>                                           ⎭
<element name="UsageInformation"                          ⎫
type="mpeg7:UsageInformationType"                         ⎬ 5304
minOccurs ="0"maxOccurs="1"/>                             ⎭
<element name="TextAnnotation"                            ⎫
type="mpeg7:TextAnnotationType"                           ⎬ 5305
minOccurs="0"maxOccurs="unbounded"/>                      ⎭
```

FIG. 53

```
<element name="PointOfView"type="mpeg7:PointOfNiewType"
minOccurs="0"                                              } 5307
maxOccurs="unbounded"/>
<element name="SegmentDecomposition"
type="mpeg7:SegmentDecompositionType"                      } 5308
   minOccurs="0"maxOccurs="unbounded"/>
<attribute  name ="id"type ="ID"use ="required"/>          } 5311
<attribute  name="href"type="uriReference"use="optional"/> } 5312
<attribute  name="idref"type="IDREF">
<refEltName="mpeg7:Segment"use="optional"/>                } 5313
</complexType>
</Segment>
```

FIG. 54

```
<!--##############################################-->
<!--Definition of AudioVisualSegment DS           -->
<!--##############################################-->

<element name="AudioVisualSegment"
type="mpeg7:AudioVisualSegmentType"
  equivClass="mpeg7:Segment"/>
<complexType name="AudioVisualSegmentType"
base="mpeg7 : SegmentType"
    derivedBy="extension">                          } 5501

<element name="MediaTime" type="mpeg7:MediaTimeType"
minOccurs="1"
maxOccurs="1"/>                                     } 5502

<!--Restriction of refEltName to AudioVisualSegment DS-->
<attribute name="idref" type="IDREF"
refEltName="mpeg7:AudioVisualSegment"
use="optional"/>                                    } 5504
</complexType>
```

FIG. 55

```
<!--################################################################-->
<!--Definition of PointOfView DS                                    -->
<!--################################################################-->

<!--Primitive Importance type definition-->
<complexType name="PrimitiveImportanceType"
base="mpeg7:zeroToOneType"
  derivedBy="extension">
<attribute name="idref" type="IDREF" use="optional"/>
</complexType>

<element name="PointOfView" type="mpeg7:PointOfViewType"/>
<!--Definition of PointOfView type-->
<complexType name="PointOfViewType">
<element name="SupplementalInfo"
type="mpeg7 : TextAnnotationType"
  minOccurs="0" maxOccurs="1"/>
<element name="Value" type="mpeg7:PrimitiveImportanceType"
  minOccurs="1" maxOccurs="unbounded"/>
<attribute name="id" type="ID" use="optional"/>
<!--To accommodate specific semantic viewpoint-->
<attribute name="viewPoint" type="string" use="required"/
</complexType>
```

FIG. 56

```
<!--Description of PointOfView DS embedded in video structure-->
<AudioVisualSegment id="FootBallGame">                  }5700
    <SegmentDecomposition decompositionType="temporal">    }5701a
        <AudioVisualSegmwnt id="seg1">
            <PointOfView viewPoint="TeamA">
                <Value>0.3</Value>                      }5703a
            </PointOfView>
                                                                        }5702a
            <PointOfView viewPoint="TeamB">
                <Value>0.7</Value>                      }5703b
            </PointOfView>
            <MediaTime>...</MediaTime>                  }5704a
        </AudioVisualSegment>
        <AudioVisualoSegment id="seg2">
            <PointOfView viewPoint="TeamA">
                <Value>0.5</Value>                      }5703c
            </PointOfView>                                                }5702b
            <MediaTime>...</MediaTime>                  }5704b
        </AudioVisualSegment>
            :
        </AudioVisualSegment id="seg20">
            <PointOfView viewPoint="TeamA">
                <Value>0.8</Value>                      }5703d
            <PointOfView>
                                                                         }5702c
            <PointOfView viewPoint="TeamB">
                <Value>0.2</Value>                      }5703e
            <PointOfView>
```

FIG. 57

```
            <MediaTime>...</MediaTime>        } 5704c  )
        </AudioVisualSegment>                          } 5702c
            .                                          )
            .
</SegmentDecomposition>

<SegmentDecomposition decompositionType="temporal">   } 5701b
    <AudioVisualSegment id="2seg1">                          )
        <PointOfView viewPoint="TeamA">          )               )
            <Value>0.3</Value>                   } 5703f         } 5702d
        </PointOfView>                           )               )
        <MediaTime>...</MediaTime>               } 5704d         )
    </AudioVisualSegment>                                        )
    <AudioVisualSegment id="2seg2">                   )
        <PointOfView viewPoint="TeamA">          )    )
            <Value>0.5</Value>                   } 5703g  } 5702g
        </PointOfView>                           )    )
        <MediaTime>...</MediaTime>               } 5704e )
    </AudioVisualSegment>                             )
        .
        .
    <AudioVisualSegment id="2seg20">                  )
        <PointOfView viewPoint="TeamA">          )    )
            <Value>0.8</Value>                   } 5703h  } 5702f
        </PointOfView>                           )    )
        <MediaTime>...</MediaTime>               } 5704f )
    </AudioVisualSegment>                             )
        .
        .
</SegmentDecomposition>
```

FIG. 58

```
        <MediaTime>...</MediaTime>
    </AudioVisualSegment>
```

FIG. 59

```
<!--Description of video structure-->
<VideoSegment id="FootBallGame">                }6000
    <SegmentDecomposition decompositionType="temporal">    }6001
        <VideoSegment id="seg1">
            <MediaTime>...</MediaTime>      }6004a  }6002a
        </VideoSegment>
        </VideoSegment id="seg2">
            <MediaTime>...</MediaTime>      }6004b  }6002b
        </VideoSegment>
            .
            .
        <VideoSegment id="seg20">
            <MediaTime>...</MediaTime>      }6004c  }6002c
        </VideoSegment>
            .
            .
    </SegmentDecomposition>
    <MediaTime>...</MediaTime>              }6004d
</VideoSegment>

<!--Description of PointOfView DS associated with video structure-->
<PointOfView viewPoint="Team A">            }6005
    <Value idref="seg1">0.3<Value>          }6006a
    <Value idref="seg2">0.5</Value>         }6006b
            .
            .
    <Value idref="seg20">0.8</Value>        }6006c
```

</PointOfView>

<PointOfView viewPoint="TeamB">          } 6008

<Value idref="seg1">0.7</Value>     } 6009a

⋮

<Value idref="seg20">0.2</Value>   } 6009b

⋮

</PointOfView>

FIG. 61

```
<!-################################################################-->
<!-- Definition of HierachicalSummary DS                         -->
<!-################################################################-->

<simpleType name="summaryComponentListType" base="string"
derivedBy="list">

<enumeration value="keyFrames"/>
<enumeration value="keyVideoClips"/>
<enumeration value="keyAudioClips"/>
<enumeration value="keyThemes"/>
<enumeration value="unconstrained"/>
</simpleType>

<element name="HierarchicalSummary"
type="mpeg7:HierarchicalSummaryType"/>
<complexType name="HierarchicalSummaryType"
base="mpeg7:SummaryType"
    derivedBy="extension">
```
} 6204

```
<element name="SummaryThemwList"
type="mpeg7:SummaryThemeListType"       } 6201
minOccurs="0"/>

<element name="HighlightLevel" type="mpeg7:HighlightLevelType"  } 6202
    maxOccurs="unbounded"/>

<attribute name="summaryComponentList"
type="mpeg7:summaryComponentListType"/>  } 6203

</complexType>
```

FIG. 63

```
<!-##################################################-->
<!-- Definition of SummaryThemeList DS              >
<!-##################################################-->

<element name="SummaryThemeList"              ⎫
 type="mpeg7:SummaryThemeListType"/>           ⎬ 6400
<complexType name="SummaryThemeListType">     ⎭
 <element name="SummaryTheme" maxOccurs="unbounded">  ⎫6401
  <complexType base="mpeg7:TextualType" derivedBy="extension">  ⎭
   <attribute name="id type"="ID"/>                }6202
   <attribut name="parentId" type="IDREF" use="optiomal"/>   }6203
  </complexType>
 </element>
</complexType>
```

FIG. 64

```
<!--##################################################-->
<!--   Definition of HighlightLevel DS              -->
<!--##################################################-->

<element name="HighlightLevel"
type="mpeg7:HighlightLeveType"/>                        ⎫ 6500
<complexType name="HighlightLevelType">                 ⎭
<element name="HighlightSegment"                        ⎫
type="mpeg7:HighlightSegmentType"                       ⎬ 6501
    maxOccurs="unbounded"/>                             ⎭
<element name="HighlightLevel" type="mpeg7:HighlightLevelType"   ⎫ 6502
    minOccurs="0" maxOccurs="unbounded"/>                        ⎭
<attribute name="name" type="string" use="required/">   } 6503
<attribute name="level" type="integer" use="optional">  } 6504
   <attribute name="duration" type="mpeg7:mediaDurationType"    ⎫ 6505
use="optional"/>                                                ⎭
   <attribute name="themeIds" type="IDREFS" use="optional"/>    } 6506
</complexType>
```

FIG. 65

```
<SummaryThemeList>                                                    ⎫ 6600
                                                                      ⎭
    <SummaryTheme  xml : lang="en"                                    ⎫
                      6602a                                           ⎬ 6601a
    id="item0">baseball</SummaryTheme>                                ⎭
      6603a       6604a
    <SummaryTheme  xml:lang="en" id="item01"                          ⎫
                      6602b        6603b                              ⎬ 6601b
    parentId="item0">home  run</SummaryTheme>                         ⎭
       6605b           6604b
    <SummaryTheme  xml:lang="en",                                     ⎫
       6605b           6602c                                          ⎬ 6601c
    id="item1">basketball</SummaryTheme>                              ⎭
      6603c       6604c
    <SummaryTheme  xml:lang="en" id="item11"                          ⎫
                      6602d         6603d                             ⎬ 6601d
    parentId="item1">three – point</SummaryTheme>                     ⎭
       6605d          6604d
    <SummaryTheme  xml:lang="en" id="item12" parentId="item1">slam    ⎫
                      6602e        6603e              6605e     6604e ⎬ 6601e
    dunk</SummaryTheme>                                               ⎭
    6604e
    <SummaryTheme  xml:lang="en",                                     ⎫
                      6602f                                           ⎬ 6601f
    id="item2">soccer</SummaryTheme>                                  ⎭
       6603f       6604f
<SummaryThemeList>
```

FIG. 66

```
<HierarchicalSummary name="keyThemesSummary001"
summaryComponentList="keyVideoClips keyThemes">     } 6700
<SourceInformation idref="mediainstance1"/>
  <SummaryThemList>
    <SummaryTheme xml:lang="ed"id="E0">slam dunk      } 6703a
    </SummaryTheme                                              } 6701
    <SummaryTheme xml:lang="ed"id="E1">3- point shots } 6703b
    </SummaryTheme
  </SummaryThemeList>
    <HighlightLevel name="summary001"themeIds="E0">
      <HighlightSegment>...</HighlightSegment> 6705a
      <HighlightSegment>...</HighlightSegment>              } 6704a } 6702a
      <HighlightSegment>...</HighlightSegment>
      <HighlightSegment>...</HighlightSegment>
    </HighlightLevel>
    <HighlightLevel name="summary002"themeIds="E1",
      <HighlightSegment>...</HighlightSegment> 6705b
      <HighlightSegment>...</HighlightSegment>              } 6704b } 6702b
      <HighlightSegment>...</HighlightSegment>
    </HighlightLevel>
</HierarchicalSummary>
```

FIG. 67

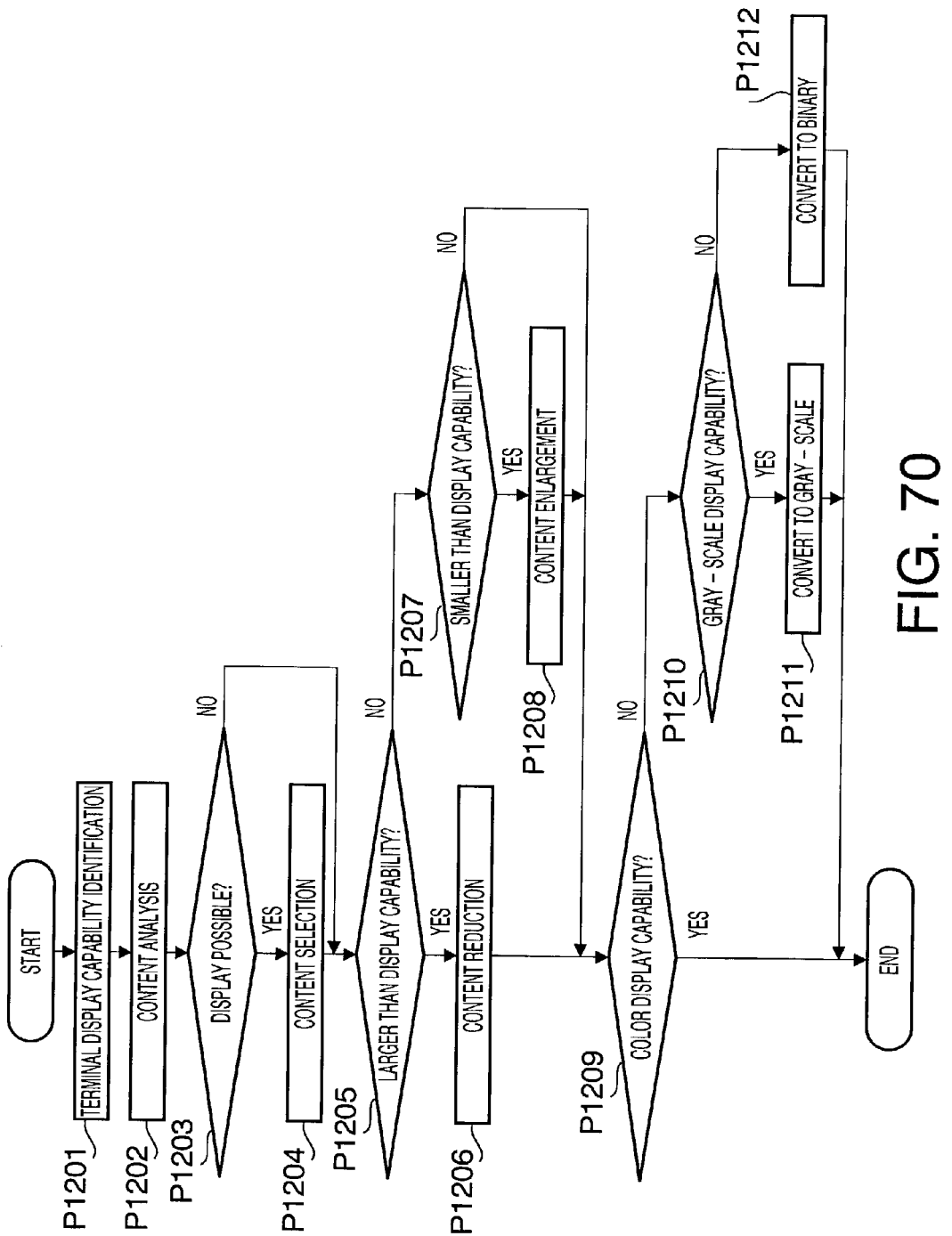

DATA ADAPTING DEVICE, DATA ADAPTING METHOD, STORAGE MEDIUM, AND PROGRAM

TECHNICAL FIELD

The present invention relates to a data adaptation apparatus and data adaptation method for adapting data to the preferences of a user, and a recording medium that includes a data adaptation apparatus. In particular, the present invention relates to a data adaptation apparatus for data including video, audio, and documents provided via broadcasting or communication media such as digital broadcasting or the Internet.

BACKGROUND ART

In recent years, there has been an active trend of digitalization of broadcasting, and fusion with communications has also progressed. In the field of communications, satellite digital broadcasting has already been started, and it is expected that terrestrial broadcasting will also be digitalized in the future. As a result of digitalization of broadcast contents, data broadcasting is also performed in addition to conventional video and audio. Products that realize the concept of storing television broadcasts on a hard disk and playing them back later (TV Anytime), such as TiVo (www.tivo.com) and ReplayTV (www.replaytv.com), are also on the market in the United States. Also, in the communications field, digital content distribution via the Internet has begun with music, and the number of Internet broadcasting stations that broadcast video is also increasing. In addition, access to Internet content has also been made possible for portable terminals through wideband access networks and connection to the Internet.

Amid such dramatic changes in information infrastructure, it is envisaged that henceforth it will become possible for users to easily access enormous information sources including video, audio, documents, and the like. Due to the fusion and digitalization of communications and broadcasting in this way, it has become difficult for users to handle enormous information sources without selectively transmitting and replaying only information that accords with the preferences of a user by using metadata that describes content. As shown in "Adapting Multimedia Internet Content For Universal Access" (IEEE Transactions on Multimedia, March 1999, pp.104-114), there have been proposed a description scheme for distributing one content to various terminals such as televisions and portable terminals, and accessing rich content on the Internet from an HHC (Hand Held Computer), PDA (Personal Digital Assistant), Smart Phone, or the like, and a method for converting (performing data adaptation of) Internet content according to the display capability of a terminal (for example, by changing the display size or number of display colors).

A conventional data adaptation apparatus will be described below. FIG. 68 shows a block diagram of a conventional data adaptation apparatus. A conventional data adaptation apparatus consists of a data adaptation section 100, a policy engine 101, a content analysis section 102, a content selection section 103, a content manipulation section 104, and a terminal 105. Internet content d1001 is input to the content analysis section 102. Terminal preferences d1002 that indicate terminal 105 performance information are stored in the terminal 105.

FIG. 69 is a detailed drawing of terminal preferences d1002. Terminal preferences d1002 contain screen color number information x and screen size information axb indicating the display capability of the terminal 105.

The operation of a data adaptation section configured as described above will be described below using FIG. 70. FIG. 70 is processing flowchart that describes the operation of the data adaptation section 100.

The policy engine 101 identifies the display screen size and number of display colors as the terminal capability according to terminal preferences d1002 obtained from the terminal 105 (P1201). The policy engine 101 then controls the content selection section 103 and content manipulation section 104 according to the information and policy identified in P1201.

The content analysis section 102 analyzes the physical data type of Internet content d1001 requested by the user (P1202). Then, the content selection section 103 judges whether display of the Internet content d1001 is possible with the display capability of the terminal 105 (P1203), and if the capability is sufficient to display the Internet content d1001, selects only content that can be displayed with the terminal capability from the Internet content d1001 (P1204).

Then, the content manipulation section 104 further converts the displayable content selected in P1204 to a form that can be displayed with the terminal capability. Specifically, the content selection section 103 judges whether the content is larger than the display screen size (P1205), and content larger than the display screen size is reduced in size by the content manipulation section 104 (P1206). If the content is not larger than the display screen size, the content manipulation section 104 judges whether the content is smaller than the display capability (P1207), and small content is enlarged by the content manipulation section 104 (P1208).

The content manipulation section 104 also judges whether the number of display colors of the terminal 105 are colors (P1209). Then, if the number of display colors of the terminal 105 are not colors, the content manipulation section 104 judges whether they are gray-scale (P1210), and if they are gray-scale, converts the content number of colors to gray-scale (P1211), and if they are neither colors nor gray-scale, performs binary conversion (P1212).

However, with the above-described conventional technology, a general policy is carried out-that is, selection and manipulation of content based on the result of content analysis in accordance with a policy suited to a specific terminal. Consequently, there is a problem in that it is only possible to perform data adaptation according to a predetermined fixed number of terminal patterns.

Also, with the conventional technology, it is not possible to perform selection and manipulation of content according to the preferences of the user: for example, selection and manipulation to display part of an image rather than reducing it in size. Therefore, with the conventional technology, even in a case where content selection and manipulation are performed using a predetermined specific terminal, there is a problem in that the user cannot perform data adaptation of content in a form according to his or her preferences using that terminal.

DISCLOSURE OF INVENTION

It is a first objective of the present invention to perform data adaptation of content in a form according to the user's preferences by selecting a data segment according to user preference information.

It is a second objective of the present invention to perform data adaptation of content, when content is distributed via a network, in a form in which the user wishes to receive it and in a scalable fashion according to the network status.

In order to meet the above-described first objective, the present invention performs data adaptation in a form the user wishes to see for each content by holding user preference information as user preferences, selecting a data segment according to the user preferences, and performing resolution conversion on the basis of the segment priority and terminal capability. By this means, it is possible to perform data adaptation fully in accordance with the user's preferences.

Also, in order to meet the above-described second objective, the present invention performs data adaptation of content in a form in which the user wishes to receive it and in a scalable fashion according to the network status by acquiring information on the network transmission band as a network preference when content is distributed via a network, and adjusting the data quantity according to the segment priority and transmission band. By this means, it is possible to perform data adaptation in a form in which the user wishes to receive it and in a scalable fashion according to the network status.

BRIEF DESCRIPTION OF DRAWINGS

FIG. 3 is a drawing showing description definitions of user preferences according to Embodiment 1;

FIG. 4 is a drawing showing a sample description of user preferences according to Embodiment 1;

FIG. 11 is a detailed drawing showing second description definitions of user preferences;

FIG. 12 is a detailed drawing showing a second sample description of user preferences;

FIG. 19 is a drawing showing an example of data descriptions according to Embodiment 5 of the present invention;

FIG. 23 is a drawing showing an example of data descriptions according to Embodiment 6 of the present invention;

FIG. 25 is a drawing showing data descriptions according to Embodiment 7 of the present invention;

FIG. 27 is a drawing showing another example of descriptions of a data structure according to Embodiment 7 of the present invention;

FIG. 29 is a drawing showing data descriptions according to Embodiment 8 of the present invention;

FIG. 31 is a drawing showing another example of descriptions of a data structure according to Embodiment 8 of the present invention;

FIG. 32 is a first drawing showing description definitions of user preferences according to Embodiment 9 of the present invention;

FIG. 33 is a second drawing showing description definitions of user preferences according to Embodiment 9 of the present invention;

FIG. 34 is a drawing showing a sample description of user preferences according to Embodiment 9 of the present invention;

FIG. 35 is a first drawing showing segment description definitions according to Embodiment 9;

FIG. 36 is a second drawing showing segment description definitions according to Embodiment 9;

FIG. 37 is a third drawing showing segment description definitions according to Embodiment 9;

FIG. 38 is a drawing showing a first sample segment description according to Embodiment 9;

FIG. 39 is a drawing showing a second sample segment description according to Embodiment 9;

FIG. 41 is a drawing showing a fourth sample segment description according to Embodiment 9;

FIG. 42 is a drawing showing a fifth sample segment description according to Embodiment 9;

FIG. 43 is a drawing showing a sixth sample segment description according to Embodiment 9;

FIG. 44 is a drawing showing a seventh sample segment description according to Embodiment 9;

FIG. 45 is a drawing showing an eighth sample segment description according to Embodiment 9;

FIG. 46 is a drawing showing a ninth sample segment description according to Embodiment 9;

FIG. 47 is a first drawing showing user preference description definitions according to Embodiment 10 of the present invention;

FIG. 48 is a second drawing showing user preference description definitions according to Embodiment 10;

FIG. 49 is a third drawing showing user preference description definitions according to Embodiment 10;

FIG. 50 is a fourth drawing showing user preference description definitions according to Embodiment 10;

FIG. 51 is a fifth drawing showing user preference description definitions according to Embodiment 10;

FIG. 52 is a drawing showing a sample user preference description according to Embodiment 10;

FIG. 53 is a first drawing showing segment description definitions according to Embodiment 10;

FIG. 54 is a second drawing showing segment description definitions according to Embodiment 10;

FIG. 55 is a third drawing showing segment description definitions according to Embodiment 10;

FIG. 56 is a fourth drawing showing segment description definitions according to Embodiment 10;

FIG. 57 is a first drawing showing a sample segment description according to Embodiment 10;

FIG. 58 is a second drawing showing a sample segment description according to Embodiment 10;

FIG. 59 is a third drawing showing a sample segment description according to Embodiment 10;

FIG. 60 is a first drawing showing another example of a segment description according to Embodiment 10;

FIG. 61 is a second drawing showing another example of a segment description according to Embodiment 10;

FIG. 62 is a first drawing showing digest description definitions according to Embodiment 11;

FIG. 63 is a second drawing showing digest description definitions according to Embodiment 11;

FIG. 64 is a third drawing showing digest description definitions according to Embodiment 11;

FIG. 65 is a fourth drawing showing digest description definitions according to Embodiment 11;

FIG. 66 is a drawing showing an example of a point of view list description according to an embodiment;

FIG. 67 is a drawing showing an example of a digest description according to Embodiment 11;

FIG. 70 is a processing flowchart of a conventional data adaptation section.

BEST MODE FOR CARRYING OUT THE INVENTION

With reference now to the attached drawings, embodiments of the present invention will be explained in detail below.

(Embodiment 1)

Figure 1:
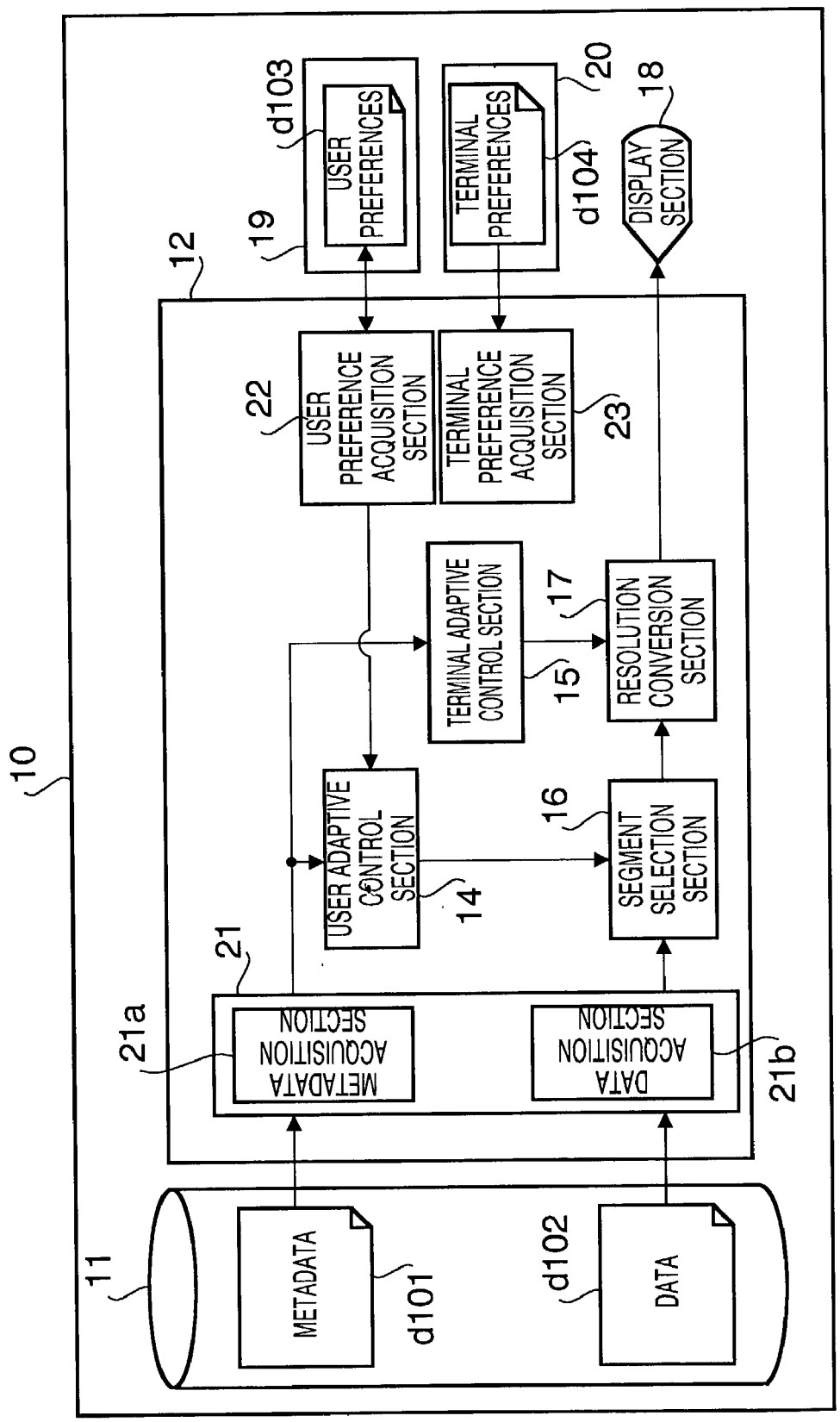
FIG. 1 is a block diagram of a terminal provided with a data adaptation apparatus according to Embodiment 1 and Embodiment 3 of the present invention.

A terminal provided with a data adaptation apparatus according to Embodiment 1 of the present invention will be described below. FIG. 1 is a block diagram of a terminal provided with a data adaptation apparatus according to Embodiment 1. As shown in FIG. 1, a terminal 10 is composed of a content data storage medium 11 on which is stored data d102 consisting of content composed of a plurality of segments and metadata d101 which is information for describing the data d102, a user preference storage section 19 that stores user preferences d103 which comprise information relating to the user's preferences, a terminal preference storage section 20 that stores terminal preferences d104 which comprise terminal capability information, and a user adaptation section 12 that adapts the data d102 to the user's preferences using the metadata d101, user preferences d103, and terminal preferences d104.

The user adaptation section 12 is provided with means for acquiring various kinds of data. Provided as means for acquiring various kinds of data are a content data acquisition section 21 consisting of a metadata acquisition section 21a that acquires metadata d101 and a data acquisition section 21b that acquires data d102, a user preference acquisition section 22 that acquires user preferences d103, and a terminal preference acquisition section 23 that acquires terminal preferences d104.

In addition, the user adaptation section 12 is provided with means for selecting a predetermined segment from the data d102 acquired in accordance with the user's preferences and adapting it to the user's preferences. Provided as means for adapting a selected segment to the user's preferences are a user adaptive control section 14 that generates information for selecting a predetermined segment from acquired data d102 using acquired metadata d101 and user preference data d103, and a segment selection section 16 that selects and extracts a predetermined segment from acquired data d102 on the basis of information generated by the user adaptive control section 14.

Moreover, the user adaptation section 12 is provided with means for converting data d102 in accordance with the terminal capability of, for instance, a display section 18 which is a data d102 processing apparatus. Provided as means for converting data d102 in accordance with the terminal capability are a terminal adaptive control section 15 that generates information for varying the spatial resolution and color resolution of data d102 from metadata d101 and terminal preferences d104, and a resolution conversion section 17 that performs spatial resolution conversion and color resolution conversion for data d102 in accordance with information generated by the terminal adaptive control section 15.

Figure 2:
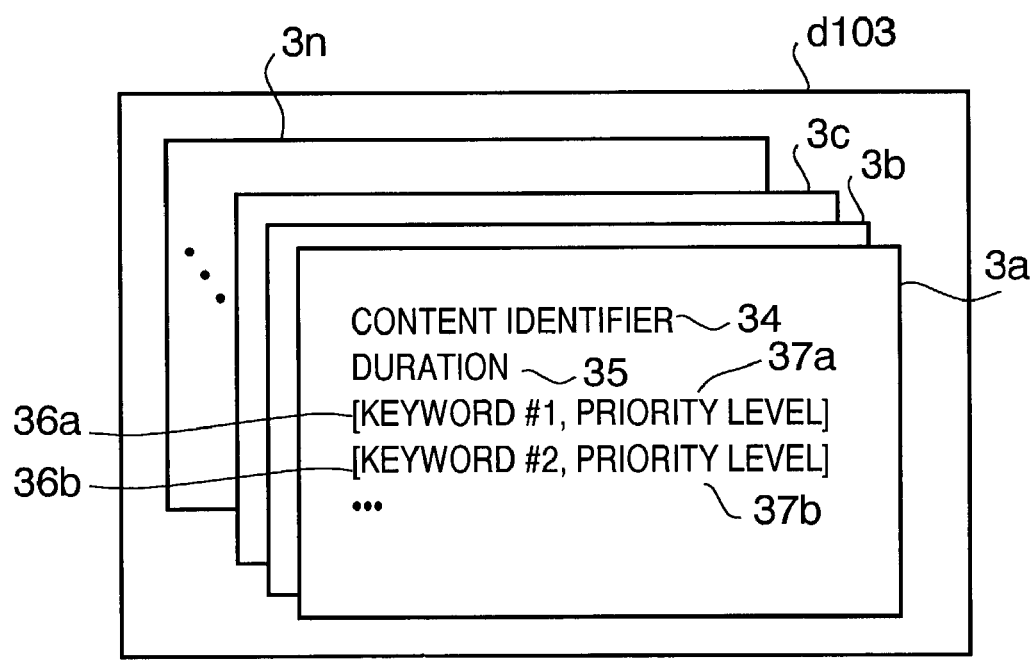
FIG. 2 is a detailed drawing of user preferences according to Embodiment 1.

Next, user preferences d103 will be described. FIG. 2 is a detailed drawing of user preferences d103. As shown in FIG. 2, user preferences d103 are composed of a plurality of user preference descriptions 3a to 3n. In user preference descriptions 3a to 3n are stored a plurality of content identifiers 34 corresponding to each of user preference descriptions 3a to 3n, duration information 35 for displaying content at a desired time, and sets of keywords (user points of view) 36a and 36b for extracting a desired segment from content and priority levels 37a and 37b corresponding to these keywords 36a and 36b.

Next, a definition description of user preferences d103 including user preference descriptions 3a to 3n will be described in concrete terms. FIG. 3 is a drawing showing a definition description of user preferences d103.

As shown in FIG. 3, the user preference description definition 40 is written using DTD (Document Type Definition) of XML (extensible Markup Language).

The user preference description definition 40 defines there being at least one content item (Content) in the user preferences as indicated by reference numeral 41 in the drawing. Also, it is defined that there is at least one keyword (user point of view) 36 (Keyword) for each content item as indicated by reference numeral 42 in the drawing. Further, a content identifier 34 (ContentID), duration 35 (Duration), and screen size 46 (ScreenSize) which is size information for displaying data, are defined for the content as attributes as indicated by reference numeral 43 in the drawing. Also, the keyword 36 (Keyword) is defined as being written as text data as indicated by reference numeral 48 in the drawing. In addition, it is defined that there is a priority level 37 (Priority) as an attribute for each keyword 36.

Next, user preferences created using the user preference description definition shown in FIG. 3 will be described. FIG. 4 is a drawing showing an example of user preferences.

In FIG. 4, the item denoted by reference numeral 50 is an example of an actual user preference description written in XML using user preference description definition 40.

User preferences 50 include two contents 51 and 52. Content 51 has a content ID 53a (in this example, 123456789), and content 52 has a content ID 53b (in this example, 123456788). Also, content 51 includes a display duration 54 (in this example, smpte=00:05:00:00) as a content attribute.

In addition, content 51 includes keywords (user points of view) 55a to 55c. Nakata is entered for keyword 55a, Soccer for keyword 55b, and Japan for keyword 55c. Also, as attributes of keywords 55a to 55c, priority level 5 is entered for keyword 55a, priority level 4 for keyword 55b, and priority level 2 for keyword 55c.

Meanwhile, in content 52, a display scale 56 (in this example, pixel=320×240) is entered as a content attribute. In addition, content 52 includes keywords 55d to 55f. Headline is entered for keyword 55d, Stock for keyword 55e, and Sports for keyword 55f. Also, as attributes of keywords 55d to 55f, priority level 5 is entered for keyword 55d, priority level 5 for keyword 55e, and priority level 3 for keyword 55f.

Figure 5:
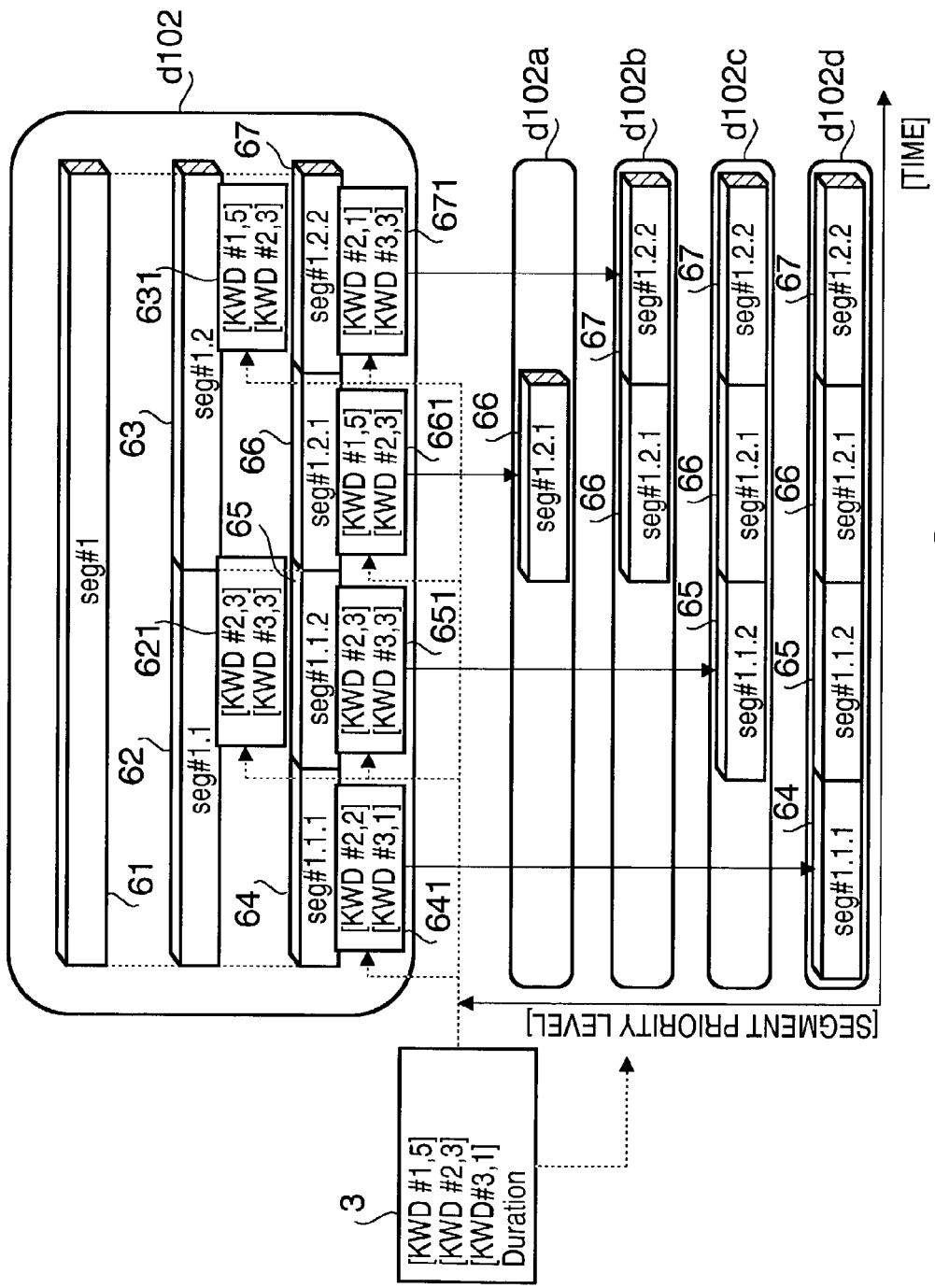
FIG. 5 is an explanatory drawing of the operation of the segment selection section according to Embodiment 1.

Next, the configuration of the data d102 will be described using FIG. 5.

The data d102 is composed of a segment 61 that comprises the time range of the data d102. The segment 61 is composed of a first subsegment 62 and a second subsegment 63. Subsegment 62 is composed of a first subsegment 64 and a second subsegment 65, and subsegment 63 is composed of a first subsegment 66 and a subsegment 67. Thus, the data d102 has a hierarchical structure comprising segments and subsegments.

Keywords (segment points of view) 621 are added to subsegment 62, and keywords (segment points of view) 631 are added to subsegment 63. Also, keywords (segment points of view) 641 are added to subsegment 64, keywords (segment points of view) 651 are added to subsegment 65, keywords (segment points of view) 661 are added to subsegment 66, and keywords (segment points of view) 671 are added to subsegment 67.

Keywords 621, 631, 641, 651, 661, and 671 are entered in the metadata d101. Also, a plurality of keywords (KWD) indicating the contents of segments 62 to 67 corresponding to keywords 621, 631, 641, 651, 661, and 671 are assigned to keywords 621, 631, 641, 651, 661, and 671.

A segment priority (segment priority level) is assigned to each keyword (KWD). In the example in the drawing, keywords 621 are composed of a set of KWD#2 and segment priority level 3 which is the ranking within KWD#2, and a set of KWD#3 and segment priority level 3 which is the ranking within KWD#2.

Figure 6:
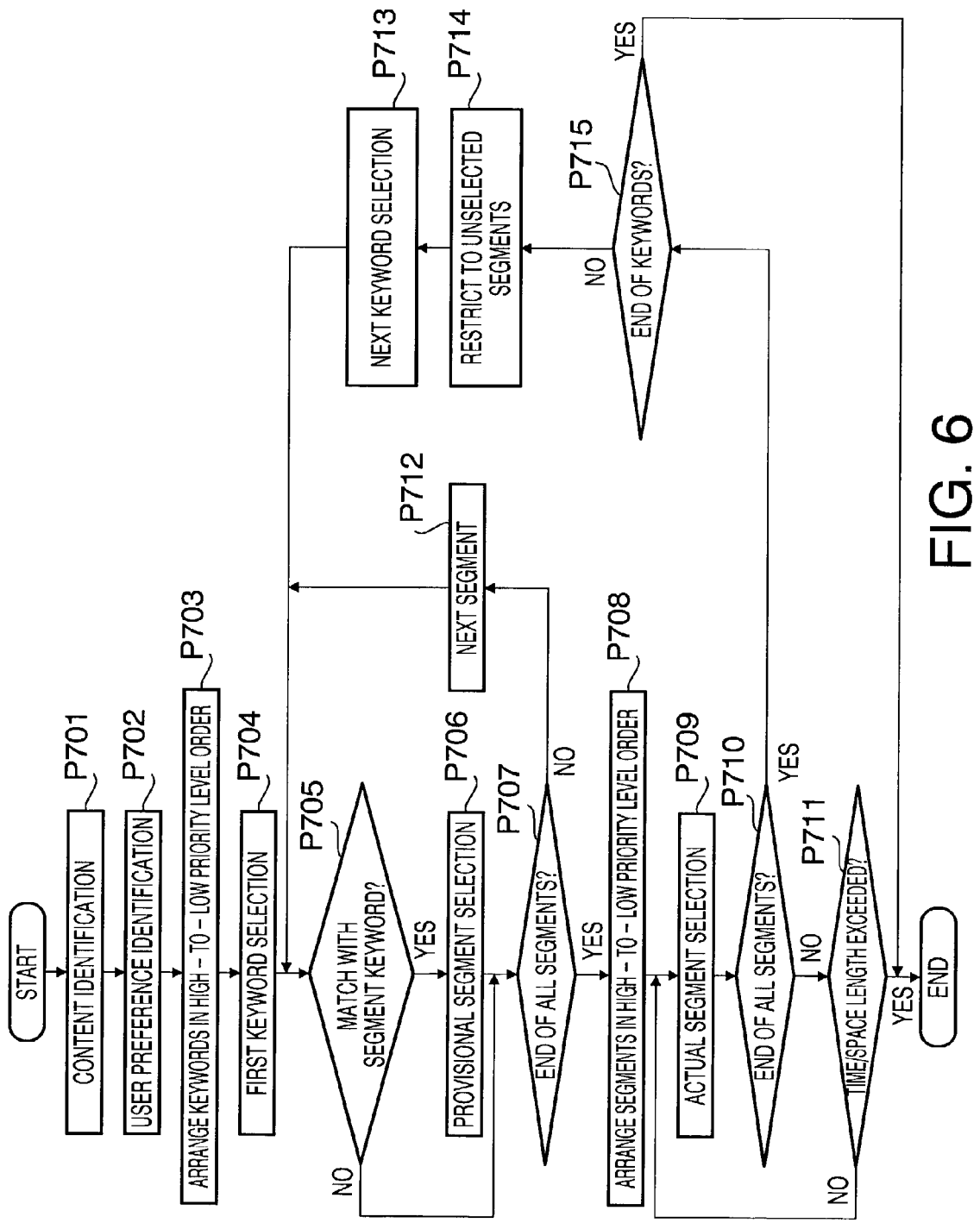
FIG. 6 is a processing flowchart of the user adaptive control section according to Embodiment 1.

Next, the operation of the segment selection section 16 and the operation of the user adaptive control section 14 will be described using FIG. 5 and FIG. 6. FIG. 5 is an operation explanation drawing that explains the operation of the segment selection section 16. FIG. 6 is a processing flowchart that explains the operation of the user adaptive control section 14.

The content data acquisition section 21 of the data adaptation section 12 reads and acquires metadata d101 and data d102 from the storage medium 11. Then, the user adaptive control section 14 analyzes the acquired metadata d101, extracts the data structure and at least one segment point of view to be added to each segment and the segment priority level at the segment point of view, and identifies the data (content) d102 that has been read (P701).

Next, the user adaptive control section 14 selects the user preference description (for example, user preference description 31) corresponding to the identified content from the user preferences d103 (P702). In addition, the user adaptive control section 14 arranges the user points of view (keywords) included in user preference description 31 in order of priority, which is a user point of view attribute (P703). The user adaptive control section 14 then selects the user point of view that has been assigned the highest priority level (P704).

Next, the user adaptive control section 14 sends information to the segment selection section 16 such that the segment that matches that user point of view is selected from the data d102, in order from the highest-priority user point of view (first user point of view).

The segment selection section 16 then compares the first user point of view with the segment points of view of the segments, using the information sent from the user adaptive control section 14, and judges whether there is a segment that has been assigned a segment point of view that matches the first user point of view (P705).

Next, a transition is made to the operation to select a segment that has been assigned a segment point of view that matches the first user point of view.

However, if all segments that have been assigned a segment point of view that matches the first user point of view are simply selected, it is possible that the selected segments may exceed the restriction conditions of the duration information 54 or spatial range information 56, or both of these. Thus, in this embodiment, all segments that have been assigned a segment point of view that matches the first user point of view are first provisionally selected, and then a number of segments that does not exceed the restriction conditions of the duration information 54 or spatial range information 56, or both of these, is actually selected from the provisionally selected segments.

To be specific, the segment selection section 16 first provisionally selects segments that conform to the user point of view (P706), then the segment selection section 16 judges whether provisional selection has been completed for all segments included in the metadata d101 (P707), and if it has not been completed, extracts the next segment using the metadata d101, and performs processing P705 and P706. In this way, provisional selection can be performed for all the segments included in the data d102.

Then, if the data adaptation section 12 judges in P707 that provisional selection has been completed for all the segments, the provisionally selected segments are arranged in the order of segment priority assigned to the segments (P708). This is done in order to make the actual selection of segments starting from the segment with the highest segment priority level in the actual segment selection process that will be described later.

First the data adaptation section 12 performs actual selection of the segment with the highest segment priority (P709). Next, the data adaptation section 12 judges whether actual selection has been completed for all provisionally selected segments (P710). Then, if the data adaptation section 12 judges in P710 that actual selection has not been completed for all provisionally selected segments, it judges whether the data length of the actually selected segments exceeds the restriction conditions of duration or spatial range, or both of these (P711). The data adaptation section 12 then repeats the operations from P709 to P711 as long as these restriction conditions are not exceeded.

If the data adaptation section 12 judges in P710 that actual selection has been completed for all provisionally selected segments, it judges whether processing has been performed for all user points of view (keywords) (P715). If the data adaptation section 12 judges in P715 that processing has been completed for all user points of view, it terminates processing. If, on the other hand, the data adaptation section 12 judges in P715 that processing has not been completed for all user points of view, a transition is made to processing for the next user point of view.

Here, performing processing and selection again for segments already selected in the above-described processing would be pointless. Therefore, the data adaptation section 12 first extracts unselected segments and performs the following processing on the unselected segments only (P714). The data adaptation section 12 then selects the next user point of view (P713) and performs processing P705 to P711.

The segment selection operation will now be described in concrete terms using FIG. 5. First, the data adaptation section 12 looks for a subsegment with KWD#1, which has the highest segment priority level of the user points of view (keywords) included in the user preferences (user preference description) 3. Keywords 631 of subsegment 63 and keywords 661 of subsegment 66 both have KWD#1. Next, the data adaptation section 12 adds a duration restriction to subsegment 63 and subsegment 66, and makes a selection from subsegment 63 and subsegment 66 in order of stringency of the duration restriction. To be specific, subsegment 66 for which the duration restriction is not stringent—that is, duration is short—is selected with top priority as output data d102a. Then, subsegment 63 is selected as the segment making up output data 102b.

Similarly, the data adaptation section 12 looks for a subsegment with KWD#2, which has the next-highest priority level of the user points of view included in the user preferences 3. KWD#2 is included in all the subsegments making up segment 61. Therefore, it is necessary here to decide which subsegment is to be given priority.

To be specific, the data adaptation section 12 compares the segment priority levels of the segment points of view added to each subsegment. In the example in FIG. 5, subsegment 63, subsegment 62, subsegment 65, and subsegment 66 have the same priority, followed in priority by subsegment 64 and subsegment 67. Since subsegment 67 has already been selected, it is omitted from the items subject to the following processing.

Therefore, after the data adaptation section 12 has selected output data d102b, if further duration restrictions are permitted, subsegment 65, which has a higher segment priority level than subsegment 64, is selected in addition to subsegment 63 as a subsegment making up output data 102c. The remaining subsegment 64 includes KWD#2 and KWD#3, and has a lower segment priority level than subsegment 65. Therefore, when duration restrictions are most lenient, subsegment 64 is selected in addition to subsegment 63 and subsegment 65 as a subsegment making up output data stream 102d.

The user adaptive control section 14 updates the priority level of a user point of view included in user preferences d103 that coincides with a keyword according to the priority level of the keyword added to a selected segment.

In this way, it is possible to select segments suitable for user preferences d103 from data d102, and adapt data d102 to user preferences d103.

Figure 7:
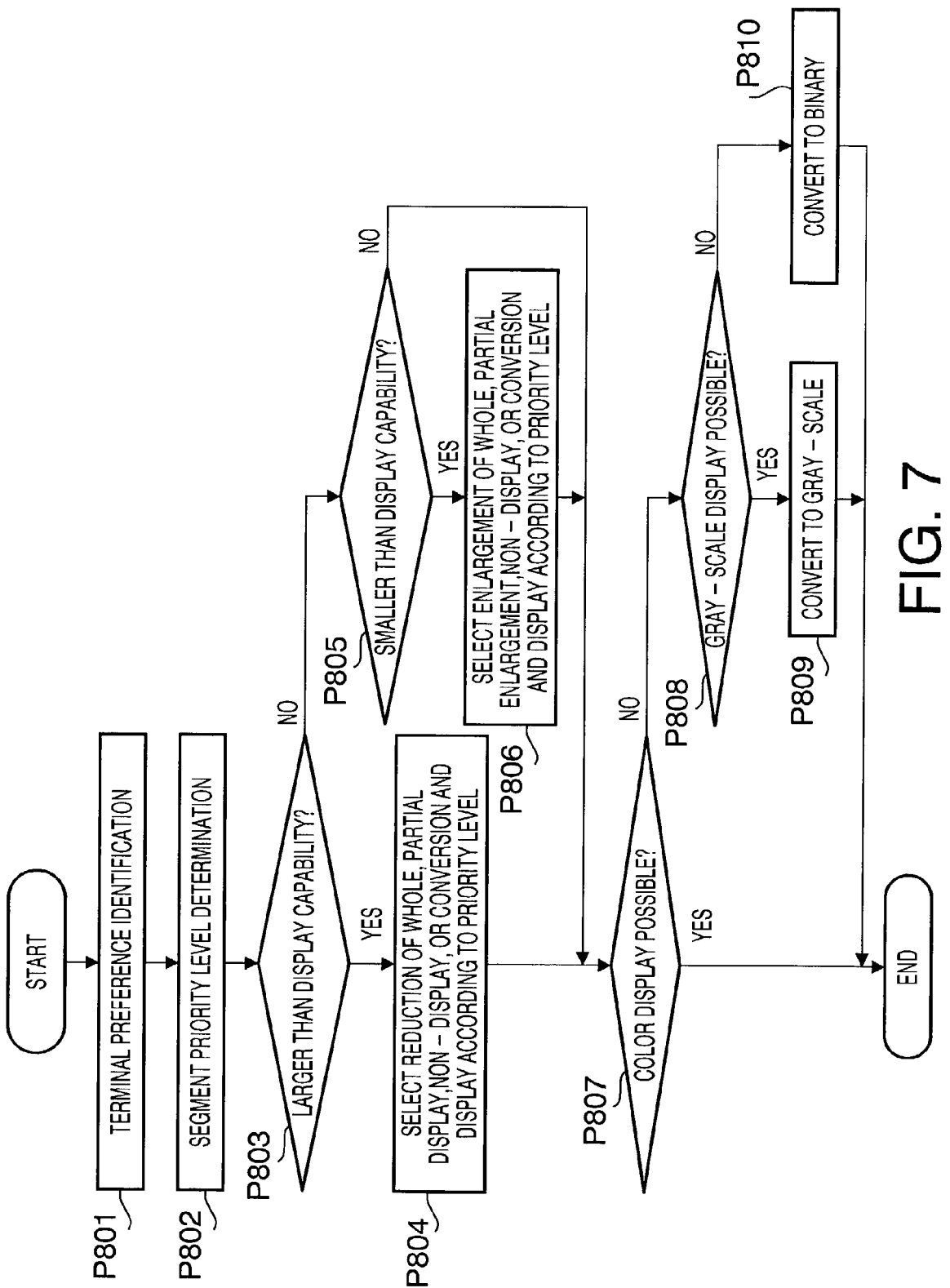
FIG. 7 is a processing flowchart of the terminal adaptive control section according to Embodiment 1.

Next, the data adaptation section 12 shifts to an operation for converting the segments selected as described above according to the terminal preferences d104 that constitute terminal capability information. The operation of the terminal adaptive control section 15 will be described below using FIG. 7. FIG. 7 is a processing flowchart explaining the operation of the terminal adaptive control section 15.

First, the terminal adaptive control section 15 acquires the terminal preferences d104 to be recorded in the terminal 10, and identifies the screen display size and number of display colors of the display section 18 as terminal capabilities (P801). Next, the terminal adaptive control section 15 determines the segment priority level that the segment selected by the segment selection section 16 has as its own attribute (P802). Then the terminal adaptive control section 15 judges whether the selected segment is larger than the display capability of the display section 18 of the terminal 10 (P803).

If the terminal adaptive control section 15 judges in P803 that the selected segment is larger than the display capability of the display section 18 of the terminal 10, the terminal adaptive control section 15 adds a segment priority level to the terminal preferences d104, and determines whether to reduce the entire segment in size, display part of the selected segment, not display part of the selected segment, or convert part of the selected segment before displaying it (P804).

If, on the other hand, the terminal adaptive control section 15 judges in P803 that the selected segment is not larger than the display capability of the display section 18 of the terminal 10, the terminal adaptive control section 15 judges whether the data of the selected segment is smaller than the screen display size of the display section 18 (P805). If the terminal adaptive control section 15 judges in P805 that the data of the selected segment is smaller than the screen display size of the display section 18, the terminal adaptive control section 15 adds a segment priority to the terminal preferences d104, and determines whether to enlarge the entire segment, enlarge part of the selected segment, not display part of the selected segment, or convert part of the selected segment before displaying it (P806).

Next, the terminal adaptive control section 15 identifies the number of terminal display colors from the terminal preferences d104, and, in accordance with the number of terminal display colors, judges whether the segment for which processing P801 to P806 was executed is capable of color display by the display section 18 (P807). If the terminal adaptive control section 15 determines in P807 that the segment for which the above-described processing was executed is capable of color display by the display section 18, processing is terminated.

If, on the other hand, the terminal adaptive control section 15 determines in P807 that the segment for which the above-described processing was executed is not capable of color display by the display section 18, it is determined whether the segment for which the above-described processing was executed can be displayed by the display section 18 after gray-scale conversion (P808). Then, if the terminal adaptive control section 15 determines that the segment for which the above-described processing was executed is displayable by the display section 18 after gray-scale conversion, it is determined that the segment for which the above-described processing was executed is to be subjected to gray-scale conversion (P809). If the terminal adaptive control section 15 determines that the segment for which the above-described processing was executed is not displayable by the display section 18 after gray-scale conversion, it is determined that the segment for which the above-described processing was executed is to be subjected to binary conversion (P810).

The resolution conversion section 17 then adapts the contents of the decision by the terminal adaptive control section 15 for the actually selected segment and performs resolution conversion. Then the display section 18 displays the segment converted by the resolution conversion section 17.

As described above, according to Embodiment 1, one or more segment points of view added to segments in the metadata d101, and segment priority levels in the segment points of view, are extracted, and segment selection can be performed based on the segment priority of segments that have a segment point of view that matches a user point of view included in the user preferences d103. By this means, it is possible to perform data adaptation of data d102 fully in accordance with the user's preferences.

Also, according to Embodiment 1, it is possible to perform data adaptation fully in accordance with terminal capability by performing temporal and spatial resolution conversion of segments according to terminal capability information included in terminal preferences.

Moreover, according to Embodiment 1, the mode is such that a user priority level is assigned to each user point of view, and therefore relative user point of view priority levels can be changed by changing user priority levels alone. Consequently, editing of user points of view by the user is simplified.

(Embodiment 2)

Figure 8:
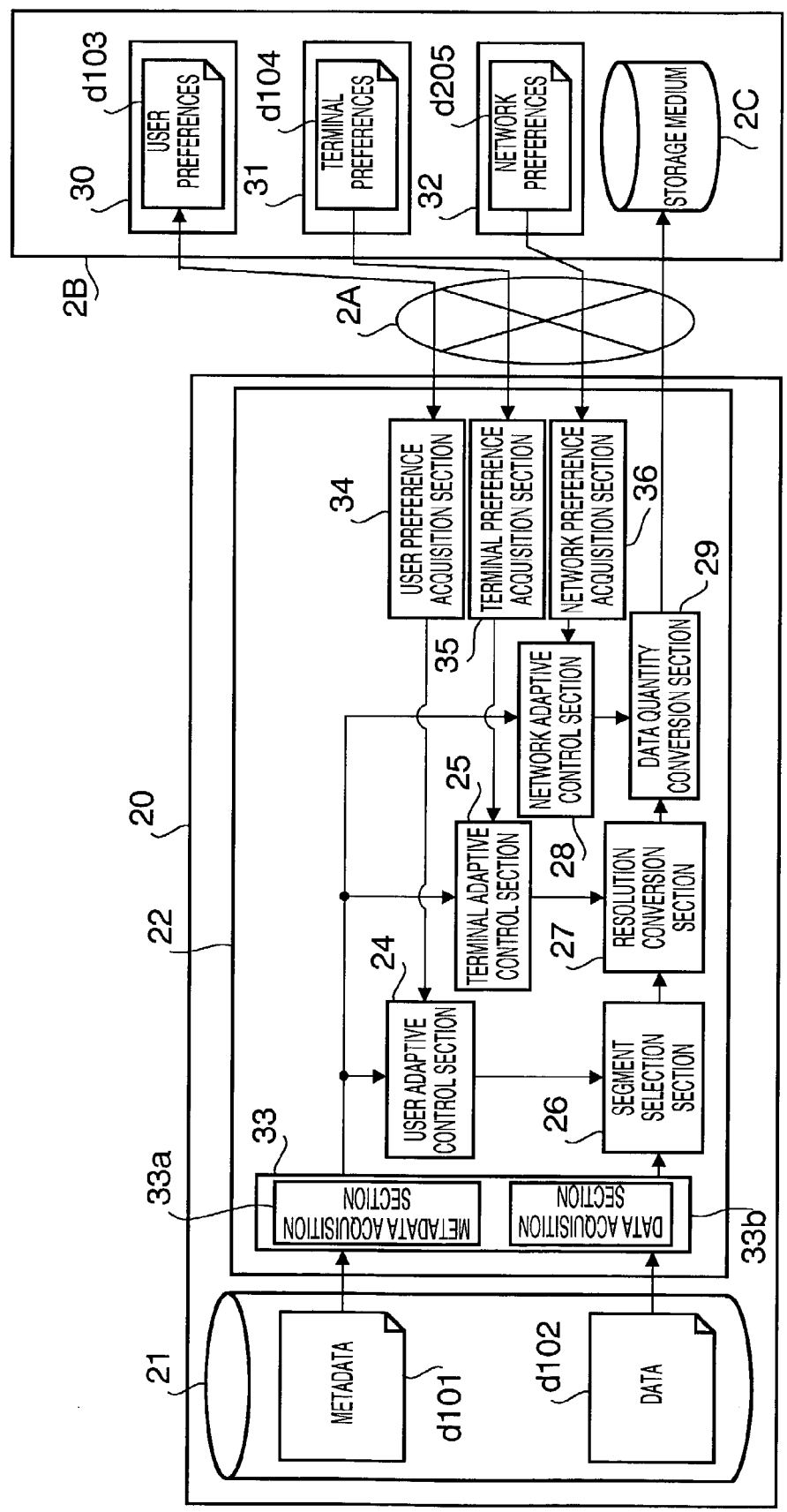
FIG. 8 is a block diagram of a system provided with a data adaptation apparatus according to Embodiment 2 and Embodiment 4 of the present invention.

A data adaptation apparatus according to Embodiment 2 of the present invention will be described below using FIG. 8. FIG. 8 shows a block diagram of a data adaptation apparatus according to Embodiment 2.

In Embodiment 2, the user adaptive control section according to Embodiment 1 is provided with a server, and the server and terminals are connected by a network. However, simply providing network connection of a user adaptive control section and terminals does not make it possible to perform data adaptation in a scalable fashion in the form the user wishes to receive and according to the status of the network. To solve this problem, in Embodiment 2, when distributing content to terminals via a network, the user adaptation section acquires information on the network transmission band as network preferences and adjusts the data quantity according to the segment priority and transmission band. In this way, Embodiment 2 enables data adaptation to be performed in a scalable fashion in the form the user wishes to receive and according to the status of the network.

Embodiment 2 will now be described in detail below. The configuration of a data adaptation section 22 according to Embodiment 2 will be described using FIG. 8. FIG. 8 is a block diagram of a system provided with a data adaptation apparatus 22 according to Embodiment 2.

As shown in FIG. 8, a server 20 and terminal 2B are connected by a network 2A. The terminal 2B is composed of a user preference storage section 30 that stores user preferences d103 which comprise information relating to the user's preferences, a terminal preference storage section 31 that stores terminal preferences d104 which comprise terminal 2B capability information, a network preference storage section 205 that stores network preferences d205 which comprise network 2A transmission band information, and a storage medium 2C that stores data sent from the server 20.

The server 20 is composed of a content data storage medium 21 on which is stored data d102 consisting of content composed of a plurality of segments and metadata d101 which is information for describing the data d102, and a user adaptation section 22 that adapts the data d102 to the user's preferences using the metadata d101, user preferences d103, terminal preferences d104, and network preferences d205.

The user adaptation section 22 is provided with means for acquiring various kinds of data. Provided as means for acquiring various kinds of data are a content data acquisition section 33 consisting of a metadata acquisition section 33a that acquires metadata d101 and a data acquisition section 33b that acquires data d102, a user preference acquisition section 34 that acquires user preferences d103 via the network 2A, a terminal preference acquisition section 35 that acquires terminal preferences d104 via the network 2A, and a network preference acquisition section 36 that acquires network preferences d205 via the network 2A.

In addition, the user adaptation section 12 is provided with means for selecting a predetermined segment from the data d102 acquired in accordance with the user's preferences and adapting it to the user's preferences. Provided as means for adapting a selected segment to the user's preferences are a user adaptive control section 24 that generates information for selecting a predetermined segment from acquired data d102 using acquired metadata d101 and user preference data d103, and a segment selection section 26 that selects and extracts a predetermined segment from acquired data d102 on the basis of information generated by the user adaptive control section 24.

Moreover, the user adaptation section 24 is provided with means for converting data d102 in accordance with the capability of the terminal 2B which is a data d102 processing apparatus. Provided as means for converting data d102 in accordance with the terminal capability are a terminal adaptive control section 25 that generates information for varying the spatial resolution and color resolution of data d102 from metadata d101 and terminal preferences d104, a resolution conversion section 27 that performs spatial resolution conversion and color resolution conversion for d102 in accordance with information generated by the terminal adaptive control section 25, a network adaptive control section 28 that generates information for adjusting the quantity of data d102 sent to the network 2A using the metadata d101 and network preferences d205, and a data quantity adjustment section 29 that adjusts the quantity of data sent to the network 2A according to information generated by the network adaptive control section 28.

Next, the operation of the segment selection section 26 and the operation of the user adaptive control section 24 will be described using FIG. 6.

The content data acquisition section 33 of the data adaptation section 24 reads and acquires metadata d101 and data d102 from the storage medium 21. Then, the user adaptive control section 24 analyzes the acquired metadata d101, extracts the data structure and at least one segment point of view to be added to each segment and the segment priority level at the segment point of view, and identifies the data (content) d102 that has been read (P701). Next, the user adaptive control section 24 selects the user preference description (for example, user preference description 31) corresponding to the identified content from the user preferences d103 (P702). In addition, the user adaptive control section 24 arranges the user points of view (keywords) included in user preference description 31 in order of priority level, which is a user point of view attribute (P703). The user point of view that has been assigned the highest priority level is then selected (P704).

Next, the user adaptive control section 24 sends information to the segment selection section 26 such that a segment that matches that user point of view is selected from the data d102, in order from the highest-priority user point of view (first user point of view).

The segment selection section 26 then compares the first user point of view with the segment points of view of the segments, using the information sent from the user adaptive control section 24, and judges whether there is a segment that has been assigned a segment point of view that matches the first user point of view (P705).

Next, a transition is made to the operation to select a segment that has been assigned a segment point of view that matches the first user point of view.

The segment selection section 26 first provisionally selects segments that conform to the user point of view (P706). Then the segment selection section 26 judges whether provisional selection has been completed for all segments included in the metadata d101 (P707), and if it has not been completed, extracts the next segment using the metadata d101, and performs processing P705 and P706. In this way, provisional selection can be performed for all the segments included in the data d102.

Then, if the data adaptation section 22 judges in P707 that provisional selection has been completed for all the segments, the provisionally selected segments are arranged in the order of segment priority assigned to the segments (P708). This is done in order to make the actual selection of segments starting from the segment with the highest segment priority level in the actual segment selection process that will be described later.

First, the data adaptation section 22 performs actual selection of the segment with the highest segment priority level (P709). Next, the data adaptation section 22 judges whether actual selection has been completed for all provisionally selected segments (P710). Then, if the data adaptation section 22 judges in P710 that actual selection has not been completed for all provisionally selected segments, it judges whether the data length of the actually selected segments exceeds the restriction conditions of duration or spatial range, or both of these (P711). The data adaptation section 22 then repeats the operations from P709 to P711 as long as these restriction conditions are not exceeded.

If the data adaptation section 22 judges in P710 that actual selection has been completed for all provisionally selected segments, it judges whether processing has been performed for all user points of view (keywords) (P715). If the data adaptation section 22 judges in P715 that processing has been completed for all user points of view (keywords), it terminates processing. If, on the other hand, the data adaptation section 22 judges in P715 that processing has not been completed for all user points of view, a transition is made to processing for the next user point of view.

Here, performing processing and selection again for segments already selected in the above-described processing would be pointless. Therefore, the data adaptation section 22 first extracts unselected segments and performs the following processing on the unselected segments only (P714). It then selects the next user point of view (P713) and performs processing P705 to P711.

In this way, it is possible to select segments suitable for user preferences d103 from data d102, and adapt data d102 to user preferences d103.

Next, the data adaptation section 12 shifts to an operation for converting the segments selected as described above according to the terminal preferences d104 that constitute terminal capability information. The operation of the terminal adaptive control section 25 will be described below using FIG. 7.

First, the terminal adaptive control section 25 acquires the terminal preferences d104 to be recorded in the terminal 2B from the terminal preference acquisition section 35, and identifies the screen display size and number of display colors of the display section 18 as terminal capabilities (P801). Next, the terminal adaptive control section 55 determines the segment priority level that the segment selected by the segment selection section 26 has as its own attribute (P802). Then the terminal adaptive control section 25 judges whether the selected segment is larger than the display capability of the display section 18 of the terminal 2B (P803).

If the terminal adaptive control section 25 judges in P803 that the selected segment is larger than the display capability of the terminal 2B, the terminal adaptive control section 25 adds a segment priority level to the terminal preferences d104, and determines whether to reduce the entire segment in size, display part of the selected segment, not display part of the selected segment, or convert part of the selected segment before displaying it (P804).

If, on the other hand, the terminal adaptive control section 25 judges in P803 that the selected segment is not larger than the display capability of the terminal 2B, the terminal adaptive control section 25 judges whether the data of the selected segment is smaller than the screen display size of the terminal 2B (P805). If the terminal adaptive control section 25 judges in P805 that the data of the selected segment is smaller than the screen display size of the terminal 2B, the terminal adaptive control section 25 adds a segment priority level to the terminal preferences d104, and determines whether to enlarge the entire segment, enlarge part of the selected segment, not display part of the selected segment, or convert part of the selected segment before displaying it (P806).

Next, the terminal adaptive control section 25 identifies the number of terminal 2B display colors from the terminal preferences d104, and, in accordance with the number of terminal display colors, judges whether the segment for which processing P801 to P806 was executed is capable of color display by the display section (P807). If the terminal adaptive control section 25 determines in P807 that the segment for which the above-described processing was executed is capable of color display by the terminal 2B, processing is terminated.

If, on the other hand, the terminal adaptive control section 25 determines in P807 that the segment for which the above-described processing was executed is not capable of color display by the terminal 2B, it is determined whether the segment for which the above-described processing was executed can be displayed by the terminal 2B after gray-scale conversion (P808). Then, if the terminal adaptive control section 25 determines that the segment for which the above-described processing was executed is displayable by the display section 18 after gray-scale conversion, it is determined that the segment for which the above-described processing was executed is to be subjected to gray-scale conversion (P809). If the terminal adaptive control section 25 determines that the segment for which the above-described processing was executed is not displayable by the terminal 2B after gray-scale conversion, it is determined that the segment for which the above-described processing was executed is to be subjected to binary conversion (P810).

The resolution conversion section 27 then adapts the contents of the decision by the terminal adaptive control section 25 for the actually selected segment and performs resolution conversion. Then the data subjected to resolution conversion is sent to the data quantity adjustment section 29.

Figure 9:
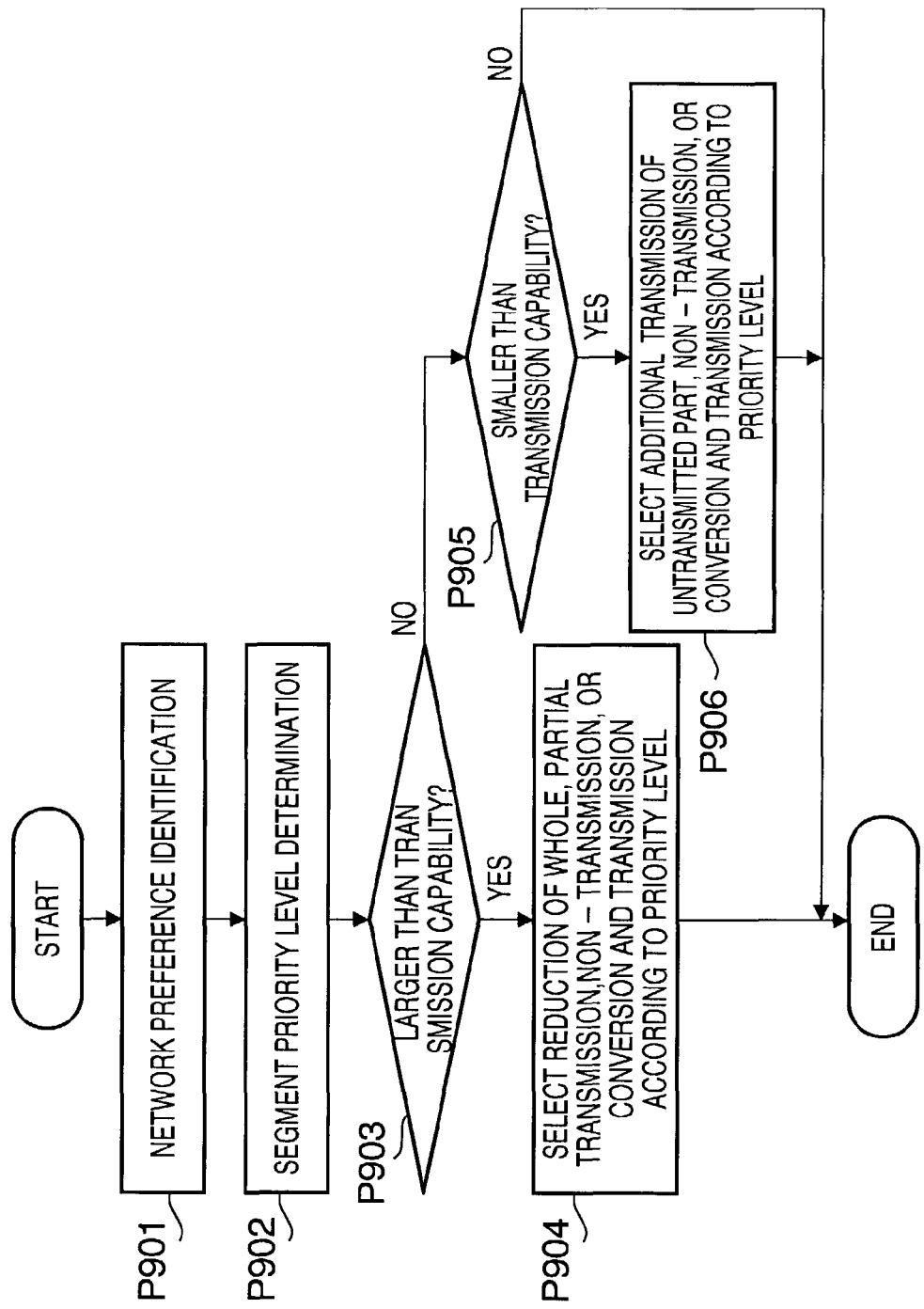
FIG. 9 is a processing flowchart of the network adaptive control section according to Embodiment 2.

Next, the operation of the network adaptive control section 28 will be described using FIG. 9. FIG. 9 is a processing flowchart of the network adaptive control section 28 according to Embodiment 2.

The network adaptive control section 28 acquires from the network preference acquisition section 36 network preferences d205 sent from the terminal 2B via the network 2A. Then the network adaptive control section 28 identifies the transmission band of the network 2A (P901). Next, the network adaptive control section 28 determines the segment priority level that the segment selected by the segment selection section 26 has as its own attribute (P902). The network adaptive control section 28 then judges whether the converted data is larger than the transmission band (P903).

If the network adaptive control section 28 judges in P903 that the converted data is larger than the transmission band, the network adaptive control section 28 determines whether to compress all the data, transmit part of the data, not transmit all the data, or convert part of the data before transmitting it (P904). Here, converting the data before transmitting it refers to format conversion such as converting MPEG1 data to MPEG4 data or converting AAC data to MP3 data.

If, on the other hand, the network adaptive control section 28 judges in P903 that the converted data is not larger than the transmission band, the network adaptive control section 28 judges whether the converted segment data is smaller than the transmission band (P905). If the network adaptive control section 28 judges in P905 that the converted data is smaller than the transmission band, the network adaptive control section 28 determines whether to perform additional transmission of untransmitted data, not transmit, or transmit after converting or restoring conversion to its original state (P906).

The data quantity adjustment section 29 then adapts the contents of the decision by the network adaptive control section 28 for the actually selected segment, adjusts the data quantity, and transmits it to the terminal 2B. The terminal 2B records the received segment in the storage medium 2C.

As described above, according to Embodiment 2, in addition to the effects of Embodiment 1, by adjusting the selected segment data quantity according to the transmission band included in the network preferences d205, it is possible to perform data adaptation in a scalable fashion in the form the user wishes to receive and in accordance with the status of the network.

(Embodiment 3)

A data adaptation apparatus according to Embodiment 3 of the present invention will now be described below. The configuration of the data adaptation apparatus according to Embodiment 3 is identical to the configuration of the data adaptation apparatus according to Embodiment 1, and therefore a description of the configuration of the data adaptation apparatus according to Embodiment 3 will be omitted.

Figure 10:
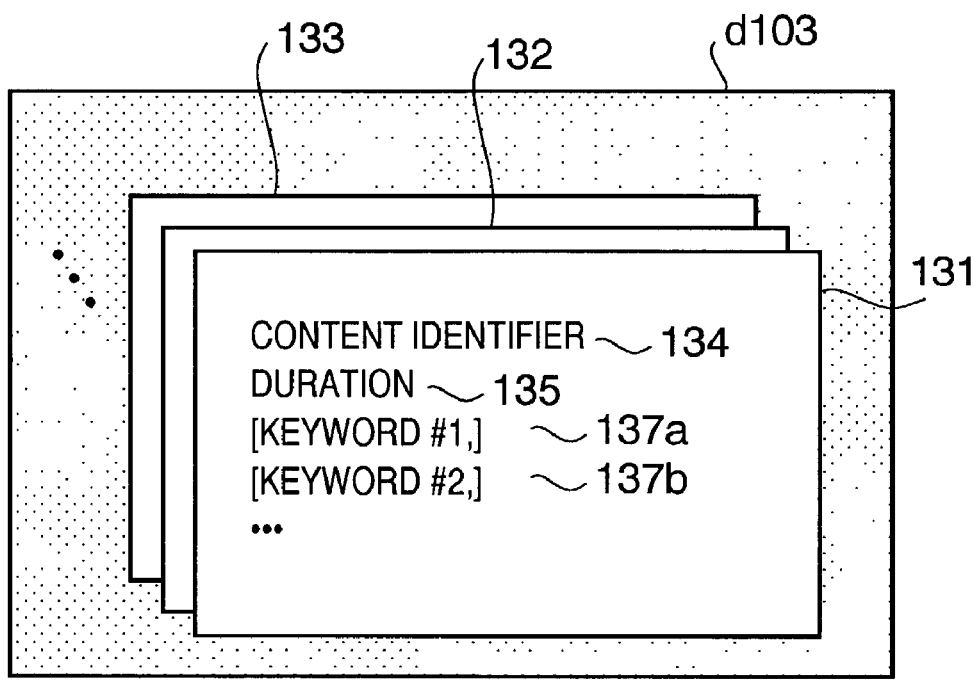
FIG. 10 is a detailed drawing showing a second example of user preferences.

The data adaptation apparatus according to Embodiment 3 and the data adaptation apparatus according to Embodiment 1 differ in the configuration of the user preferences d103. The user preferences d103 according to Embodiment 3 will be described below. FIG. 10 is a second detailed drawing of user preferences d103.

As shown in FIG. 10, user preferences d103 are composed of a plurality of user preference descriptions 131 to 133. In user preference descriptions 131 to 133 are stored a plurality of content identifiers 134 corresponding to each of user preference descriptions 131 to 133, duration information 135 for displaying content, and keywords 136a and 136b for extracting a predetermined segment from content. Thus, priority levels corresponding to keywords 136a and 136b are not stored in the user preferences of Embodiment 3. This is a point of difference between the user preferences of Embodiment 3 and the user preferences of Embodiment 1.

Next, a definition description of user preferences d103 including user preference descriptions 131 to 133 will be described in concrete terms. FIG. 11 is a drawing showing a definition description of user preferences d103.

As shown in FIG. 11, the user preference description definition 140 is written using DTD (Document Type Definition) of XML (extensible Markup Language).

The user preference description definition 140 defines there being at least one content (Content) in the user preferences as indicated by reference numeral 141 in the drawing. Also, it is defined that there is at least one keyword 136 (Keyword) for each content as indicated by reference numeral 142 in the drawing. Further, a content identifier 134 (ContentID), duration 135 (Duration), and screen size 144 (ScreenSize) which is size information for displaying data, are defined for the content as attributes as indicated by reference numeral 143 in the drawing. Also, the keyword 136 (Keyword) is defined as being written as text data as indicated by reference numeral 148 in the drawing.

It can also be see from the user preference description definition 140 in FIG. 11 that a priority level corresponding to the keyword 136 is not stored in the user preferences of Embodiment 3.

Next, user preferences created using the user preference description definition shown in FIG. 11 will be described. FIG. 12 is a drawing showing an example of user preferences.

In FIG. 12, reference numeral 150 denotes an example of an actual user preference description written in XML using user preference description definition 40.

User preferences 150 shown in FIG. 12 include two content entities 151 and 152. Content 151 has a content ID 153a (in this example, 123456789), and content 152 has a content ID 153b (in this example, 123456788). Also, content 151 includes a display duration 154 (in this example, smpte=00:05:00:00) as a content attribute. In addition, content 151 includes keywords 155a to 155c. Nakata is entered for keyword 155a, Soccer for keyword 155b, and Japan for keyword 155c.

Meanwhile, in content 152, a display scale 156 (in this example, pixel=320×240) is entered as a content attribute. In addition, content 152 includes keywords 155d to 155f. Headline is entered for keyword 155d, Stock for keyword 155e, and Sports for keyword 155f.

Figure 13:
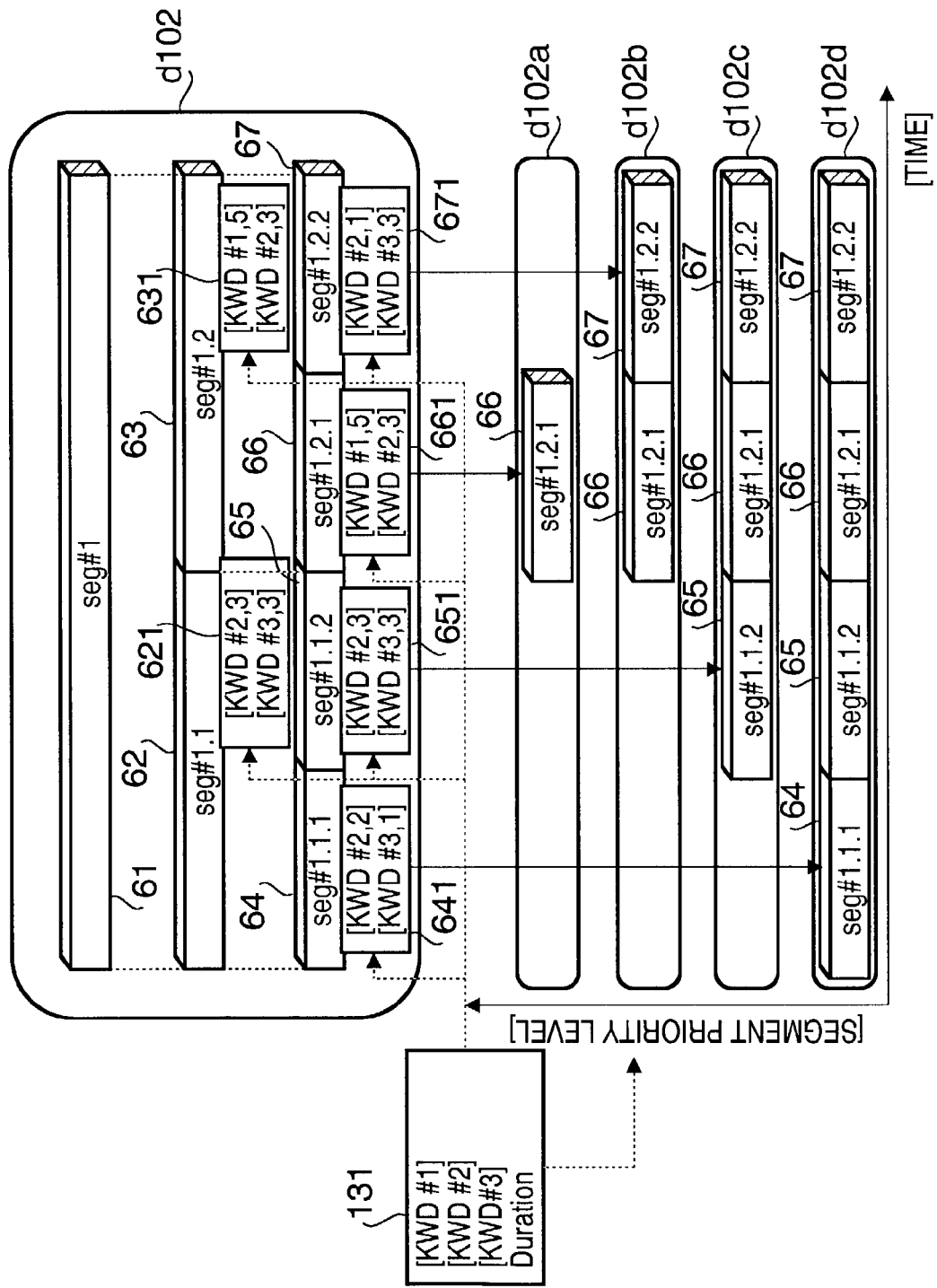
FIG. 13 is a drawing explaining second operation of the segment selection section.

Next, the configuration of data d102 according to Embodiment 3 will be described using FIG. 13. FIG. 13 is an operation explanation drawing explaining the operation of the segment selection section 16. In FIG. 13, the item denoted by reference number 131 is a user preference description. Apart from the user preference description 131, the configuration is similar to that of Embodiment 1.

Figure 14:
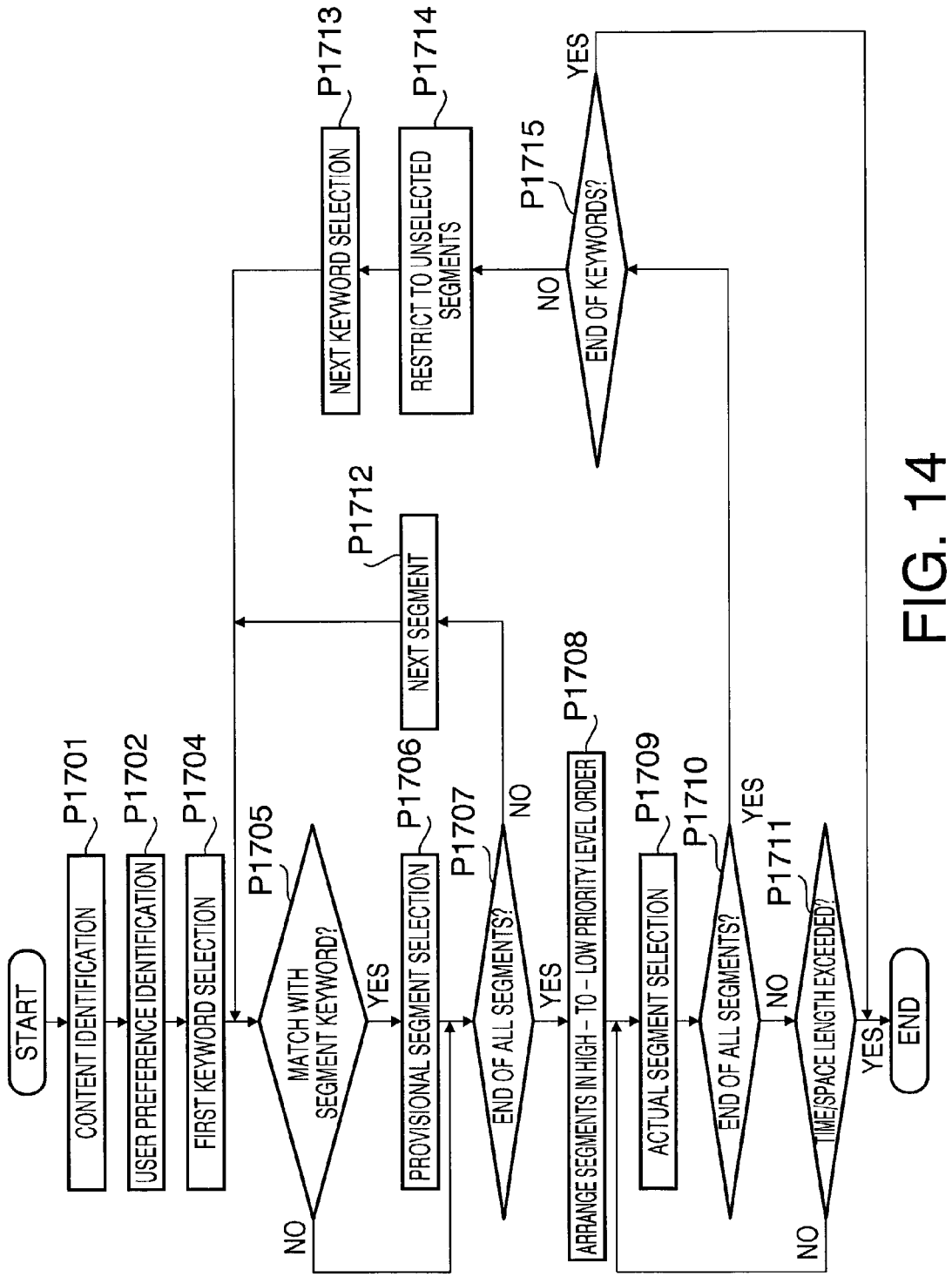
FIG. 14 is a flowchart of second processing of the user adaptive control section.
Figure 15:
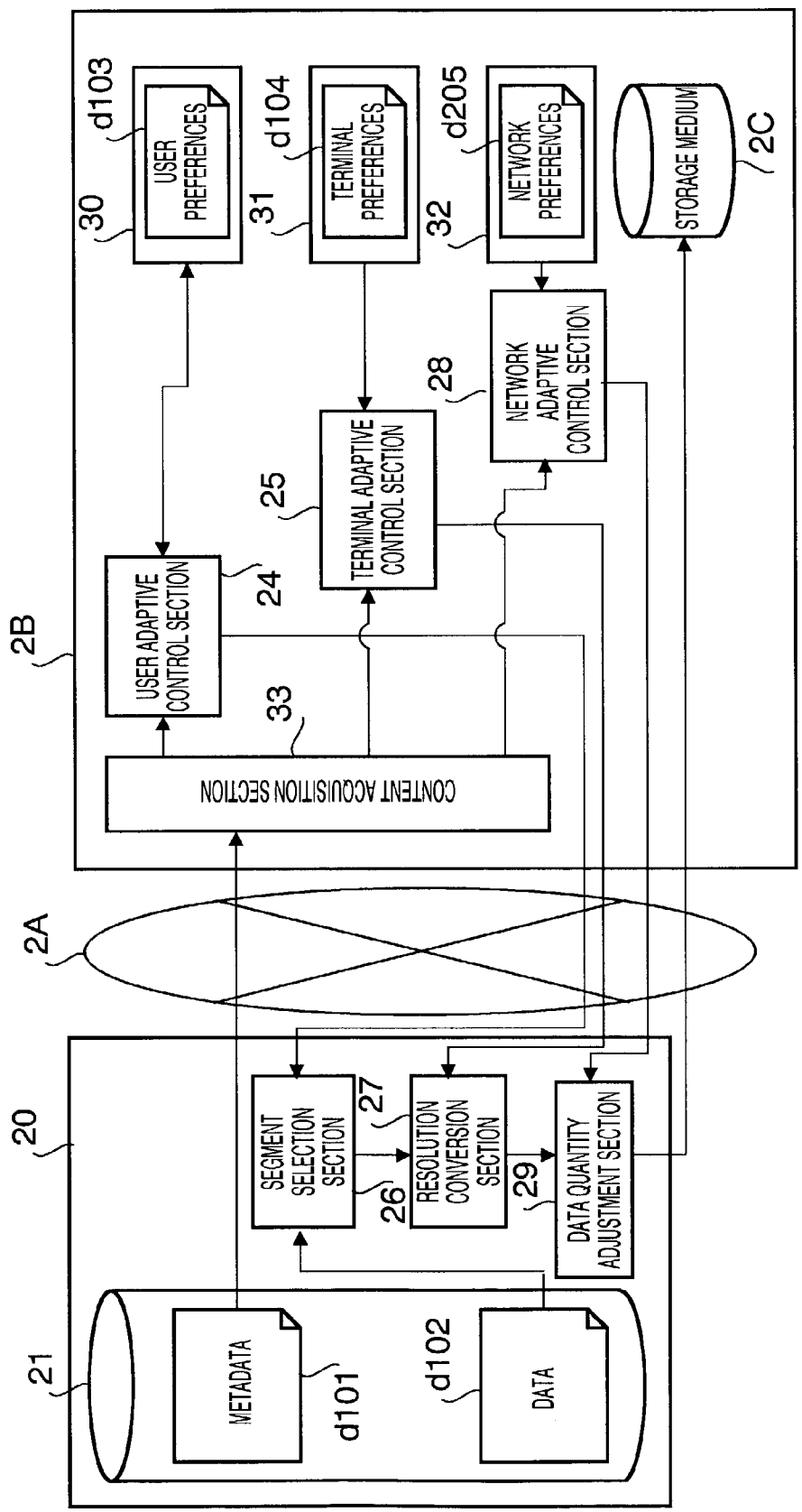
FIG. 15 is a block diagram showing another example of a system provided with a data adaptation apparatus according to an embodiment of the present invention.

Next, the operation of the segment selection section 16 and the operation of the user adaptive control section 14 will be described using FIG. 13 and FIG. 14. FIG. 13 is an operation explanation drawing that explains the operation of the segment selection section 16. FIG. 14 is a processing flowchart that explains the operation of the user adaptive control section 14.

The content data acquisition section 21 of the data adaptation section 12 reads and acquires metadata d101 and data d102 from the storage medium 11. Then, the user adaptive control section 14 analyzes the acquired metadata d101, extracts the data structure and at least one segment point of view to be added to each segment and the segment priority level at the segment point of view, and identifies the data (content) d102 that has been read (P1701). Next, the user adaptive control section 14 selects the user preference description (for example, user preference description 131) corresponding to the identified content from the user preferences d103 (P1702). In addition, the user adaptive control section 14 arranges the user points of view (keywords) included in user preference description 131 in the order in which they are written. In the example in FIG. 12, the keywords are arranged in order starting from the keyword written in the top line—that is, in the order keyword 155a, keyword

155*b*, keyword 155*c*. Then the first user point of view—that is, the one written at the top—is selected (P1704). The reason for arranging the keywords in the order in which they are written in this way is that, since user priority levels are not assigned to user preferences d103 according to Embodiment 3, it is necessary to assign some kind of priority levels corresponding to user priorities. In Embodiment 3, the keyword priority levels are made to correspond to the order in which they are written, as a substitute for user priority levels.

Next, the user adaptive control section 14 sends information to the segment selection section 16 such that a segment that matches that user point of view is selected from the data d102, in order from the highest-priority user point of view (first user point of view).

The segment selection section 16 then compares the first user point of view with the segment points of view of the segments, using the information sent from the user adaptive control section 14, and judges whether there is a segment that has been assigned a segment point of view that matches the first user point of view (P1705).

Next, a transition is made to the operation to select a segment that has been assigned a segment point of view that matches the first user point of view.

The segment selection section 16 first provisionally selects segments that conform to the user point of view (P1706). Then the segment selection section 16 judges whether provisional selection has been completed for all segments included in the data d102 (P1707), and if it has not been completed, extracts the next segment using the metadata d101, and performs processing P1705 and P1706. In this way, provisional selection can be performed for all the segments included in the data d102.

Then, if the data adaptation section 12 judges in P1707 that provisional selection has been completed for all the segments, the provisionally selected segments are arranged in the order of segment priority assigned to the segments (P1708). This is done in order to make the actual selection of segments starting from the segment with the highest segment priority level in the actual segment selection process that will be described later.

First the data adaptation section 12 performs actual selection of the segment with the highest segment priority level (P1709). Next, the data adaptation section 12 judges whether actual selection has been completed for all provisionally selected segments (P1710). Then, if the data adaptation section 12 judges in P1710 that actual selection has not been completed for all provisionally selected segments, it judges whether the data length of the actually selected segments exceeds the restriction conditions of duration or spatial range, or both of these (P1711). The data adaptation section 12 then repeats the operations from P1709 to P1711 as long as these restriction conditions are not exceeded.

If the data adaptation section 12 judges in P1710 that actual selection has been completed for all provisionally selected segments, it judges whether processing has been performed for all user points of view (keywords) (P1715). If the data adaptation section 12 judges in P1715 that processing has been completed for all user points of view, it terminates processing. If, on the other hand, the data adaptation section 12 judges in P1715 that processing has not been completed for all user points of view, a transition is made to processing for the next user point of view.

Here, performing processing and selection again for segments already selected in the above-described processing would be pointless. Therefore, the data adaptation section 12 first extracts unselected segments and performs the following processing on the unselected segments only (P1714). The data adaptation section 12 then selects the next user point of view (P1713) and performs processing P1705 to P1711.

The segment selection operation will now be described in concrete terms using FIG. 13. First, the data adaptation section 12 looks for a subsegment written in the top line—that is with high-priority KWD#1—within the user points of view (user keywords) included in the user preferences (user preference description) 131. Keywords 631 of subsegment 63 and keywords 661 of subsegment 66 both have KWD#1. Next, the data adaptation section 12 adds a duration restriction to subsegment 63 and subsegment 66, and makes a selection from subsegment 63 and subsegment 66 in order of stringency of the duration restriction. To be specific, subsegment 66 for which the duration restriction is not stringent—that is, duration is short—is selected with top priority as output data d102*a*. Then, subsegment 63 is selected as the segment making up output data 102*b*.

Similarly, the data adaptation section 12 looks for a subsegment with KWD#2, which has the next-highest priority of the user points of view included in the user preferences d103. KWD#2 is included in all the subsegments making up segment 61. Therefore, it is necessary here to decide which subsegment is to be given priority.

To be specific, the data adaptation section 12 compares the segment priority levels of the segment points of view added to each subsegment. In the example in FIG. 13, subsegment 63, subsegment 62, subsegment 65, and subsegment 66 have the same priority level, followed in priority by subsegment 64 and subsegment 67. Since subsegment 67 has already been selected, it is omitted from the items subject to the following processing.

Therefore, after the data adaptation section 12 has selected output data d102*b*, if further duration restrictions are permitted, subsegment 65, which has a higher segment priority level than subsegment 64, is selected in addition to subsegment 63 as a subsegment making up output data 102*c*. The remaining subsegment 64 includes KWD#2 and KWD#3, and has a lower segment priority level than subsegment 65, so when duration restrictions are most lenient, subsegment 64 is selected in addition to subsegment 63 and subsegment 65 as a subsegment making up output data stream 102*d*.

The user adaptive control section 14 updates the priority level of a user point of view included in user preferences d103 that coincides with a keyword according to the priority level of the keyword added to a selected segment.

In this way, it is possible to select segments suitable for user preferences d103 from data d102, and adapt data d102 to user preferences d103.

Next, as in Embodiment 1, the terminal adaptive control section 15 performs resolution conversion of the selected segment sent from the segment selection section 16 in accordance with the flowchart shown in FIG. 7.

As described above, according to Embodiment 3, it is possible to perform processing using the order in which user points of view are written for user point of view priority levels, without assigning user priority levels to the user preferences d103. By this means, it is possible to perform data adaptation fully in accordance with the user's preferences in the same way as with Embodiment 1, without assigning user priority levels to the user preferences d103.

Moreover, not providing user priority levels, as in Embodiment 3, simplifies the data structure of the user preferences d103.

(Embodiment 4)

A data adaptation apparatus according to Embodiment 4 of the present invention will now be described below. In Embodiment 4, the user adaptive control section in Embodiment 3 is provided in a server, and the server and terminals are connected by a network.

The system that includes a data adaptation apparatus according to Embodiment 4 has the same configuration as a system that includes a data adaptation apparatus according to Embodiment 2. Therefore, FIG. 8 is a block diagram of a system that includes a data adaptation apparatus according to Embodiment 4.

The user preferences d103 according to Embodiment 4 are the same as in Embodiment 3. Therefore, the drawing shown in FIG. 10 is a drawing showing the user preferences d103 according to Embodiment 4. Also, FIG. 11 shows a definition of user preferences according to Embodiment 4.

The operation of the segment selection section 26 according to Embodiment 4 is identical to that of the segment selection section 26 according to Embodiment 3. Therefore, FIG. 13 is an operation explanation drawing that explains the operation of the segment selection section 26. In addition, FIG. 14 is a processing flowchart that explains the operation of the user adaptive control section 24 according to Embodiment 4.

Moreover, the operation of the terminal adaptive control section 25 according to Embodiment 4 is identical to that of the terminal adaptive control section according to Embodiment 3. Therefore, FIG. 7 is a processing flowchart explaining the operation of the terminal adaptive control section 25 according to Embodiment 4. Also, the operation of the network adaptive control section 28 according to Embodiment 4 is identical to that of the network adaptive control section 28 according to Embodiment 2. Therefore, FIG. 9 is a processing flowchart explaining the operation of the network adaptive control section 28 according to Embodiment 4.

A system including a data adaptation apparatus according to Embodiment 4 will be described below using these attached drawings.

The content data acquisition section 33 of the data adaptation section 22 reads and acquires metadata d101 and data d102 from the storage medium 21. Then, the user adaptive control section 24 analyzes the acquired metadata d101, extracts the data structure and at least one segment point of view to be added to each segment and the segment priority level at the segment point of view, and identifies the data (content) d102 that has been read (P1701). Next, the user adaptive control section 24 selects the user preference description (for example, user preference description 131) corresponding to the identified content from the user preferences d103 (P1702). In addition, the user adaptive control section 24 arranges the user points of view (keywords) included in user preference description 131 in the order in which they are written. In the example in FIG. 12, the keywords are arranged in order starting from the keyword written in the top line—that is, in the order keyword 155a, keyword 155b, keyword 155c. Then the first user point of view—that is, the one written at the top—is selected (P1704). The reason for arranging the keywords in the order in which they are written in this way is that, since user priorities are not assigned to user preferences d103 according to Embodiment 4, it is necessary to assign some kind of priority levels corresponding to user priorities. In Embodiment 3, the keyword priority levels are set in the order in which they are written, as a substitute for user priorities.

Next, the user adaptive control section 24 sends information to the segment selection section 26 such that a segment that matches that user point of view is selected from the data d102, in order from the highest-priority user point of view (first user point of view).

The segment selection section 26 then compares the first user point of view with the segment points of view of the segments, using the information sent from the user adaptive control section 24, and judges whether there is a segment that has been assigned a segment point of view that matches the first user point of view (P1705).

Next, a transition is made to the operation to select a segment that has been assigned a segment point of view that matches the first user point of view.

The segment selection section 26 first provisionally selects segments that conform to the user point of view (P1706). Then the segment selection section 26 judges whether provisional selection has been completed for all segments included in the metadata d101 (P1707), and if it has not been completed, extracts the next segment using the metadata d101, and performs processing P1705 and P1706. In this way, provisional selection can be performed for all the segments included in the data d102.

Then, if the data adaptation section 22 judges in P1707 that provisional selection has been completed for all the segments, the provisionally selected segments are arranged in the order of segment priority assigned to the segments (P1708). This is done in order to make the actual selection of segments starting from the segment with the highest segment priority level in the actual segment selection process that will be described later.

First the data adaptation section 22 performs actual selection of the segment with the highest segment priority level (P1709). Next, the data adaptation section 22 judges whether actual selection has been completed for all provisionally selected segments (P1710). Then, if the data adaptation section 22 judges in P1710 that actual selection has not been completed for all provisionally selected segments, it judges whether the data length of the actually selected segments exceeds the restriction conditions of duration or spatial range, or both of these (P1711). The data adaptation section 22 then repeats the operations from P1709 to P1711 as long as these restriction conditions are not exceeded.

If the data adaptation section 22 judges in P1710 that actual selection has been completed for all provisionally selected segments, it judges whether processing has been performed for all user points of view (keywords) (P1715). If the data adaptation section 22 judges in P1715 that processing has been completed for all user points of view, it terminates processing. If, on the other hand, the data adaptation section 22 judges in P1715 that processing has not been completed for all user points of view, a transition is made to processing for the next user point of view.

Here, performing processing and selection again for segments already selected in the above-described processing would be pointless. Therefore, the data adaptation section 22 first extracts unselected segments and performs the following processing on the unselected segments only (P1714). The data adaptation section 22 then selects the next user point of view (P1713) and performs processing P1705 to P1711.

The segment selection operation will now be described in concrete terms using FIG. 13. First, the data adaptation section 22 looks for a subsegment written in the top line—that is with high-priority KWD#1—within the user points of view (user keywords) included in the user preferences (user preference description) 131. Keywords 631 of subsegment 63 and keywords 661 of subsegment 66 both have KWD#1. Next, the data adaptation section 22 adds a duration restriction to subsegment 63 and subsegment 66, and makes a selection from subsegment 63 and subsegment 66 in order of stringency of the duration restriction.

To be specific, subsegment 66 for which the duration restriction is not stringent—that is, duration is short—is selected with top priority as output data d102*a*. Then, subsegment 63 is selected as the segment making up output data 102*b*.

Similarly, the data adaptation section 22 looks for a subsegment with KWD#2, which has the next-highest priority of the user points of view included in the user preferences d103. KWD#2 is included in all the subsegments making up segment 61. Therefore, it is necessary here to decide which subsegment is to be given priority.

To be specific, the data adaptation section 22 compares the segment priority levels of the segment points of view added to each subsegment. In the example in FIG. 13, subsegment 63, subsegment 62, subsegment 65, and subsegment 66 have the same priority level, followed in priority by subsegment 64 and subsegment 67. Since subsegment 67 has already been selected, it is omitted from the items subject to the following processing.

Therefore, after the data adaptation section 12 has selected output data d102*b*, if further duration restrictions are permitted, subsegment 65, which has a higher segment priority level than subsegment 64, is selected in addition to subsegment 63 as a subsegment making up output data 102*c*. The remaining subsegment 64 includes KWD#2 and KWD#3, and has a lower segment priority level than subsegment 65, so when duration restrictions are most lenient, subsegment 64 is selected in addition to subsegment 63 and subsegment 65 as a subsegment making up output data stream 102*d*.

The user adaptive control section 24 updates the priority level of a user point of view included in user preferences d103 that coincides with a keyword according to the priority level of the keyword added to a selected segment.

In this way, it is possible to select segments suitable for user preferences d103 from data d102, and adapt data d102 to user preferences d103.

Next, as in Embodiment 1, the terminal adaptive control section 25 performs resolution conversion of the selected segment sent from the segment selection section 26 in accordance with the flowchart shown in FIG. 7.

Next, the operation of the network adaptive control section 28 will be described using FIG. 9. FIG. 9 is a processing flowchart of the network adaptive control section 28 according to Embodiment 4.

The network adaptive control section 28 acquires from the network preference acquisition section 36 network preferences d205 sent from the terminal 2B via the network 2A. Then the network adaptive control section 28 identifies the transmission band of the network 2A (P901). Next, the network adaptive control section 28 determines the segment priority level that the segment selected by the segment selection section 26 has as its own attribute (P902). The network adaptive control section 28 then judges whether the converted data is larger than the transmission band (P903).

If the network adaptive control section 28 judges in P903 that the converted data is larger than the transmission band, the network adaptive control section 28 determines whether to compress all the data, transmit part of the data, not transmit all the data, or convert part of the data before transmitting it (P904).

If, on the other hand, the network adaptive control section 28 judges in P903 that the converted data is not larger than the transmission band, the network adaptive control section 28 judges whether the converted segment data is smaller than the transmission band (P905). If the network adaptive control section 28 judges in P905 that the converted data is smaller than the transmission band, the network adaptive control section 28 determines whether to perform additional transmission of untransmitted data, not transmit, or transmit after converting or restoring conversion to its original state (P906).

The data quantity adjustment section 29 then adapts the contents of the decision by the network adaptive control section 28 for the actually selected segment, adjusts the data quantity, and transmits it to the terminal 2B. The terminal 2B records the received segment in the storage medium 2C.

As described above, according to Embodiment 4, by extracting the data structure and at least one point of view to be added to each segment of the structure and the segment priority level at the segment point of view, performing segment selection based on the priority of a point of view that coincides with a user point of view included in user preferences, performing temporal and spatial resolution conversion of selected segments according to terminal capability information included in terminal preferences, and adjusting the selected segment data quantity according to the transmission band included in network preferences, it is possible to perform data adaptation in a scalable fashion in a form the user wishes to receive and in accordance with the status of the network.

In Embodiment 3 and Embodiment 4, user point of view priority levels follow the order of description, but the priority level of each user point of view may also be represented by another description method, such as reversing that order, or making an item located in the middle of the description order the highest-level item.

Also, in Embodiment 2 and Embodiment 4, a mode is described whereby a user adaptive control section 24, terminal adaptive control section 25, and network adaptive control section 28, which are control means, are provided on the server 20 side as shown in FIG. 8, but a mode is also possible whereby a user adaptive control section 24, terminal adaptive control section 25, and network adaptive control section 28 are provided in a terminal 2B.

In the case of this mode, metadata d102 is sent from the server 20 to the terminal 2B, data d102 is subjected to user adaptation by the terminal adaptive control section 25 in the terminal 2B, and the result is sent to the server 20. The server 20 then selects a segment from the data d102 based on information sent from the terminal adaptive control section 25, and transmits the selected segment to the terminal 2B. A signal that controls the resolution conversion section 27 of the server 20 is sent from the terminal adaptive control section 25 of the terminal 2B, and a signal that controls the data quantity adjustment section 29 of the server 20 is sent from the network adaptive control section 28 of the terminal 2B. The resolution conversion section 27 and data quantity adjustment section 29 operate in accordance with control signals sent from the terminal 2B, and the segment selection section 26 processes the selected data and sends the processed segment to the storage medium 2C of the terminal 2B.

Also, in the above-described sample embodiments, a mode is described whereby one segment point of view is assigned to a segment or subsegment. However, a mode is also possible whereby, if there is a plurality of segments or subsegments to which the same segment point of view has been assigned, a segment point of view is added to one of the segments or subsegments, and link information for that segment point of view is assigned to the other segments or subsegments.

By this means it is possible to represent the segment point of view of a segment or subsegment by a link to the segment point of view of another segment or subsegment.

Figures 16, 17:
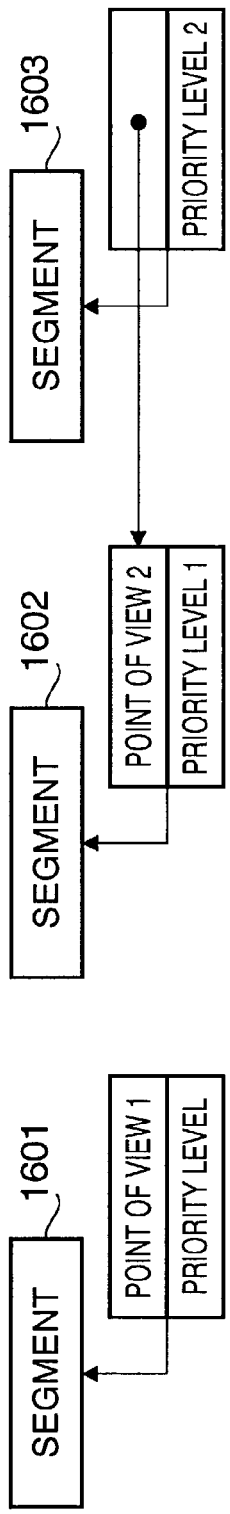
FIG. 16 is a drawing showing another mode of segments according to an embodiment of the present invention.
FIG. 17 is a drawing showing examples of segment descriptions according to an embodiment of the present invention.

This mode will be described in detail below using FIG. 16 and FIG. 17. FIG. 16 is a drawing showing another mode of segments according to an embodiment of the present invention. FIG. 17 is a drawing showing examples of segment descriptions according to an embodiment of the present invention.

As can be seen from FIG. 16, segment 1601 is a segment that has the structure already described in Embodiment 1 to Embodiment 4. Segment 1601 is assigned a segment point of view and a segment priority level.

Segment 1602 and segment 1603 are assigned the same segment point of view. Segment 1603 is assigned link information for segment 1602, and is linked to segment 1602.

Segment 1602 and segment 1603 will now be described in detail using FIG. 17.

Segment 1602 contains a segment point of view (keyword) ID number (id) 1701. In this example, the ID number 1701 is 1. Segment 1602 also contains a segment priority level (P) 1702 corresponding to the keyword. In this example, the segment priority level is 5. Also, "TeamA" is entered as a keyword in segment 1602.

Segment 1603 contains a reference number (idref) 1703 for another segment point of view (keyword) which is link information. In this example, the reference number 1701 is 1. That is to say, segment 1603 references a keyword whose ID number is 1.

Thus, the keyword of segment 1603 is "TeamA". Segment 1603 contains a segment priority level (P) 1704 corresponding to the keyword. In this example, the segment priority level is 2.

Linking segment keywords in this way makes it unnecessary to enter keywords for all segments. In addition, linking segment keywords makes explicit the relationship between segments.

(Embodiment 5)

A data adaptation apparatus according to Embodiment 5 of the present invention will now be described below. The system configuration of Embodiment 5 is the same as that of Embodiment 1 to Embodiment 4.

In Embodiment 5, with regard to segment points of view added to segments or subsegments, a table summarizing all segment points of view to be registered (point of view table) is provided as a content sub-element which is an element of the top level of context structure description data.

Figure 18:
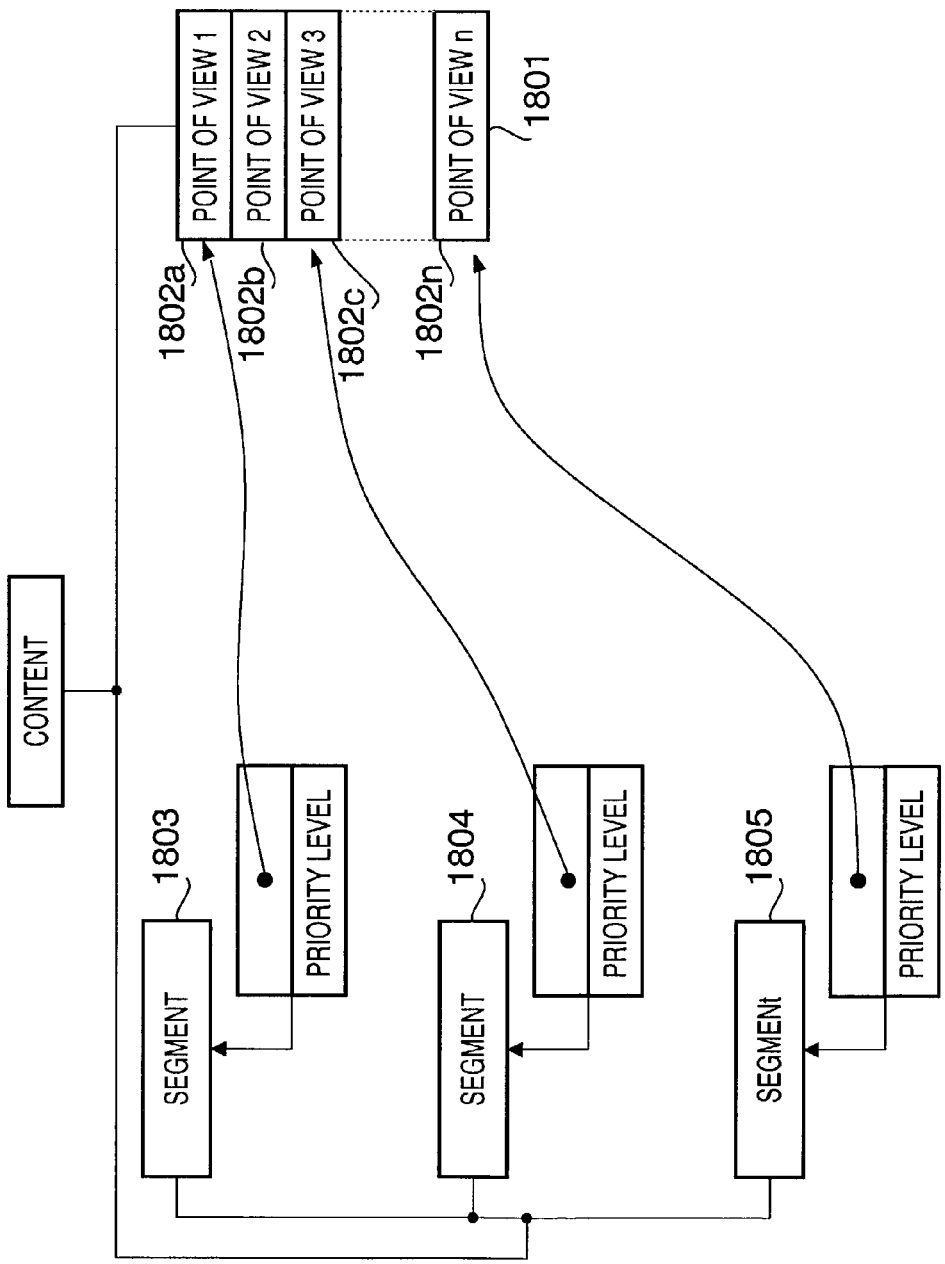
FIG. 18 is a drawing showing the data structure according to Embodiment 5 of the present invention.

Next, the data structure according to Embodiment 5 will be described using FIG. 18 and FIG. 19. FIG. 18 is a drawing showing the data structure according to Embodiment 5. FIG. 19 is a drawing showing an example of data descriptions according to Embodiment 5.

As can be seen from FIG. 18, content has a point of view table 1801 as a sub-element. In the point of view table 1801 are stored a plurality of segment points of view 1802a to 1802n included in the content.

Also, the content includes a plurality of segments 1803 to 1805. Segment 1803 is assigned link information for the point of view table 1801, and is linked to segment point of view 1802a of the point of view table 1801. Segment 1804 is assigned link information for the point of view table 1801, and is linked to segment point of view 1802b of the point of view table 1801. Segment 1804 is assigned link information for the point of view table 1801, and is linked to segment point of view 1802c of the point of view table 1801. Also, segments 1803 to 1805 are assigned segment priority levels corresponding to the respective segment points of view.

Next, the data structure according to Embodiment 5 will be described in detail using FIG. 19.

The point of view table 1801 contains segment points of view 1802a to 1802c. Segment point of view 1802a contains an ID number (id) 1901a. In this example, ID number 1901a is 1. Also, segment point of view 1802a is indicated by the text "A".

Segment point of view 1802b contains an ID number (id) 1901b. In this example, ID number 1901b is 2. Also, segment point of view 1802b is indicated by the text "B". Segment point of view 1802c contains an ID number (id) 1901c. In this example, ID number 1901c is 3. Also, segment point of view 1802c is indicated by the text "C".

Meanwhile, segments 1803 to 1805 contain reference numbers (idref) 1903a to 1903c, respectively, which are link information for segment points of view 1802a to 1802c of the point of view table 1801.

In this example, reference number 1903a of segment 1803 is 1. That is to say, segment 1803 references user point of view 1802a whose ID number is 1. Therefore, the keyword of segment 1803 is "A". Segment 1803 also contains a segment priority level (P) 1904a corresponding to the keyword. In this example, the segment priority level is 2. Also, reference number 1903b of segment 1804 is 2. That is to say, segment 1804 references user point of view 1802b whose ID number is 2. Therefore, the keyword of segment 1804 is "B".

Segment 1804 also contains a segment priority level (P) 1904b corresponding to the keyword. In this example, the segment priority level is 3. Also, reference number 1903c of segment 1805 is 3. That is to say, segment 1805 references user point of view 1802c whose ID number is 3. Therefore, the keyword of segment 1805 is "C". Segment 1805 also contains a segment priority level (P) 1904c corresponding to the keyword. In this example, the segment priority level is 4.

Using this kind of configuration makes it easy to present a segment point of view list to the user in advance. By this means, the user can ascertain the segment points of view that appear there before inputting a desired segment point of view. Also, segment point of view input by the user can be carried out by making a selection from the point of view table.

A configuration may also be used whereby a pair comprising a link to a corresponding point of view in this point of view table and a corresponding score are added to each segment or subsegment.

Also, the point of view table may have a configuration for provision to a certain segment or subsegment rather than content, and may use a special description.

Moreover, it is also possible to mix pairs of link to point of view list and score and pairs of point of view and score, rather than representing all cases by a link to the point of view list.

Figure 20:
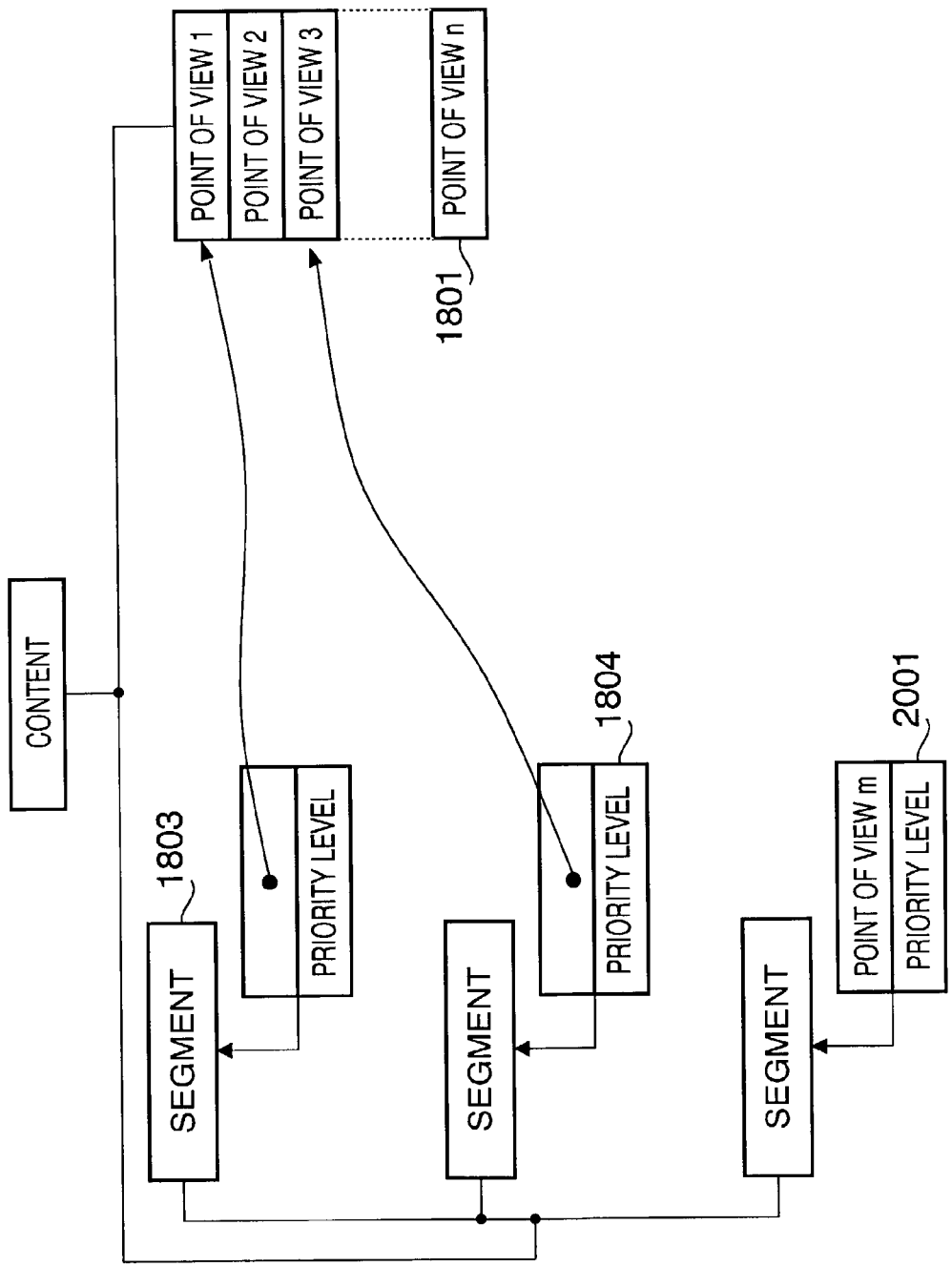
FIG. 20 is a drawing showing another example of the data structure according to Embodiment 5 of the present invention.

FIG. 20 is a drawing showing a data configuration with pairs of point of view and score mixed. As can be seen from FIG. 20, segments 1803 and 1804 that have link information for the point of view table 1801 and a segment 2001 that does not have link information for the point of view table 1801 are mixed in the content.

Figure 21:
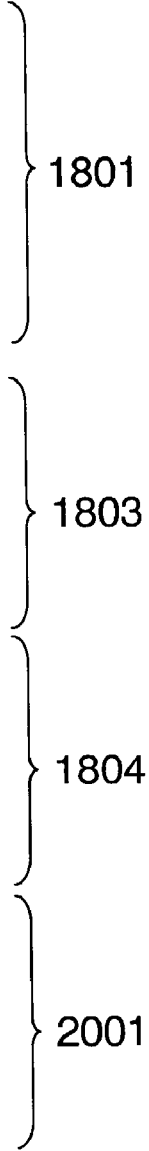
FIG. 21 is a drawing showing another example of descriptions of the data structure according to Embodiment 5 of the present invention.

FIG. 21 shows sample descriptions of the data configuration shown in FIG. 20. As can be seen from this drawing, it is not necessary to enter in the point of view table 1801 all the segment points of view that appear in the context contents description data, and only items referenced by a link are included. Also, segment 2001 does not include link information for the point of view table 1801.

(Embodiment 6)

A data adaptation apparatus according to Embodiment 6 of the present invention will now be described below.

In Embodiment 6, a point of view table showing a list of segment points of view that appear in context contents description data is provided, and is presented to the user before input.

Figure 22:
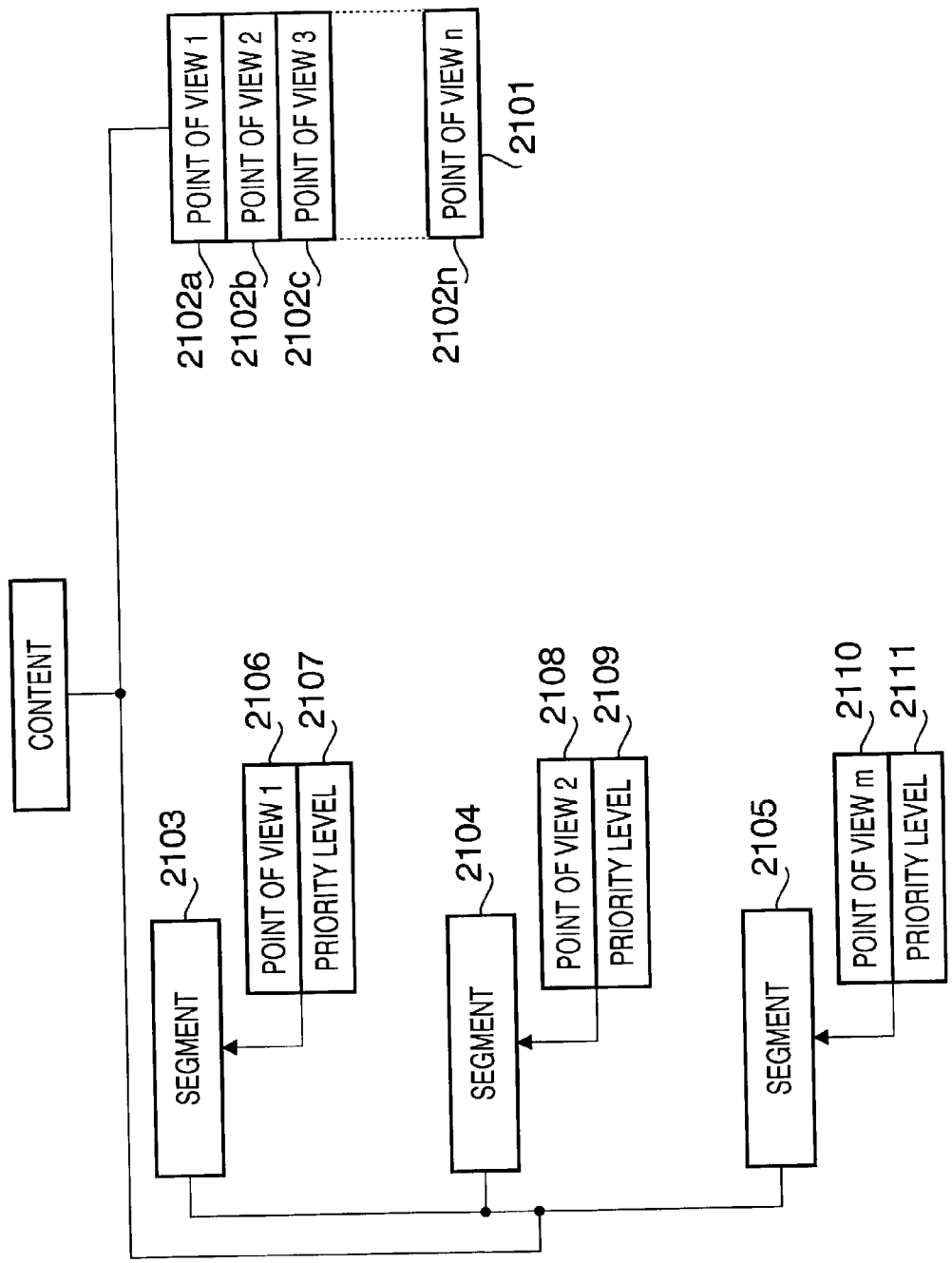
FIG. 22 is a drawing showing the data structure according to Embodiment 6 of the present invention.

The data structure according to Embodiment 6 will be described using FIG. 22.

Content according to Embodiment 6 is composed of a point of view table 2101 and a plurality of segments 2103 to 2105. Point of view table 2101 contains a plurality of segment points of view 2102a to 2102n.

Segment point of view 2106 and segment priority level 2107 are contained in segment 2103, segment point of view 2108 and segment priority level 2109 in segment 2104, and segment point of view 2110 and segment priority level 2122 in segment 2105. Unlike segments in Embodiment 5, segments 2103 to 2105 do not contain link information for point of view table 2101. That is to say, segments 2103 to 2105 and point of view table 2101 are configured independently.

FIG. 23 is a drawing showing an example of data descriptions according to Embodiment 6 of the present invention. As can be seen from FIG. 23, points of view 2106, 2108, and 2110 included in segments 2103 to 2105 are stored in point of view table 2101. To be specific, points of view 2301 to 2303 are stored for points of view 2106, 2108, and 2110.

Then point of view table 2101 is displayed before the user inputs a user point of view.

By this means, the user can ascertain the segment points of view that appear there before inputting a desired user point of view. Another effect is that user point of view input by the user can be carried out by making a selection from the point of view table.

(Embodiment 7)

A data adaptation apparatus according to Embodiment 7 of the present invention will now be described below.

In Embodiment 7, when context contents description data is to be represented so as to be capable of being processed by a computer, it is represented divided into a part that describes the structure and a part that describes points of view, which are attributes, and their scores.

Figure 24:
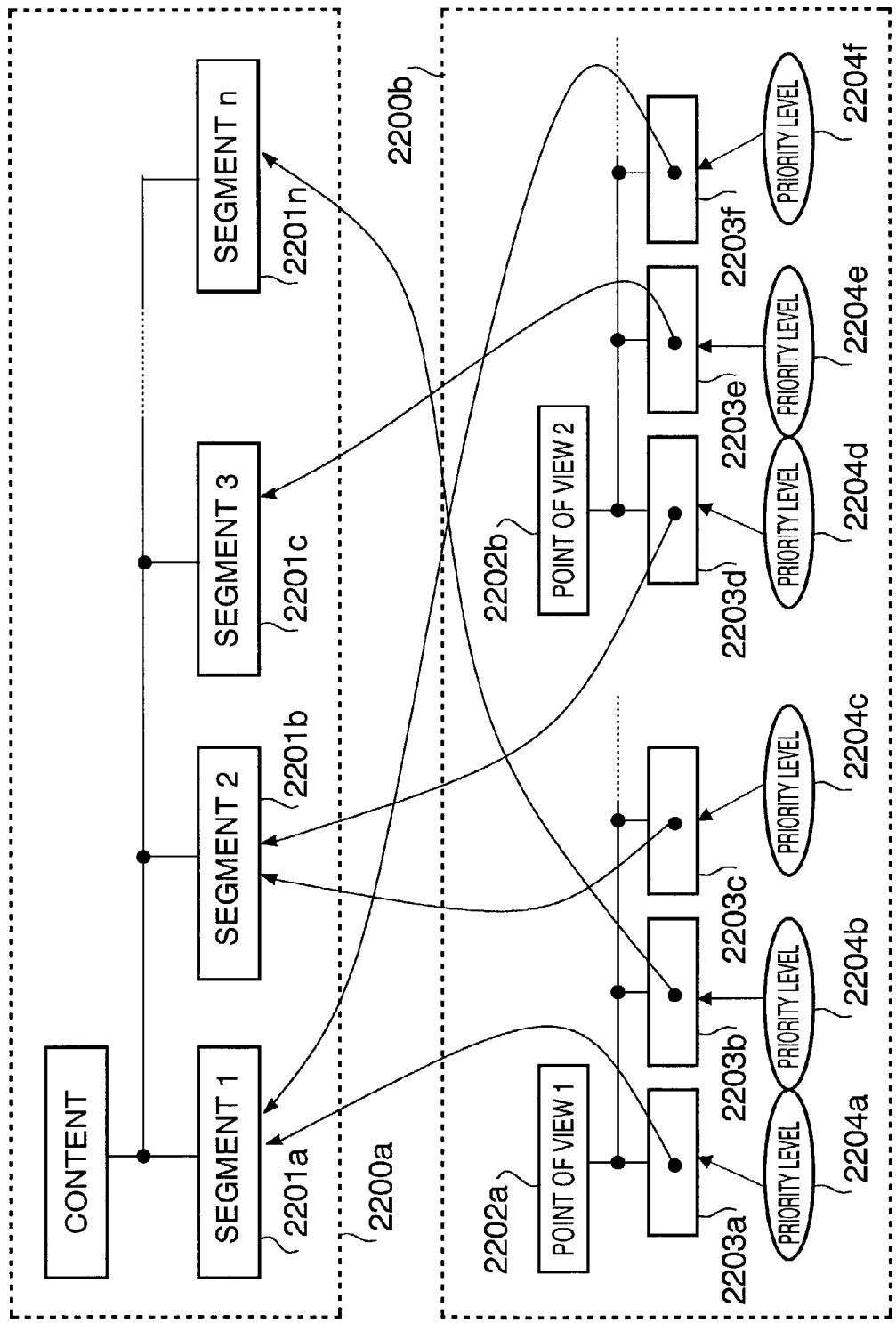
FIG. 24 is a drawing showing the data structure according to Embodiment 7 of the present invention.

Embodiment 7 will be described below using FIG. 24 and FIG. 25. FIG. 24 is a drawing showing the data structure according to Embodiment 7. FIG. 25 is a drawing showing data descriptions according to Embodiment 7.

Shown in the upper half of FIG. 24 is the structure part 2200a which describes the structure, and shown in the lower half is the attribute part 2200b which describes the attributes segment points of view and their priority levels. The content of structure part 2200a includes descriptions of a plurality of segments 2201a to 2201n.

In this drawing, the part describing the structure describes the simplest structure, but configurations such as described in other embodiments can also be handled.

Also, the attribute part 2200b includes descriptions of a plurality of segment points of view 2202a and 2202b. Pairs of link information 2203a to 2203f for the target segments and subsegments and priority levels 2204a to 2204f relating to segment points of view 2202a and 2202b are assembled for each of segment points of view 2202a and 2202b.

Next, the data structure according to Embodiment 7 will be described in detail using FIG. 25.

As can be seen from FIG. 25, the content includes a plurality of segments 2201a to 2201c. Segment 2201a is assigned a segment ID number (id) 2301a. In this example, id 2301a is 1. Segment 2201b is assigned a segment ID number (id) 2301b. In this example, id 2301b is 2. Segment 2201n is assigned a segment ID number (id) 2301n. In this example, id 2301n is n.

Meanwhile, it can be seen from FIG. 25 that segment point of view 2202a is "TeamA". Also, segment point of view 2202a includes a plurality of segment priority levels 2204a to 2204c. In this example, the priority level of segment priority level 2204a is 3, the priority level of segment priority level 2204b is 2, and the priority level of segment priority level 2204c is 5.

Also, segment priority level 2202a is assigned respective link information 2203a to 2203c. As link information 2203a to 2203c, reference numbers idref for referencing ID numbers 2301a to 2301c of segments 2201a to 2201c are written. In this example, idref of segment priority level 2204a is 1, idref of segment priority level 2204b is n, and idref of segment priority level 2204c is 2. Thus, the target segment of segment priority level 2204a is segment 2201a, the target segment of segment priority level 2204b is segment 2201c, and the target segment of segment priority level 2204c is segment 2201n.

In this way it is possible to reference segments 2201a to 2201c from segment priority levels 2204a to 2204c.

Moreover, it can be seen from FIG. 25 that segment point of view 2202b is "TeamB". Also, segment point of view 2202b includes a plurality of segment priority levels 2204d to 2204f. In this example, the priority level of segment priority level 2204d is 4, the priority level of segment priority level 2204e is 5, and the priority level of segment priority level 2204f is 2.

Also, segment priority level 2202b is assigned respective link information 2203d to 2203f. As link information 2203d to 2203f, reference numbers idref for referencing ID numbers 2301a to 2301c of segments 2201a to 2201c are written. In this example, idref of segment priority level 2204d is 2, idref of segment priority level 2204e is 3, and idref of segment priority level 2204f is 1. Thus, the target segment of segment priority level 2204d is segment 2201b, the target segment of segment priority level 2204e is segment 2201c, and the target segment of segment priority level 2204f is segment 2201a In this way it is possible to reference segments 2201a to 2201n from segment priority levels 2204a to 2204f.

Segment selection processing in the case of this kind of data structure will now be described. First, the above-described segment selection section 16 or 26 selects priority levels 2204a to 2204f for each of target segment points of view 2202a and 2202b from the parts contained in the attribute part 2200b. As selected priority levels 2204a to 2204f are assigned link information 2203a to 2203f respectively, it is possible to select segments 2201a to 2201n which are the targets of selected priority levels 2203a to 2203f. By this means, segment selection sections 16 and 26 can select target segments 2201a to 2201n by specifying segment priority level 2204a for each of segment points of view 2202a and 2202b.

The same effect is obtained if the link information 2203a to 2203f and priority level 2204a to 2204f parts are written separately rather than in the same file.

A mode can also be conceived whereby segments and segment points of view are linked in both directions.

Figure 26:
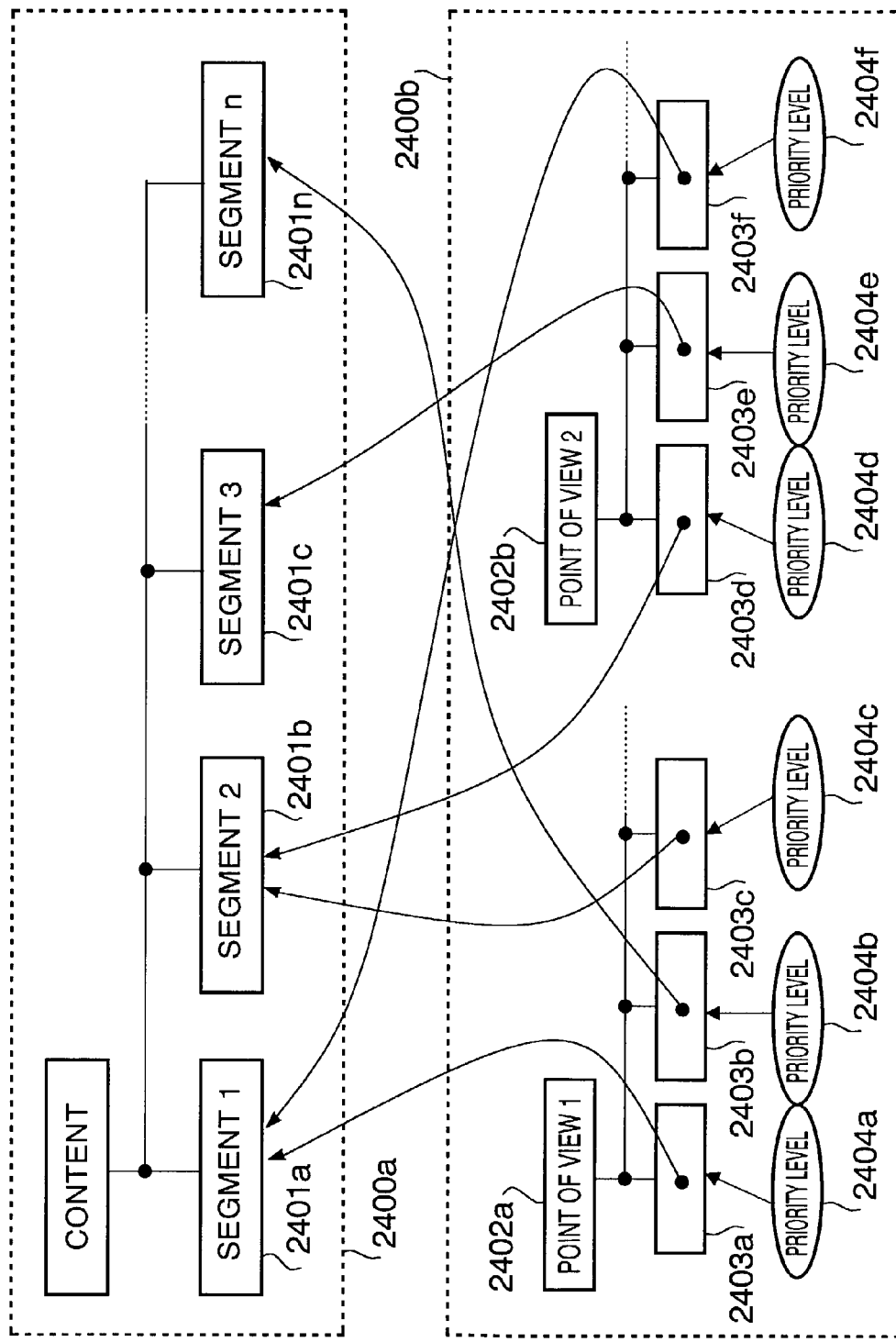
FIG. 26 is a drawing showing another example of the data structure according to Embodiment 7 of the present invention.

This mode will be described below using FIG. 26 and FIG. 27. FIG. 26 is a drawing showing a data structure according to Embodiment 7. FIG. 27 is a drawing showing data descriptions according to Embodiment 7.

As in Embodiment 7, the data in this mode, also, is composed of a structure part 2400a and an attribute part 2400b. The content of the structure part 2400a includes descriptions of a plurality of segments 2401a to 2401n. The attribute part 2400b includes descriptions of a plurality of segment points of view 2402a and 2402b. Pairs of link information 2403a to 2403f for the target segments and subsegments and priority levels 2404a to 2404f relating to segment points of view 2402a and 2402b are assembled for each of segment points of view 2402a and 2402b.

Also, in this mode, since structure part 2400a and attribute part 2400b are linked in both directions, link information for segment priority levels 2402a to 2404f is also included in segment 2401a to segment 2401n.

Next, the data structure according to this embodiment will be described in detail using FIG. 27.

As can be seen from FIG. 27, the content includes a plurality of segments 2401a to 2401c. Segment 2401a is assigned a segment ID number (id) 2501a. In this example, id 2501a is 1. Segment 2401b is assigned a segment ID number (id) 2501b. In this example, id 2501b is 2. Segment 2401c is assigned a segment ID number (id) 2501c. In this example, id 2501c is 3.

Meanwhile, segment point of view 2402a includes a plurality of segment priority levels 2404a to 2404c. In this example, the priority level of segment priority level 2404a is 3, the priority level of segment priority level 2404b is 2, and the priority level of segment priority level 2404c is 5.

Also, segment priority level 2402a is assigned respective link information 2403a to 2403c. As link information 2403a to 2403c, reference numbers idref for referencing ID numbers 2501a to 2501c of segments 2401a to 2401c are written. In this example, idref of segment priority level 2404a is 1, idref of segment priority level 2404b is 2, and idref of segment priority level 2404c is n.

Thus, the target segment of segment priority level 2404a is segment 2401a, the target segment of segment priority level 2404b is segment 2401b, and the target segment of segment priority level 2404c is segment 2401n.

Meanwhile, segment point of view 2402b includes a plurality of segment priority levels 2404d to 2404f. In this example, the priority level of segment priority level 2404d is 4, the priority level of segment priority level 2404e is 5, and the priority level of segment priority level 2404f is 2.

Also, segment priority level 2402b is assigned respective link information 2403d to 2403f. As link information 2403d to 2403f, reference numbers idref for referencing ID numbers 2501a to 2501c of segments 2401a to 2401c are written. In this example, idref of segment priority level 2404d is 2, idref of segment priority level 2404e is 3, and idref of segment priority level 2204f is 1.

Thus, the target segment of segment priority level 2404d is segment 2401b, the target segment of segment priority level 2404e is segment 2401c, and the target segment of segment priority level 2404f is segment 2401a.

Also, segment priority level 2402a is assigned respective priority level ID numbers (idref) 2503a to 2503c. In this example, priority level ID number 2503a is p110, priority level ID number 2503b is p102, and priority level ID number 2503c is p103.

Moreover, segment priority level 2402b is assigned respective priority level ID numbers (idref) 2503d to 2503f. In this example, priority level ID number 2503d is p201, priority level ID number 2503e is p202, and priority level ID number 2503f is p203.

Meanwhile segments 2401a to 2401n are assigned priority level reference numbers (idrefs) 2502a to 2502e for referencing priority level ID 2503a to 2503c, which are link information for segment priority levels 2404a to 2404f. In this example, idrefs 2502a is p110, idrefs 2502b is p203, idrefs 2502c is p102, idrefs 2502d is p201, and idrefs 2502e is p202.

Thus, the target segment priority levels of segment 2401a are segment priority levels 2404a and 2404f, the target segment priority levels of segment 2401b are segment priority levels 2404c and 2404d, and the target segment priority level of segment 2401n is segment priority level 2404b.

In this way, segments 2401a to 2401n and segment priority levels 2204a to 2204f can be referenced in both directions. As a result, segment selection sections 16 and 26 can perform processing either using the method described in Embodiment 1 to Embodiment 6 or using the method described in Embodiment 7.

(Embodiment 8)

A data adaptation apparatus according to Embodiment 8 of the present invention will now be described below.

In Embodiment 8, as in Embodiment 7, context contents description data representation is divided into a part that describes the structure and a part that describes points of view, which are attributes, and their scores. However, in Embodiment 8, representation is not by means of a pair comprising a link to a segment and the segment priority level, but instead items are listed in high-to-low segment priority level order for each segment point of view.

Figure 28:
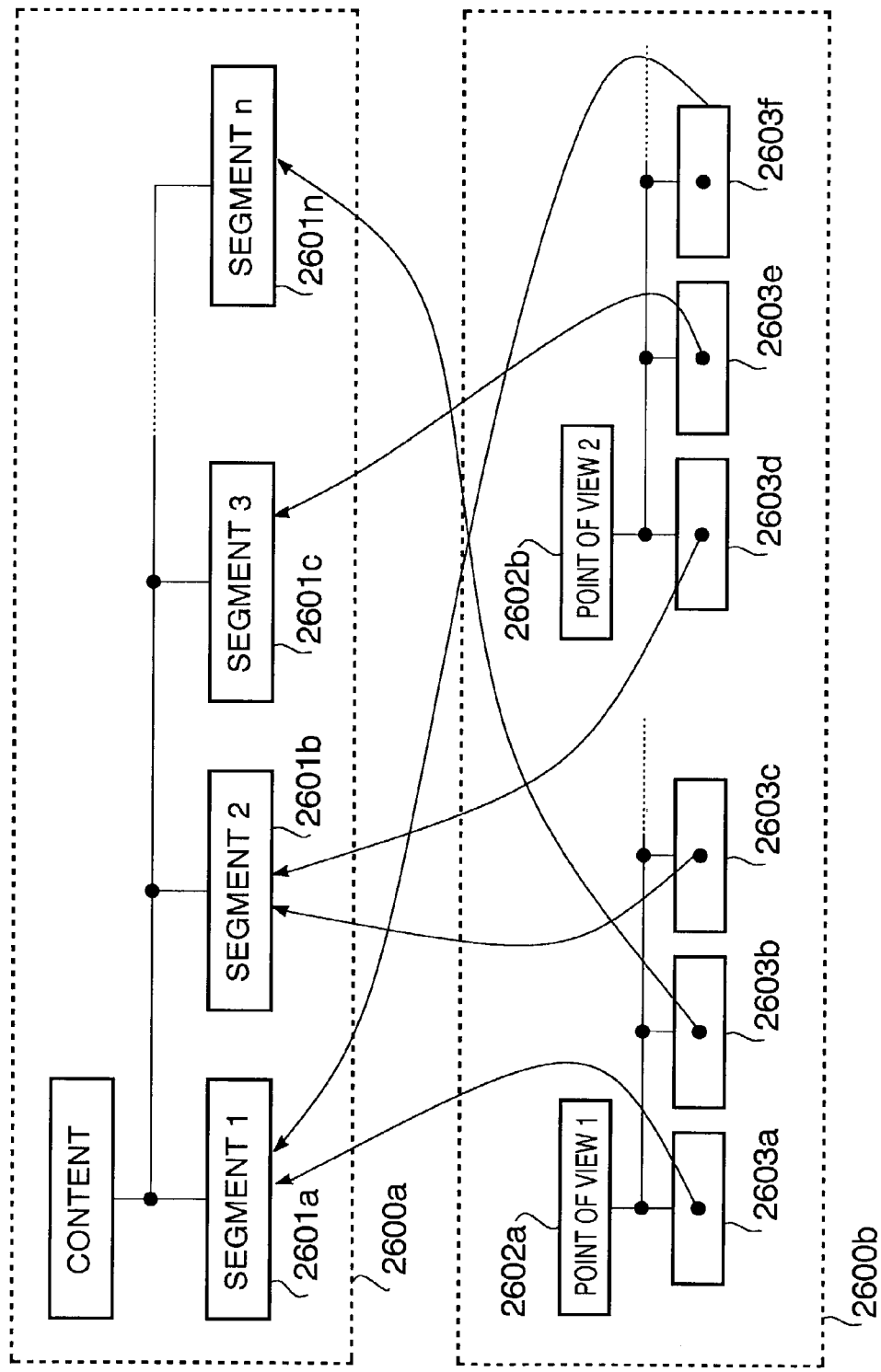
FIG. 28 is a drawing showing the data structure according to Embodiment 8 of the present invention.

Embodiment 8 will be described below using FIG. 28 and FIG. 29. FIG. 28 is a drawing showing the data structure according to Embodiment 8. FIG. 29 is a drawing showing data descriptions according to Embodiment 8.

As shown in FIG. 28, the data structure according to Embodiment 8 is composed of a structure part 2600a that describes the structure and an attribute part 2600b. The content of structure part 2600a includes descriptions of a plurality of segments 2601a to 2601n. The attribute part 2600b includes descriptions of a plurality of segment points of view 2602a and 2602b. Link information 2603a to 2603f for the target segment or subsegment is included for each of segment points of view 2602a and 2602b.

Next, the data structure according to Embodiment 8 will be described in detail using FIG. 29.

As can be seen from FIG. 29, the content includes a plurality of segments 2601a to 2601n. Segments 2601a to 2601n are assigned segment ID numbers (id) 2701a to 2701n, respectively. In this example, id 2701a is 1, id 2701b is 2, and id 2701n is n.

Meanwhile, it can be seen from FIG. 29 that segment point of view 2602a is "TeamA". Also, segment point of view 2602a is assigned respective link information 2603a to 2603c. As link information 2603a to 2603c, reference numbers idref 2702a to 2702c for referencing ID numbers 2701a to 2701n of segments 2601a to 2601n are written. In this example, idref 2702a is 1, idref 2702b is n, and idref 2702c is 2.

Moreover, as regards link information 2603a to 2603c, since the description order is recognized as segment priority level, in this example the segment priority level of link information 2603a is the highest and the segment priority level of link information 2603c is the lowest.

Thus, the segment priority level of segment 2601a is the highest and the segment priority level of segment 2601b is the lowest.

Meanwhile, it can be seen from FIG. 29 that segment point of view 2602b is "TeamB". Also, segment point of view 2602b is assigned respective link information 2603d to 2603f. As link information 2603d to 2603f, reference numbers idref 2702d to 2702f for referencing ID numbers 2701a to 2701n of segments 2601a to 2601n are written. In this example, idref 2702d is 2, idref 2702e is 3, and idref 2702f is 1.

Moreover, as regards link in formation 2603d to 2603f, since the description order is recognized as segment priority level, in this example the segment priority level of link information 2603d is the highest and the segment priority level of link information 2603f is the lowest.

In this way, segments 2201a to 2201n can be referenced from segment points of view 2602a and 2602b, and priority levels can be determined, even though segment priority levels are not included in segment points of view 2602a and 2602b.

Figure 30:
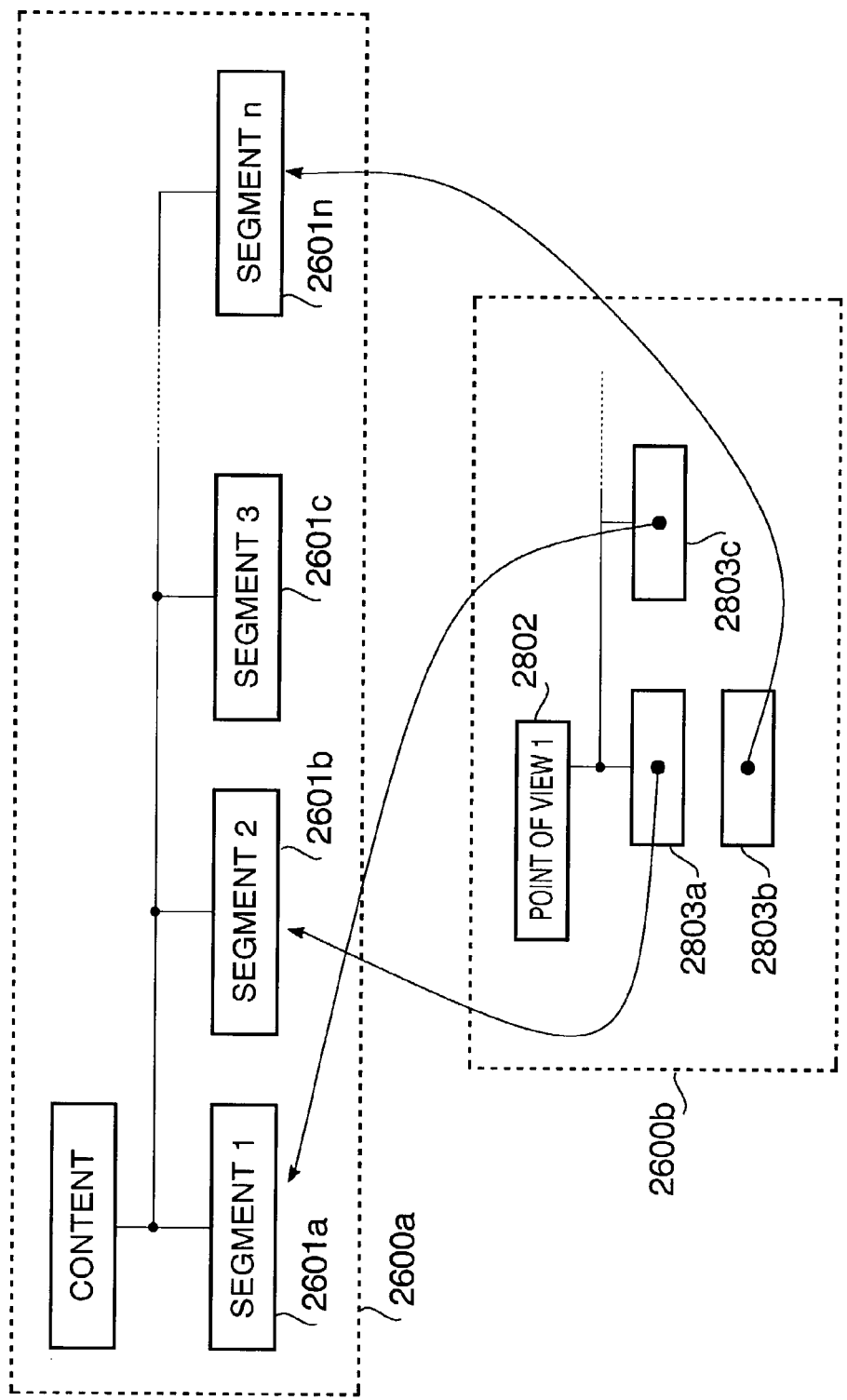
FIG. 30 is a drawing showing another example of the data structure according to Embodiment 8 of the present invention.

In FIG. 28, there is a different segment priority level for each segment (or subsegment), but it is also possible to describe items that have the same segment priority level, as shown in FIG. 30.

In the example shown in FIG. 30, in segment point of view 2802 of the attribute part 2800 items appear in high-to-low segment priority level order from left to right, and items with the same segment priority level are written aligned vertically.

To be specific, link information 2803a and link information 2803b are written aligned vertically, and link information 2803a is written to the left of link information 2803c. Link information 2803a links to segment 2601b, link information 2803c links to segment 2601a, and link information 2803b links to segment 2601n. That is to say, segment 2601b and segment 2601n have the same segment priority level, and segment 2601a has a lower segment priority level than segment 2601b and segment 2601n.

The data structure in FIG. 30 will now be described in detail using FIG. 31.

As can be seen from FIG. 31, the content includes a plurality of segments 2601a to 2601n. Segments 2601a to 2601n are assigned segment ID numbers (id) 2901a to 2901n, respectively. In this example, id 2901a is 1, id 2901b is 2, and id 2901n is n.

Meanwhile, it can be seen from FIG. 31 that segment point of view 2802 is "TeamA". Also, segment point of view 2602a is assigned respective link information (idref) 2803a to 2803c. In this example, idref 2803a is 2, idref 2803b is 1, and idref 2803c is n.

Moreover, as regards link information 2803a to 2803c, since the description order is recognized as segment priority level, in this example the segment priority level of link information 2803a is the highest and the segment priority level of link information 2803c is the lowest.

Thus, the segment priority level of segment 2601a is the highest and the segment priority level of segment 2601b is the lowest.

In this way, it is possible to describe segments that have the same segment priority level even though segment priority levels are not included in segment points of view.

The above-described segment selection sections 16 and 26 perform segment selection using the method described in Embodiment 7.

(Embodiment 9)

In Embodiments 1 to 8 of the present invention, content identification is performed by means of a content identifier. However, content identification may also be performed by means of a keyword or keyword co-occurrence probability rather than performing content identification by means of a content identifier. Moreover, content identification may also be performed by means of another method.

Also, it is possible not to prepare user preferences for each content item, but to prepare user preferences as a number of preference categories or general preferences for individual age brackets or groups, etc., as defaults unrelated to a user's preferences.

In Embodiment 9, content identification is not performed by means of a content identifier. User preferences according to Embodiment 9 will be described in detail below using FIG. 32 and FIG. 33. FIG. 32 and FIG. 33 are drawings showing description definitions of user preferences according to Embodiment 9.

In the drawings, a user preference is indicated by UserPreference, a keyword by PreferenceSummaryTheme, duration information for displaying content by SummaryDuration, and a priority level corresponding to a keyword as preferencevalue.

As can be seen from the drawings, UserPreference 3201 is defined as including, as user information as elements, UserIdentifier 3202, which is an identifier for identifying the user, and UsagePreference 3203, which is user preference information. Also, UsagePreference 3203 is defined as including 0 items or 1 item.

Next, the definition of UserIdentifier 3202 will be described. As indicated by reference numeral 3204 in the drawings, UserIdentifier 3202 is defined as not including any elements. Also, UserIdentifier 3202 is defined as including protected 3204, which is information indicating whether rewriting is possible, and userName 3205, which is the user name, as attributes. For protected 3204, one of the following is selected: "true" meaning that rewriting is possible, "false" meaning that rewriting is not possible, or "user" meaning that rewriting may be possible depending on the user. The default setting for protected 3204 is "true". userName 3205 is defined as CDATA—that is, text information. By default, userName 3205 is defined as "anonymous".

Next, the definition of UsagePreference 3203 will be described. As indicated by reference numeral 3206 in the drawings, UsagePreference 3203 is defined as including, as elements, 0 or more BrowsingPreferences 3207 that hold information on, for example, conditions such as time, weather, etc. Also, UsagePreference 3203 is defined as including, as an attribute, allowAutomaticupdate 3208, which is information indicating whether automatic rewriting by an administrator, etc., is possible. For allowAutomaticupdate 3208, one of the following is selected: "true" meaning that rewriting is possible, "false" meaning that rewriting is not possible, or "user" meaning that rewriting may be possible depending on the user. The default setting for allowAutomaticupdate 3208 is "true".

Next, the definition of BrowsingPreferences 3207 will be described. As indicated by reference numeral 3209 in the drawings, BrowsingPreferences 3207 is defined as having 0 or more Summarypreferences 3210 as elements. Also, BrowsingPreferences 3207 is defined as including, as elements, protected 3211, which is information indicating whether automatic rewriting is possible, and preferencevalue 3212, which is the priority level of BrowsingPreferences 3207, as attributes. For protected 3211, one of the following is selected: "true" meaning that rewriting is possible, "false" meaning that rewriting is not possible, or "user" meaning that rewriting may be possible depending on the user. The default setting for protected 3211 is "true". preferencevalue 3212 is defined as CDATA—that is, text information. The default setting for preferencevalue 3212 is 100.

As BrowsingPreferences 3207 has preferencevalue 3212 in this way, it is possible to perform processing with Userpreference 3201 assigned a priority level even at a higher level, BrowsingPreferences 3207.

Next, the definition of SummaryPreferences 3210 will be described. As indicated by reference numeral 3301 in the drawings, SummaryPreferences 3210 is defined as having 0 or more PreferredSummaryTheme 3302 items, which are keywords, and 0 or 1 SummaryDuration 3303, which is display interval information, as elements.

Also, SummaryPreferences 3210 is defined as having preferencevalue 3304, which is a priority level, as an attribute.

The fact that SummaryPreferences 3210 has priority level preferencevalue 3304 as an attribute in this way makes it possible to perform processing with a priority level assigned even in BrowsingPreferences 3207, which is at a higher level than keyword PreferredSummaryTheme 3302.

Next, the definition of PreferredSummaryTheme 3302 will be described. As indicated by reference numeral 3305 in the drawings, PreferredSummaryTheme 3302 is defined as having text data as an element. Also, PreferredSummaryTheme 3302 is defined as having, as options, xml:lang 3306, which is language information, and preferencevalue 3307, which is priority level information, as attributes. The default setting for priority level information preferencevalue 3307 is 100.

The fact that PreferredSummaryTheme 3302 has priority level information preferencevalue 3307 in this way makes it possible to process PreferredSummaryTheme 3302 with a priority level assigned.

Also, as indicated by reference numeral 3308 in the drawings, SummaryDuration 3303 is defined as having text data as an element.

Thus, with user preferences according to Embodiment 9, it is possible to perform, not processing for particular content, but processing for each higher level: BrowsingPreferences 3207, SummaryPreferences 3210, and PreferredSummaryTheme 3302. Also, prioritized processing is possible for each level above PreferredSummaryTheme 3302—that is, BrowsingPreferences 3207 and SummaryPreferences 3210.

Next, an actual description of user preferences according to Embodiment 9 will be described using FIG. 34. FIG. 34 is a drawing showing a sample description of user preferences according to Embodiment 9. The sample user preference description shown in FIG. 34 is the sample user preference description shown in FIG. 4 adapted to Embodiment 9.

As indicated by reference numeral 3401 in the drawing, for UserIdentifier, "true" is entered for protected and "Bob" as userName. Also, as indicated by reference numeral 3402 in the drawing, for UsagePreferences, "false" is entered for allowAutomaticUpdate. And as indicated by reference numeral 3403 in the drawing, for BrowsingPreferences, "true" is entered for protected.

Also, in UserPreference 3400, two SummaryPreferences 3404a and 3404b are entered.

As indicated by reference numeral 3405a in the drawing, for SummaryPreferences 3404a, the information "Nakata!" is entered as PreferredSummaryTheme. preferencevalue of PreferredSummaryTheme indicated by reference numeral 3405a in the drawing is 500. As indicated by reference numeral 3406a in the drawing, for SummaryPreferences 3404a, the information "Soccer" is entered as PreferredSummaryTheme. preferencevalue of PreferredSummaryTheme indicated by reference numeral 3406a in the drawing is 400. As indicated by reference numeral 3407a in the drawing, for SummaryPreferences 3404a, the information "Japan" is entered as PreferredSummaryTheme. preferencevalue of PreferredSummaryTheme indicated by reference numeral 3407a in the drawing is 200. And as indicated by reference numeral 3408a in the drawing, "PT5M"—that is, information indicating 5 minutes-is entered for SummaryDuration.

As indicated by reference numeral 3405b in the drawing, for SummaryPreferences 3404b, the information "Headline" is entered as PreferredSummaryTheme. preferencevalue of PreferredSummaryTheme indicated by reference numeral 3405b in the drawing is 500. As indicated by reference numeral 3406b in the drawing, for SummaryPreferences 3404b, the information "Stock" is entered as PreferredSummaryTheme. preferencevalue of PreferredSummaryTheme indicated by reference numeral 3406b in the drawing is 500. As indicated by reference numeral 3407b in the drawing, for SummaryPreferences 3404b, the information "Sports" is entered as PreferredSummaryTheme. preferencevalue of PreferredSummaryTheme indicated by reference numeral 3407b in the drawing is 300. And as indicated by reference numeral 3408b in the drawing, "PT3M"—that is, information indicating 3 minutes—is entered for SummaryDuration.

As shown above, a description with contents corresponding to FIG. 4 can also be achieved by means of user preference definitions according to Embodiment 9.

Next, segment descriptions according to Embodiment 9 will be described. First, segment definitions according to Embodiment 9 will be described using FIG. 35 to FIG. 37. FIG. 35 to FIG. 37 are drawings showing segment description definitions according to Embodiment 9.

In this example, the definition of AudioVisualSegment, an audio and visual segment, will be described.

As indicated by reference numeral 3501 in the drawings, AudioVisualSegment 3502 is defined as including 0 or more PointofView 3503 and MediaTime 3504 items as elements. Pointofview 3503 is an element that includes a point of view relating to the segment. MediaTime 3504 is an element that includes the segment duration, etc.

Also, as indicated by reference numeral 3505 in the drawings, AudioVisualSegment 3502 is defined as having an identifier ID as an attribute. Moreover, AudiovisualSegment 3502 is defined as having, as attributes, URL reference information href as an option as indicated by reference numeral 3506 in the drawings, and ID reference information idref as an option as indicated by reference numeral 3507 in the drawings.

Next, the definition of PointofView 3503 will be described. As indicated by reference numeral 3508 in the drawings, Pointofview 3503 is defined as having, as elements, 0 or 1 SupplementalInfo 3509 item and 1 or more Value 3510 items. SupplementalInfo 3509 is a comment indicating the contents of Pointofview 3503. Value 3510 is priority level information for PointofView 3503.

As indicated by reference numeral 3511 in the drawings, Pointofview 3503 is defined as having identifier information id as an option in its attributes. Also, as indicated by reference numeral 3512 in the drawings, Pointofview 3503 is defined as having segment viewpoint viewpoint as an attribute. And viewpoint is defined as being written as text information.

Next, the definition of value 3510 will be described. As indicated by reference numeral 3513 in the drawings, Value 3510 is defined as including text information as an element. Also, as indicated by reference numeral 3514 in the drawings, Value 3510 is defined as having an identifier id as an attribute. Identifier id of Value 3510 is defined as being an option.

The fact that Pointofview 3503 and Value 3510 have id, and AudiovisualSegment 3502 has idref that references these id's makes it possible for AudioVisualSegment 3502 to reference PointofView 3503 and Value 3510 by means of idref. That is to say, AudioVisualSegment 3502 can link to Pointofview 3503 and Value 3510 by means of idref.

Next, the definition of SupplementalInfo 3509 will be described. As indicated by reference numeral 3601 in the drawings, SupplementalInfo 3509 is defined as having at least one FreeTextAnnotation 3602 or StructuredAnnotation 3603 as an element.

Also, as indicated by reference numeral 3604 in the drawings, SupplementalInfo 3509 is defined as having text data as an element. And, as indicated by reference numeral 3605 in the drawings, SupplementalInfo 3509 is defined as having language information as an attribute.

Next, the definition of StructuredAnnotation 3603 will be described. As indicated by reference numeral 3606 in the drawings, StructuredAnnotation 3603 is defined as having, as elements, 0 or 1 Who 3607 item, which is information indicating who performed an action, or 0 or 1 WhatObject 3608 item, which is information indicating the object of an action, or 0 or 1 WhatAction 3609 item, which is information indicating what was done, or 0 or 1 Where 3610 item, which is information indicating where an action was performed, or 0 or 1 When 3611 item, which is information indicating when an action was performed, or 0 or 1 Why 3612 item, which is information indicating why an action was performed.

As indicated by reference numerals 3613 to 3618 in the drawings, Who 3607, WhatObject 3608, WhatAction 3609, Where 3610, When 3611, and why 3612 are defined as including text information as elements.

Also, as indicated by reference numeral 3619 in the drawings, StructuredAnnotation 3603 is defined as having identifier information id as an attribute. And, as indicated by reference numeral 3620 in the drawings, StructuredAnnotation 3603 is defined as having language information as an attribute.

In this way, it is easy to identify what kind of information AudioVisualSegment 3502 is by means of StructuredAnnotation 3603.

Next, the definition of MediaTime 3504 will be described. As indicated by reference numeral 3701 in the drawings, MediaTime 3504 is defined as having MediaTimePoint 3702 and MediaDuration 3703 as elements. MediaTimePoint 3702 is AudioVisualSegment 3502 start time information and MediaDuration 3703 is AudioVisualSegment 3502 duration information.

Also, as indicated by reference numeral 3704 in the drawings, MediaTimePoint 3702 is defined as having text information as an element. And, as indicated by reference numeral 3705 in the drawings, MediaDuration 3703 is defined as having text information as an element.

AudioVisualSegment 3502 is defined as described above. Next, a sample description of AudioVisualSegment 3502 defined as shown above will be described.

FIG. 38 is a drawing showing a sample description that adapts the segment sample description shown in FIG. 17 to Embodiment 9.

As can be seen from FIG. 38, segment 1602 contains a segment point of view (keyword) ID number (id) 1701, as in the sample description in FIG. 17. Segment 1602 also contains a segment priority level (P) 1702 corresponding to the keyword. Also, "TeamA" is entered as a keyword in segment 1602.

Segment 1603 contains a reference number (idref) 1703 for another segment point of view (keyword) which is link information, as in the sample description in FIG. 17. Thus, the keyword of segment 1603 is "TeamA". Segment 1603 also contains a segment priority level (P) 1704 corresponding to the keyword.

In this way, it is possible to link segments by means of Embodiment 9 also.

Next, the segment sample description shown in FIG. 19 adapted to Embodiment 9 will be described using FIG. 39.

As can be seen from FIG. 39, the point of view table 1801 contains segment points of view 1802a to 1802c. Segment point of view 1802a contains an ID number (id) 1901a. Also, segment point of view 1802a is indicated by the text "A".

Segment point of view 1802b contains an ID number (id) 1901b. Also, segment point of view 1802b is indicated by the text "B". Segment point of view 1802c contains an ID number (id) 1901c. Also, segment point of view 1802c is indicated by the text "C".

Meanwhile, segments 1803 to 1805 contain reference numbers (idref) 1903a to 1903c, respectively, which are link information for segment points of view 1802a to 1802c of the point of view table 1801.

Segment 1803 contains a segment priority level (P) 1904a corresponding to the keyword. Segment 1804 contains a segment priority level (P) 1904b corresponding to the keyword.

Segment 1805 contains a segment priority level (P) 1904c corresponding to the keyword.

In this way, it is easy to present a segment point of view list to the user in advance using Embodiment 9 also.

Next, the segment sample description shown in FIG. 21 adapted to Embodiment 9 will be described using FIG. 40.

Figure 40:
FIG. 40 is a drawing showing a third sample segment description according to Embodiment 9.
Figure 68:
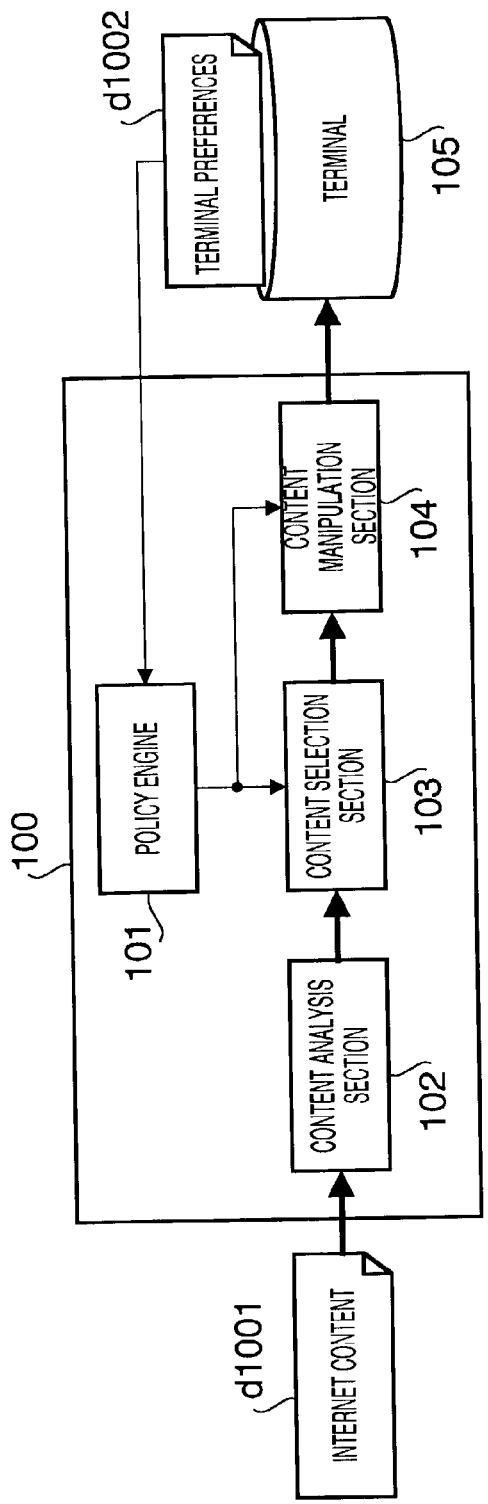
FIG. 68 is a block diagram of a conventional data adaptation apparatus.
Figure 69:
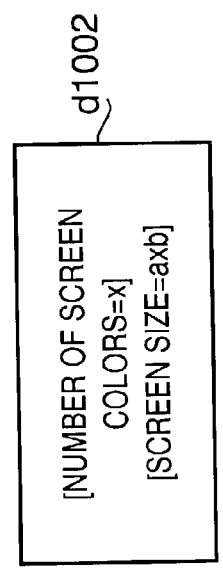
FIG. 69 is a detailed drawing of a conventional terminal preference description.

As can be seen from FIG. 40, in the point of view table 1801 it is not necessary to enter all the segment points of view that appear in the context contents description data, and only items referenced by a link are included. Also, segment 2001 does not include link information for the point of view table 1801.

Thus, it is possible to adapt the description in FIG. 21 to Embodiment 9 by means of the kind of description shown in FIG. 40.

Next, the segment sample description shown in FIG. 23 adapted to Embodiment 9 will be described using FIG. 41.

As can be seen from FIG. 41, points of view 2106, 2108, and 2110 included in segments 2103 to 2105 are stored in point of view table 2101. To be specific, points of view 2301 to 2303 are stored for points of view 2106, 2108, and 2110.

Then point of view table 2101 is displayed before the user inputs a user point of view. Thus, it is possible to adapt the description in FIG. 23 to Embodiment 9 by means of the kind of description shown in FIG. 41.

Next, the segment sample description shown in FIG. 25 adapted to Embodiment 9 will be described using FIG. 42.

As can be seen from FIG. 42, the content includes a plurality of segments 2201a to 2201c. Segment 2201a is assigned a segment ID number (id) 2301a. Segment 2201b is assigned a segment ID number (id) 2301b. Segment 2201c is assigned a segment ID number (id) 2301c.

Meanwhile, it can be seen that segment point of view 2202a is "TeamA". Also, segment point of view 2202a includes a plurality of segment priority levels 2204a to 2204c.

In addition, segment priority level 2202a is assigned respective link information 2203a to 2203c. As link information 2203a to 2203c, reference numbers idref for referencing ID numbers 2301a to 2301c of segments 2201a to 2201c are written.

In this way it is possible to reference segments 2201a to 2201c from segment priority levels 2204a to 2204c.

Moreover, it can be seen that segment point of view 2202b is "TeamB". Also, segment point of view 2202b includes a plurality of segment priority levels 2204d to 2204f.

In addition, segment priority level 2202b is assigned respective link information 2203d to 2203f. As link information 2203d to 2203f, reference numbers idref for referencing ID numbers 2301a to 2301c of segments 2201a to 2201c are written.

In this way it is possible to reference segments 2201a to 2201n from segment priority levels 2204a to 2204f.

Thus, it is possible to adapt the description in FIG. 25 to Embodiment 9 by means of the kind of description shown in FIG. 42.

Next, the segment sample description shown in FIG. 27 adapted to Embodiment 9 will be described using FIG. 43 and FIG. 44.

As can be seen from the drawings, the content includes a plurality of segments 2401a to 2401c. Segment 2401a is assigned a segment ID number (id) 2501a. Segment 2401b is assigned a segment ID number (id) 2501b. Segment 2401c is assigned a segment ID number (id) 2501c.

Meanwhile, segment point of view 2402a includes a plurality of segment priority levels 2404a to 2404c.

Also, segment priority level 2402a is assigned respective link information 2403a to 2403c. As link information 2403a to 2403c, reference numbers idref for referencing ID numbers 2501a to 2501c of segments 2401a to 2401c are written.

Thus, the target segment of segment priority level 2404a is segment 2401a, the target segment of segment priority level 2404b is segment 2401b, and the target segment of segment priority level 2404c is segment 2401n.

Meanwhile, segment point of view 2402b includes a plurality of segment priority levels 2404d to 2404f. Also, segment priority level 2402b is assigned respective link information 2403d to 2403f. As link information 2203d to 2403f, reference numbers idref for referencing ID numbers 2501a to 2501c of segments 2401a to 2401c are written.

Thus, the target segment of segment priority level 2404d is segment 2401b, the target segment of segment priority level 2404e is segment 2401c, and the target segment of segment priority level 2404f is segment 2401a.

Also, segment priority level 2402a is assigned respective priority level ID numbers (idref) 2503a to 2503c, and segment priority level 2402b is assigned respective priority level ID numbers (idref) 2503d to 2503f.

Meanwhile segments 2401a to 2401c are assigned priority level reference numbers (idrefs) 2502a to 2502e for referencing priority level ID 2503a to 2503c, which are link information for segment priority levels 2404a to 2404f.

Thus, the target segment priority levels of segment 2401a are segment priority levels 2404a and 2404f, the target segment priority levels of segment 2401b are segment priority levels 2404b and 2404d, and the target segment priority level of segment 2401c is segment priority level 2404e.

In this way, segments 2401a to 2401c and segment priority levels 2204a to 2204f can be referenced in both directions using Embodiment 9 also.

Next, the segment sample description shown in FIG. 29 adapted to Embodiment 9 will be described using FIG. 45.

As can be seen from the drawing, the content includes a plurality of segments 2601a to 2601c. Segments 2601a to 2601c are assigned segment ID numbers (id) 2701a to 2701c, respectively.

Meanwhile, it can be seen from the drawing that segment point of view 2602a is "TeamA". Also, segment point of view 2602a is assigned respective link information 2603a to 2603c. As link information 2603a to 2603c, reference numbers idref 2702a to 2702c for referencing ID numbers 2701a to 2701n of segments 2601a to 2601n are written.

Moreover, as regards link information 2603a to 2603c, since the description order is recognized as segment priority level, in this example the segment priority level of link information 2603a is the highest and the segment priority level of link information 2603c is the lowest.

Thus, the segment priority level of segment 2601a is the highest and the segment priority level of segment 2601b is the lowest.

Meanwhile, it can be seen from the drawing that segment point of view 2602b is "TeamB". Also, segment point of view 2602b is assigned respective link information 2603d to 2603f. As link information 2603d to 2603f, reference numbers idref 2702d to 2702f for referencing ID numbers 2701a to 2701c of segments 2601a to 2601c are written.

Moreover, as regards link information 2603d to 2603f, since the description order is recognized as segment priority level, in this example the segment priority level of link information 2603d is the highest and the segment priority level of link information 2603f is the lowest.

Thus, the segment priority level of segment 2601b is the highest and the segment priority level of segment 2601a is the lowest.

Thus, it is possible to adapt the description in FIG. 29 to Embodiment 9 by means of the description shown in FIG. 45.

Next, the segment sample description shown in FIG. 31 adapted to Embodiment 9 will be described using FIG. 46.

As can be seen from the drawing, the content includes a plurality of segments 2601a to 2601c. Segments 2601a to 2601c are assigned segment ID numbers (id) 2901a to 2901c, respectively.

Meanwhile, it can be seen from the drawing that segment point of view 2802 is "TeamA". Also, segment point of view 2602a is assigned respective link information (idref) 2803a to 2803c.

Moreover, as regards link information 2803a to 2803c, since the description order is recognized as segment priority level, in this example the segment priority level of link information 2803a is the highest and the segment priority level of link information 2803c is the lowest.

Thus, the segment priority level of segment 2601a is the highest and the segment priority level of segment 2601b is the lowest.

Thus, it is possible to adapt the description in FIG. 31 to Embodiment 9 using the description shown in FIG. 46.

(Embodiment 10)

In Embodiment 1 to Embodiment 9, user preferences have been described in a mode whereby they are written in XML-DTD, but user preferences may also be written in RDF, XML-Schema, or other XML-based languages, or a non-XML language, or using non-language descriptions.

In Embodiment 10, user preferences are written in XML-Schema. User preference definitions according to Embodiment 10 will be described below using FIG. 47 to FIG. 51. FIG. 47 to FIG. 51 are drawings showing user preference description definitions according to Embodiment 10. Also, FIG. 47 to FIG. 51 correspond to user preference description definitions according to Embodiment 9.

As can be seen from the drawings, UserPreference 3201 is defined as including, as user information as elements, UserIdentifier 3202, which is an identifier for identifying the user, and UsagePreference 3203, which is user preference information. Also, UsagePreference 3203 is defined as including 0 items or 1 item.

Next, the definition of UsagePreference 3203 will be described. As indicated by reference numeral 4803 in the drawings, UsagePreference 3203 is defined as including 0 or more BrowsingPreferences 3207. Also, UsagePreference 3203 is defined as including allowAutomaticUpdate 3208 as an attribute. In addition, as indicated by reference numeral 4801 in the drawings, UsagePreference 3203 is defined as including 0 or more FilteringAndSearchPreferences 4802 as elements.

Next, the definition of BrowsingPreferences 3207 will be described. As indicated by reference numeral 4900 in the drawings, BrowsingPreferences 3207 is defined as having 0 or more Summarypreferences 3210 as elements. Also, BrowsingPreferences 3207 is defined as including protected 3211 and preferencevalue 3212 as attributes. In addition, BrowsingPreferences 3207 is defined as including 0 or more PreferenceConditionType 4902 items as elements.

Next, the definition of SummaryPreferences 3210 will be described. As indicated by reference numeral 5002 in the drawings, SummaryPreferences 3210 is defined as having 0 or more elements called SummaryPreferencesType as an extension of summaryComponentType, which holds a list of the kind indicated by reference numeral 5003 in the drawings. Also, SummaryPreferences 3210 is defined as having 0 or more PreferredSummaryTheme 3302 items, which are keywords, and 0 or 1 SummaryDuration 3303, which is display interval information, as elements.

In addition, SummaryPreferences 3210 is defined as having preferencevalue 3304, which is a priority level, as an attribute. The default value of preferencevalue 3304 is defined as being 100.

Also, PreferredSummaryTheme 3302 is defined as having text data and language information as TextualType—that is, elements. In addition, PreferredSummaryTheme 3302 is defined as having priority level information preferencevalue 3307 as an attribute.

Moreover, as indicated by reference numerals 5101 to 5110 in the drawings, SummaryPreferences 3210 is defined as having, as elements, MinSummaryDuration indicating the minimum duration, MaxSummaryDuration indicating the maximum duration, NumOfKeyFrames indicating the number of display frames, MinNumOfKeyFrames indicating the minimum number of display frames, MaxNumOfKeyFrames indicating the maximum number of display frames, NumOfChars indicating the number of display characters, MinNumOfChars indicating the minimum number of display characters, and MaxNumOfChars indicating the maximum number of display characters.

As indicated by reference numeral 5110 in the drawings, these elements are defined as having a priority level as an attribute.

Thus, user preferences can be described using XML-Schema, using FIG. 47 to FIG. 51.

Next, an actual example of user preference description definitions according to Embodiment 10 will be described using FIG. 52. FIG. 52 is a drawing showing a sample user preference description according to Embodiment 10.

As indicated by reference numeral 5201 in the drawing, for UserIdentifier, "true" is entered for protected and "Mike" as userName. Also, as indicated by reference numeral 5202 in the drawing, for UsagePreferences, "false" is entered for allowAutomaticUpdate. And as indicated by reference numeral 5203 in the drawing, for BrowsingPreferences, "true" is entered for protected.

Also, in UserPreference 5200, two SummaryPreferences 5204 are entered.

As indicated by reference numeral 5205 in the drawing, for SummaryPreferences 5204, the information "Free-kick" is entered as PreferredSummaryTheme. Also, as indicated by reference numeral 5206 in the drawing, for SummaryPreferences 5204, the information "Goals" is entered as PreferredSummaryTheme. And as indicated by reference numeral 5208 in the drawing, "PT5M"—that is, information indicating 5 minutes—is entered for SummaryDuration.

In this way, user preferences can be described using XML-Schema.

In Embodiment 10, segment descriptions are also written using XML-Schema. Segment descriptions according to Embodiment 10 will be described below. First, segment definitions according to Embodiment 10 will be described using FIG. 53 to FIG. 56. FIG. 53 to FIG. 56 are drawings showing segment description definitions according to Embodiment 10.

A segment according to Embodiment 10 is defined as Segment DS, an abstract segment, shown in FIG. 53 and FIG. 54. AudioVisualSegment DS, AudioSegment DS, VideoSegment DS, StillRegion DS, and MovingRegion DS, respectively, are concrete description definitions succeeding Segment DS. AudioVisualSegment DS will be described below, but first Segment DS will be described.

As indicated by reference numeral 5300 in the drawings, Segment is declared as abstract type.

As indicated by reference numeral 5301 in the drawings, Segment is defined as having MediaInformation, which is media information on the coding format, etc., as an element. Also, as indicated by reference numeral 5302 in the drawings, Segment is defined as having MediaLocator, which is link information for the actual body of this segment, as an element. In addition, as indicated by reference numeral 5303 in the drawings, Segment is defined as having CreateInformation, which is manufacturer information such as copyright information, as an element. Moreover, as indicated by reference numeral 5304 in the drawings, Segment is defined as having UsageInformation, which is usage information such as usage limitations, as an element. Also, as indicated by reference numeral 5305 in the drawings, Segment is defined as having TextAnnotation, which is segment annotation, as an element. Also, as indicated by reference numeral 5307 in the drawings, Segment is defined as having PointofView, which is segment annotation, as an element. In addition, as indicated by reference numeral 5307 in the drawings, Segment is defined as having TextAnnotation, which is a segment point of view (keyword), as an element. And, as indicated by reference numeral 5308 in the drawings, Segment is defined as having SegmentDecomposition, which is used for specifying subsegments, as an element.

Also, as indicated by reference numeral 5311 in the drawings, Segment is defined as having an identifier id as an attribute. In addition, as indicated by reference numeral 5312 in the drawings, Segment is defined as having URL link information href as an attribute. And, as indicated by reference numeral 5313 in the drawings, Segment is defined as having id link information idref as an attribute.

Thus, Segment has keyword information Pointofview, an identifier id, and idref, which is reference information for other segment identifiers.

Next, the aforementioned AudioVisualSegment succeeding the abstract segment will be described using FIG. 55.

As indicated by reference numeral 5501 in the drawing, AudioVisualSegment extends the above-described abstract segment.

Also, as indicated by reference numeral 5502 in the drawing, AudiovisualSegment is defined as having MediaTime, which indicates the start time, as an extended element.

Moreover, as indicated by reference numeral 5504 in the drawing, AudiovisualSegment is defined as having idref, which is reference information for another segment, as an attribute.

Thus, AudioVisualSegment has reference information idref in the same way as Embodiment 9.

Next, the definition of Pointofview will be described using FIG. 56. The type of Pointofview is declared as indicated by reference numeral 5600 in the drawing.

As indicated by reference numeral 5601 in the drawing, PointofView is defined as having SupplementalInfo as an element. Also, as indicated by reference numeral 5602 in the drawing, Pointofview is defined as having Value as an element.

The type of Value is PrimitiveImportanceType shown by reference numeral 5603 in the drawing. As indicated by reference numeral 5604 in the drawing, PrimitiveImportanceType is defined as having segment id reference information idref as an attribute.

Also, as indicated by reference numeral 5606 in the drawing, Pointofview is defined as having segment viewpoint viewpoint, written as text, as an attribute.

Thus, PointofView has id and idref in the same way as Embodiment 9.

Next, a sample segment description based on the above-described definitions will be described using FIG. 57 to FIG. 59. FIG. 57 to FIG. 59 are drawings showing a sample segment description according to Embodiment 10.

The sample description shown in FIG. 57 to FIG. 59 is an example in which Pointofview is written within the segment structure.

In this example, as indicated by reference numeral 5700 in the drawings, id has a segment called "FootBallGame". As indicated by reference numerals 5701a and 5701b in the drawings, the segment that has this "FootBallGame" id is composed of two subsegments. Also the subsegment indicated by reference numeral 5701a in the drawings has a subsegment 5702a for which id is "seg1", a subsegment 5702b for which id is "seg2", and a subsegment 5702c for which id is "seg2".

Subsegment 5702a has a viewPoint "TeamA" for which priority level Value is 0.3, as indicated by reference numeral 5703a in the drawings, and a viewpoint "TeamB" for which priority level Value is 0.7, as indicated by reference numeral 5703b in the drawings. In addition, subsegment 5702a also has MediaTime information as indicated by reference numeral 5704a in the drawings.

Subsegment 5702b has a viewpoint "TeamA" for which priority level Value is 0.5, as indicated by reference numeral 5703c in the drawings. In addition, subsegment 5702a also has MediaTime information as indicated by reference numeral 5704b in the drawings.

Subsegment 5702c has a viewpoint "TeamA" for which priority level Value is 0.8, as indicated by reference numeral 5703d in the drawings, and a viewpoint "TeamB" for which priority level Value is 0.2, as indicated by reference numeral 5703e in the drawings. In addition, subsegment 5702a also has MediaTime information as indicated by reference numeral 5704c in the drawings.

Meanwhile, the subsegment indicated by reference numeral 5701b in the drawings has a subsegment 5702d for which id is "2seg1", a subsegment 5702e for which id is "2seg2", and a subsegment 5702f for which id is "2seg20". Subsegment 5702d has a viewpoint "TeamA" for which priority level Value is 0.3, as indicated by reference numeral 5703f in the drawings. In addition, subsegment 5702b also has MediaTime information as indicated by reference numeral 5704d in the drawings.

Subsegment 5702b has a viewpoint "TeamA" for which priority level Value is 0.5, as indicated by reference numeral 5703g in the drawings. In addition, subsegment 5702a also has MediaTime information as indicated by reference numeral 5704e in the drawings.

Subsegment 5702f has a viewpoint "TeamA" for which priority level Value is 0.8, as indicated by reference numeral 5703h in the drawings. In addition, subsegment 5702f also has MediaTime information as indicated by reference numeral 5704f in the drawings.

In this way, in the sample description shown in FIG. 57 to FIG. 59, PointOfview is written within the segment structure.

Next, a sample description that separates the segment structure and PointOfView structure will be described using FIG. 60 and FIG. 61. FIG. 60 and FIG. 61 are drawings showing another example of a segment description according to Embodiment 10.

In this example, as indicated by reference numeral 6000 in the drawings, id has a segment structure called "FootBallGame" and PointOfView structures 6005 and 6008. As indicated by reference numeral 6001 in the drawings, the segment structure that has this "FootBallGame" id is composed of one subsegment. Also the subsegment indicated by reference numeral 6001 in the drawings has a subsegment 6004a for which id is "seg1", a subsegment 6004b for which id is "seg2", and a subsegment 6004c for which id is "seg20".

Subsegment 6002a has MediaTime information as indicated by reference numeral 6004a in the drawings. Subsegment 6002b has MediaTime information as indicated by reference numeral 6004b in the drawings. Subsegment 6002c has MediaTime information as indicated by reference numeral 6004c in the drawings.

Subsegment 6001, also, has MediaTime information, as indicated by reference numeral 6004d in the drawings.

Meanwhile, PointOfview structure 6005 has a PointOfview "TeamA". Also, PointOfView structure 6005 has segment reference information 6006a to 6006c. Segment reference information 6006a has 0.3 as Value, and its segment reference information idref is "seg1". Segment reference information 6006b has 0.5 as Value, and its segment reference information idref is "seg2". Segment reference information 6006c has 0.8 as Value, and its segment reference information idref is "seg20".

PointOfView structure 6008 has a PointOfView "TeamB". Also, PointOfView structure 6008 has segment reference information 6009a and 6009b. Segment reference information 6009a has 0.7 as Value, and its segment reference information idref is "seg1". Segment reference information 6009b has 0.2 as Value, and its segment reference information idref is "seg20".

Thus, since PointOfView has information that references the segment id in Embodiment 10, also, it is possible to separate the segment structure and PointOfView structure.

(Embodiment 11)

In the above-described embodiments, a point of view (keyword) is assigned to a segment, and segment extraction is performed using that point of view. Then, a plurality of segments extracted in this way are grouped together, and a digest is created.

In Embodiment 11, a point of view (keyword) is assigned to this digest. By this means, it is possible to perform digest extraction using a point of view.

A digest according to Embodiment 11 will be described below using FIG. 62 to FIG. 65. First, the definition of a digest (shown as HierarchicalSummary in the drawings) will be described using FIG. 62 and FIG. 63.

The type of HierarchicalSummary is declared as indicated by reference numeral 6200 in the drawings. Also, as indicated by reference numeral 6201 in the drawings, HierarchicalSummary is defined as having SummaryThemeList, which is a list of points of view (keywords), as an element. Moreover, as indicated by reference numeral 6202 in the drawings, HierarchicalSummary is defined as having HighlightLevel, which is information indicating what kind of segment configuration HierarchicalSummary has, as an element.

Also, as indicated by reference numeral 6203 in the drawings, HierarchicalSummary is defined as having summaryComponentList as an attribute. summaryComponentList succeeds summaryComponentListType indicating what kind of configuration HierarchicalSummary has. To be specific, summaryComponentListType has a configuration comprising keyFrames indicating the frame configuration as a list, keyVideoClips indicating the video clip configuration, keyAudioClips indicating the audio clip configuration, keyThemes indicating the theme configuration, and unconstrained indicating restriction conditions.

Next, the definition of SummaryThemeList, the HierarchicalSummary point of view (keyword) list, will be described using FIG. 64.

The type of SummaryThemeList is declared as indicated by reference numeral 6400 in the drawing.

Also, as indicated by reference numeral 6401 in the drawing, SummaryThemeList is defined as having SummaryTheme, which is a HierarchicalSummary viewpoint, as an element. SummaryTheme is defined as also having language information, which is text information.

In addition, as indicated by reference numeral 6402 in the drawing, SummaryTheme is defined as having identifier id as an attribute. And, as indicated by reference numeral 6403 in the drawing, SummaryTheme is defined as having parentId, which is reference information for another high-level SummaryTheme.

In this way, it is possible to achieve a hierarchical notation for SummaryTheme.

Next, the definition of HighlightLevel, which is information indicating what kind of segment configuration HierarchicalSummary has, will be described using FIG. 65.

HighlightLevel is declared as indicated by reference numeral 6500 in the drawing. Also, as indicated by reference numeral 6501 in the drawing, HighlightLevel is defined as having HighlightSegment, which is information on segments to be included in HierarchicalSummary, as an element.

Moreover, as indicated by reference numeral 6502 in the drawing, HighlightLevel has HighlightLevel as an element. By this means, it is possible to have a HighlightLevel at a lower level than HighlightLevel, and a recursive HighlightLevel configuration can be provided.

Also, as indicated by reference numerals 6503 to 6506 in the drawing, HighlightLevel has, as attributes, name, which is HighlightLevel name information, level, which is HighlightLevel priority level information, duration, which is HighlightLevel length information, and themeIds, which is information on which SummaryTheme is to be referenced.

In this way it is possible to link HighlightLevel to SummaryTheme.

Next, an actual example of SummaryTheme created on the basis of a HierarchicalSummary definition will be described using FIG. 66.

SummaryThemeList 6600 includes SummaryTheme 6601a to SummaryTheme 6601f.

As indicated by reference numeral 6602a in the drawing, SummaryTheme 6601a is shown in English. Also, as indicated by reference numeral 6603a in the drawing, SummaryTheme 6601a has id "item0". And, as indicated by reference numeral 6604a in the drawing, the content of SummaryTheme 6601a is "baseball".

As indicated by reference numeral 6602b in the drawing, SummaryTheme 6601b is shown in English. Also, as indicated by reference numeral 6603b in the drawing, SummaryTheme 6601b has id "item01". Moreover, as indicated by reference numeral 6604b in the drawing, the content of SummaryTheme 6601b is "home run". And, as indicated by reference numeral 6605b in the drawing, SummaryTheme 6601b has parentID"item0". That is to say, SummaryTheme 6601b is a SummaryTheme positioned at a lower level of SummaryTheme 6601a.

As indicated by reference numeral 6602c in the drawing, SummaryTheme 6601c is shown in English. Also, as indicated by reference numeral 6603c in the drawing, SummaryTheme 6601c has id "item1". Moreover, as indicated by reference numeral 6604c in the drawing, the content of SummaryTheme 6601c is "basketball". In addition, SummaryTheme 6601a has parentID "item0".

As indicated by reference numeral 6602d in the drawing, SummaryTheme 6601d is shown in English. Also, as indicated by reference numeral 6603d in the drawing, SummaryTheme 6601d has id "item11". Moreover, as indicated by reference numeral 6604d in the drawing, the content of SummaryTheme 6601d is "three-pointer". And, as indicated by reference numeral 6605d in the drawing, SummaryTheme 6601d has parentID "item1". That is to say, SummaryTheme 6601d is a SummaryTheme positioned at a lower level of SummaryTheme 6601c.

As indicated by reference numeral 6602e in the drawing, SummaryTheme 6601e is shown in English. Also, as indicated by reference numeral 6603e in the drawing, SummaryTheme 6601e has id "item12". Moreover, as indicated by reference numeral 6604e in the drawing, the content of SummaryTheme 6601e is "slamdunk". And, as indicated by reference numeral 6605e in the drawing, SummaryTheme 6601e has parentID "item1". That is to say, SummaryTheme 6601e is a SummaryTheme positioned at a lower level of SummaryTheme 6601c.

As indicated by reference numeral 6602f in the drawing, SummaryTheme 6601f is shown in English. Also, as indicated by reference numeral 6603f in the drawing, SummaryTheme 6601f has id "item2". Moreover, as indicated by reference numeral 6604f in the drawing, the content of SummaryTheme 6601f is "soccer".

By the fact of a SummaryTheme having a parentID in this way, it is possible to provide a link to another SummaryTheme. In addition, it is possible to link SummaryThemes hierarchically.

Next, a sample HierarchicalSummary description using SummaryThemeList will be described using FIG. 67.

As indicated by reference numeral 6700 in the drawing, HierarchicalSummary is declared as having the name "keyThemesSummary001".

Also, HierarchicalSummary is composed of a SummaryThemeList 6701, a HighlightLevel 6702a with the name "summary001", and a HighlightLevel 6702b with the name "summary002".

SummaryThemeList 6701 has a SummaryTheme 6703a called "slam dunk". SummaryTheme 6703a has id "E0". Also, SummaryThemeList 6701 has a SummaryTheme 6703b called "3-point shots". And SummaryTheme 6703b has id "E1".

Meanwhile, HighlightLevel 6702a has a segment configuration as indicated by reference numeral 6704a in the drawing. Also, as indicated by reference numeral 6705a in the drawing, HighlightLevel 6702a has themeIds "E0". That is to say, HighlightLevel 6702a is linked to SummaryTheme 6703a that has id "E0". Thus, HighlightLevel 6702a has the SummaryTheme "slam dunk".

HighlightLevel 6702b has a segment configuration as indicated by reference numeral 6704b in the drawing. Also, as indicated by reference numeral 6705b in the drawing, HighlightLevel 6702b has themeIds "E1". That is to say, HighlightLevel 6702b is linked to SummaryTheme 6703b that has id "E1". Thus, HighlightLevel 6702b has the SummaryTheme "3-point shots".

In this way, it is possible to give HierarchicalSummary a SummaryTheme.

In this way, also, it is possible to link a HighlightLevel and SummaryTheme. Therefore, HighlightLevel and SummaryTheme can be described divided into separate configurations.

In Embodiment 1 to Embodiment 11, it is possible to use a user usage history, purchase history, or event history, a template prepared beforehand, or anything of the kind, for user preferences.

Also, in Embodiment 1 to Embodiment 11, the content identifier, duration, keyword, prioritylevel, or keyword priority related description method is not limited to these embodiments.

Moreover, in Embodiment 1 to Embodiment 11, a terminal preference may be an ID representing a terminal category (for example, PC use or portable terminal use) rather than an actual terminal type or terminal capability value. Also, terminal preferences may be determined uniquely according to the terminal, or may be updated by means of a firmware or software version upgrade.

Further, in Embodiment 1 to Embodiment 11, data may be other than audio/video or document data.

Still further, in Embodiment 1 to Embodiment 11, it is possible for the user adaptive control section not to update user preferences. Moreover, there may be a plurality of different user preference descriptions for the same content.

Also, in Embodiment 1 to Embodiment 10, there may be a number of segment and subsegment levels, from 1 upward.

Moreover, in Embodiment 2, user preferences, terminal preferences, and network preferences may be on the server side or a totally separate management site rather than on the terminal side. Also, network preferences may be determined uniquely according to the contracted terminal service, or may be determined uniquely or dynamically according to the status of communication between the terminal and the server.

Further, all or part of the operation of each part of the above-described present invention may be embodied in a program, that program stored on a storage medium that can be read by a computer, and that program executed using a computer, in order to realize the operation of each part.

Still further, the above-described present invention may be realized using dedicated hardware that makes manifest the function of each part of the present invention.

Also, all or part of the operation of each part included in the above-described present invention may be used in the form of a computer program product for execution by a computer.

This application is based on the Japanese Patent Application No.HEI 11-344476 filed on Dec. 3, 1999, and the Japanese Patent Application No.2000-066531 filed on Mar. 10, 2000, entire content of which is expressly incorporated by reference herein.

Industrial Applicability

As described above, according to the present invention, firstly, by providing user preference information as user preferences for each content, selecting a data segment according to user preferences, and performing resolution conversion based on segment priority level and terminal capability, it is possible to perform data adaptation for each content in a form in which the user wishes to see it; and secondly, by acquiring information on the network transmission band as a network preference when content is distributed via a network, and adjusting the data quantity according to the segment priority and transmission band, it is possible to perform data adaptation of content in the form in which the user wishes to receive it and in a scalable fashion according to the network status.

The invention claimed is:

1. A content adaptation apparatus, comprising:
an acquirer that acquires metadata that describes said content and actual data of said content;
said metadata including:
a data structure part that includes structures of a plurality of segments each for describing one of said plurality of scenes of content,
wherein, in said data structure part, content forms one program; the program comprises a plurality of segments; and each individual segment of the plurality of segments of the program is obtained by partitioning the program in a time domain; and
an attribute part that has attribute information of said content,
said attribute part including:
a segment point of view that is a keyword representing a detail of content of said scenes corresponding to each of said segment;
a plurality of segment priority levels determined for each segment point of view, each segment priority level being associated with one of said segments and having a value representing a degree of importance of each of said segment point of view, associated with one of said segments; and
a plurality of link information linked to at least one corresponding segment for each of said segment point of view;
in said attribute part, a plurality of pairs of said link information for a segment and said segment priority level being assigned to each segment point of view;
a user preference acquirer that acquires user preference description information describing a user point of view showing a keyword related to user preferences with respect to the content, a user priority level, and display duration information for reproducing the content at a desired time including a maximum duration; and
a content adapter that adapts the content to the user preferences by selecting a segment, as a target to be reproduced, in descending order of a segment priority level starting from a segment having a highest segment priority level, each segment comprising the segment point of view matching the user point of view, in a range not exceeding the maximum duration restriction conditions of the display duration information, using the user point of view and user priority level from the user preference description information.

2. The content adaptation apparatus according to claim 1, wherein a plurality of pairs of user points of view and user preference levels are attached to the user preference description information as attributes.

3. The content adaptation apparatus according to claim 1, wherein the content comprises video or audio-video content.

4. The content adaptation apparatus according to claim 1, wherein, in said data structure part, the plurality of segments are hierarchically described.

5. A content adapting method, comprising:
acquiring, by execution of a set of instructions by a computer, metadata that describes said content and actual data of said content;
said metadata including:
a data structure part that includes structures of a plurality of segments each for describing one of said plurality of scenes of content,
wherein, in the data structure part, content forms one program; the program comprises a plurality of segments; and each individual segment of the plurality of segments of the program is obtained by partitioning the program in a time domain; and an attribute part that has attribute information of said content, said attribute part including:
a segment point of view that is a keyword representing a detail of content of said scenes of corresponding to each of said segment;
a plurality of segment priority levels determined for each segment point of view, each segment priority level being associated with one of said segments and having a value representing a degree of importance of each of said segment point of view, associated with one of said segments; and a plurality of link information linked to at least one corresponding segment for each of said segment point of view;

in said attribute part, a plurality of pairs of said link information for a segment and said segment priority level being assigned to each segment point of view;

acquiring, by execution of a set of instructions by a computer, user preference description information describing a user point of view showing a keyword related to user preferences with respect to the content, a user priority level, and display duration information for reproducing the content at a desired time including a maximum duration; and adapting, by execution of a set of instructions by a computer, the content to the user preferences by selecting a segment, as a target to be reproduced, in descending order of a segment priority level starting from a segment having a highest segment priority level, each segment comprising the segment point of view matching the user point of view, in a range not exceeding the maximum duration in restriction conditions of the display duration information, using the user point of view and user priority level from the user preference description information.

6. The content adaptation apparatus according to claim 1, wherein a text annotation for the segments is attached to a description of the metadata.

7. The content adaptation apparatus according to claim 6, wherein the user preference information comprises information of a number of display characters related to the user preferences.

8. The content adaptation apparatus according to claim 7, wherein the information of the number of display characters of the user preference information comprises information of a minimum number of display characters indicating a minimum duration.

9. The content adaptation apparatus according to claim 7, wherein the information of the number of display characters of the user preference information comprises information of a maximum number of display characters indicating a maximum duration.

10. The content adaptation apparatus according to claim 1, wherein the content at a specified time can be extracted by attaching time information to each segment of the metadata and attaching the specified time to the user preferences.

* * * * *